(12) United States Patent
Kim

(10) Patent No.: US 12,680,242 B2
(45) Date of Patent: Jul. 14, 2026

(54) DEVICE AND METHOD FOR ESTIMATING AND MANAGING ROAD SURFACE TYPES USING SOUND SIGNALS

(71) Applicant: MoveAWheeL, Inc., Daejeon (KR)

(72) Inventor: Min Hyun Kim, Daejeon (KR)

(73) Assignee: MoveAWheel, Inc., Daejeon (KR)

( * ) Notice: Subject to any disclaimer, the term of this patent is extended or adjusted under 35 U.S.C. 154(b) by 359 days.

(21) Appl. No.: 18/439,766

(22) Filed: Feb. 13, 2024

(65) Prior Publication Data

US 2024/0183117 A1 Jun. 6, 2024

Related U.S. Application Data

(63) Continuation of application No. PCT/KR2022/017680, filed on Nov. 11, 2022.

(30) Foreign Application Priority Data

| | | |
|---|---|---|
| Nov. 17, 2021 | (KR) | 10-2021-0158459 |
| Nov. 17, 2021 | (KR) | 10-2021-0158464 |
| Nov. 17, 2021 | (KR) | 10-2021-0158479 |
| Jul. 20, 2022 | (KR) | 10-2022-0089328 |
| Jul. 20, 2022 | (KR) | 10-2022-0089329 |
| Jul. 20, 2022 | (KR) | 10-2022-0089330 |
| Jul. 20, 2022 | (KR) | 10-2022-0089331 |

(Continued)

(51) Int. Cl.
*E01C 23/01* (2006.01)
*E01C 11/26* (2006.01)

(Continued)

(52) U.S. Cl.
CPC ............ *E01C 23/01* (2013.01); *E01C 11/265* (2013.01); *E01H 10/005* (2013.01); *G01H 3/06* (2013.01); *G05B 19/042* (2013.01)

(58) Field of Classification Search
CPC ........................................................ E01C 23/01
(Continued)

(56) References Cited

U.S. PATENT DOCUMENTS

2018/0095462 A1    4/2018  Kim et al.
2018/0181094 A1*   6/2018  Funk ........................ H04L 67/12
(Continued)

FOREIGN PATENT DOCUMENTS

CN         103809168 B    11/2017
JP         H03-189259 A    8/1991
(Continued)

OTHER PUBLICATIONS

International Search Report of PCT Application No. PCT/KR2022/017680, mailed on Feb. 20, 2023.
(Continued)

*Primary Examiner* — Travis R Hunnings
(74) *Attorney, Agent, or Firm* — WTA IP Law P.C.

(57) ABSTRACT

According to various embodiments, an electronic device for classifying a road surface using a sound signal and a road surface classification method using the same are disclosed. In addition, a device and method for managing a road surface through road surface classification are disclosed. Meanwhile, a method for installing an infrastructure for implementing a road surface classification method is disclosed. Other various embodiments are possible.

15 Claims, 51 Drawing Sheets

(30) Foreign Application Priority Data

| | | |
|---|---|---|
| Oct. 17, 2022 | (KR) | .......................... 10-2022-0133387 |
| Oct. 17, 2022 | (KR) | .......................... 10-2022-0133397 |
| Oct. 17, 2022 | (KR) | .......................... 10-2022-0133405 |

(51) Int. Cl.

| | |
|---|---|
| *E01H 10/00* | (2006.01) |
| *G01H 3/06* | (2006.01) |
| *G05B 19/042* | (2006.01) |

(58) Field of Classification Search
USPC ........................................................ 700/283
See application file for complete search history.

(56) References Cited

U.S. PATENT DOCUMENTS

| | | | |
|---|---|---|---|
| 2018/0181095 A1* | 6/2018 | Funk ................... | G05B 19/042 |
| 2018/0265039 A1 | 9/2018 | Jain et al. | |
| 2021/0048527 A1* | 2/2021 | Schumann ........... | G01S 15/931 |
| 2021/0182632 A1* | 6/2021 | Choi .................... | G01S 15/931 |
| 2021/0394798 A1 | 12/2021 | Kim | |
| 2023/0373521 A1* | 11/2023 | Hertkorn ............. | G08G 1/0112 |
| 2024/0166230 A1* | 5/2024 | Wang ................. | B60W 60/001 |

FOREIGN PATENT DOCUMENTS

| | | |
|---|---|---|
| JP | H 04-105084 A | 9/1992 |
| JP | H08-075711 A | 3/1996 |
| JP | H 09-005449 A | 1/1997 |
| JP | H 10-142352 A | 5/1998 |
| JP | 2000-046803 A | 2/2000 |
| JP | 3050759 B | 6/2000 |
| JP | 2001-083078 A | 3/2001 |
| JP | 2001-228264 A | 8/2001 |
| JP | 2012-521658 A | 9/2012 |
| JP | 2012-503192 A | 12/2012 |
| JP | 2016-085040 A | 5/2016 |
| JP | 2017-517716 A | 6/2017 |
| JP | 2017-166866 A | 9/2017 |
| JP | 2019-124668 A | 7/2019 |
| JP | 2020-029231 A | 2/2020 |
| JP | 2020-521113 A | 7/2020 |
| JP | 2021-018492 A | 2/2021 |
| KR | 10-2013-0062034 A | 6/2013 |
| KR | 10-2013-0068258 A | 6/2013 |
| KR | 10-2014-0059089 A | 5/2014 |
| KR | 10-2014-0081881 A | 7/2014 |
| KR | 10-1716270 B1 | 3/2017 |
| KR | 10-2017-0069332 A | 6/2017 |
| KR | 10-2018-0037468 A | 4/2018 |
| KR | 10-2018-0116214 A | 10/2018 |
| KR | 10-2018-0135822 A | 12/2018 |
| KR | 10-2020-0026146 A | 3/2020 |
| KR | 10-2136576 B1 | 7/2020 |
| KR | 10-2207816 B1 | 1/2021 |
| KR | 10-2021-0116038 A | 9/2021 |
| KR | 10-2397312 B1 | 5/2022 |
| KR | 10-2415195 B1 | 6/2022 |

OTHER PUBLICATIONS

Notice of Allowance of KR Application No. KR 10-2022-0089328 issued on Oct. 31, 2023.
Notice of Allowance of KR Application No. KR 10-2022-0089331 issued on Oct. 31, 2023.

* cited by examiner

FIG. 3

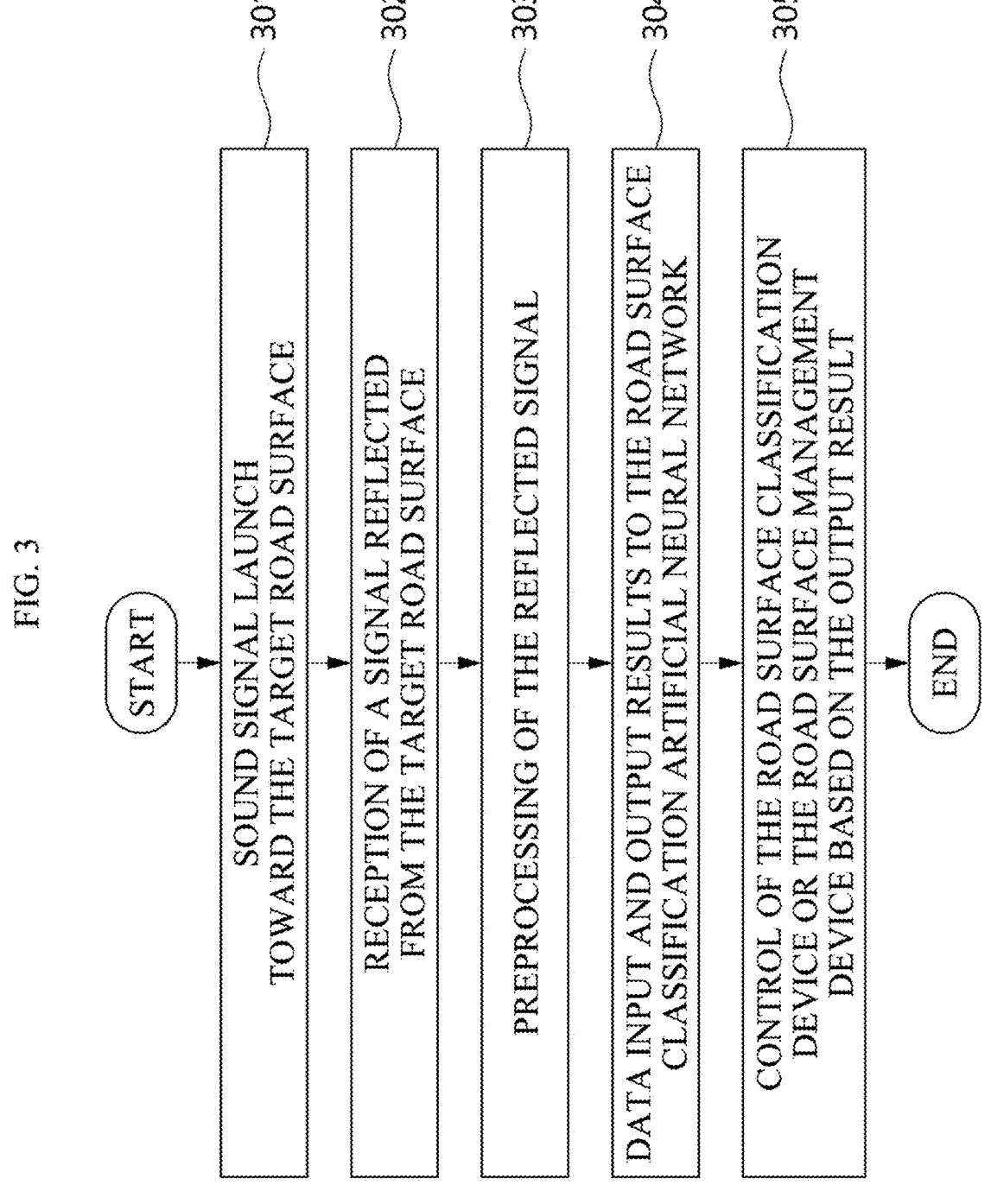

START

301 — SOUND SIGNAL LAUNCH TOWARD THE TARGET ROAD SURFACE

302 — RECEPTION OF A SIGNAL REFLECTED FROM THE TARGET ROAD SURFACE

303 — PREPROCESSING OF THE REFLECTED SIGNAL

304 — DATA INPUT AND OUTPUT RESULTS TO THE ROAD SURFACE CLASSIFICATION ARTIFICIAL NEURAL NETWORK

305 — CONTROL OF THE ROAD SURFACE CLASSIFICATION DEVICE OR THE ROAD SURFACE MANAGEMENT DEVICE BASED ON THE OUTPUT RESULT

END

FIG. 7
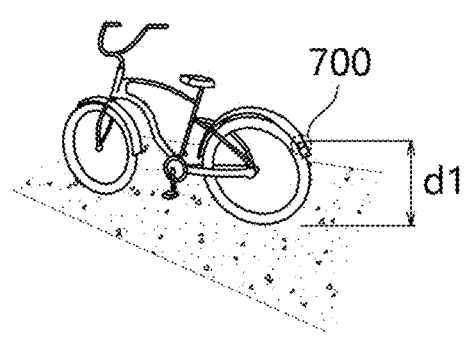
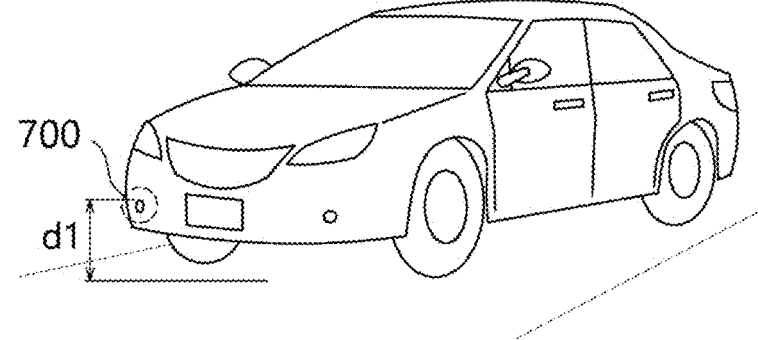
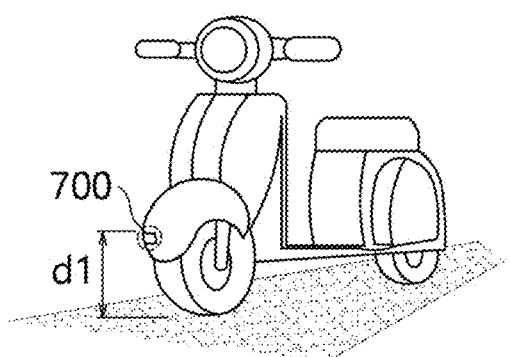
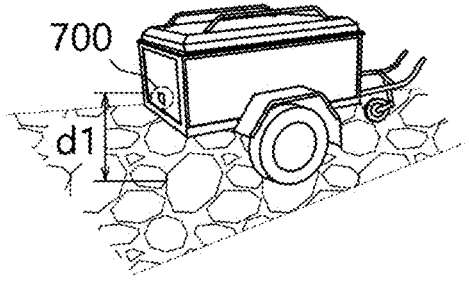

Figure 14:
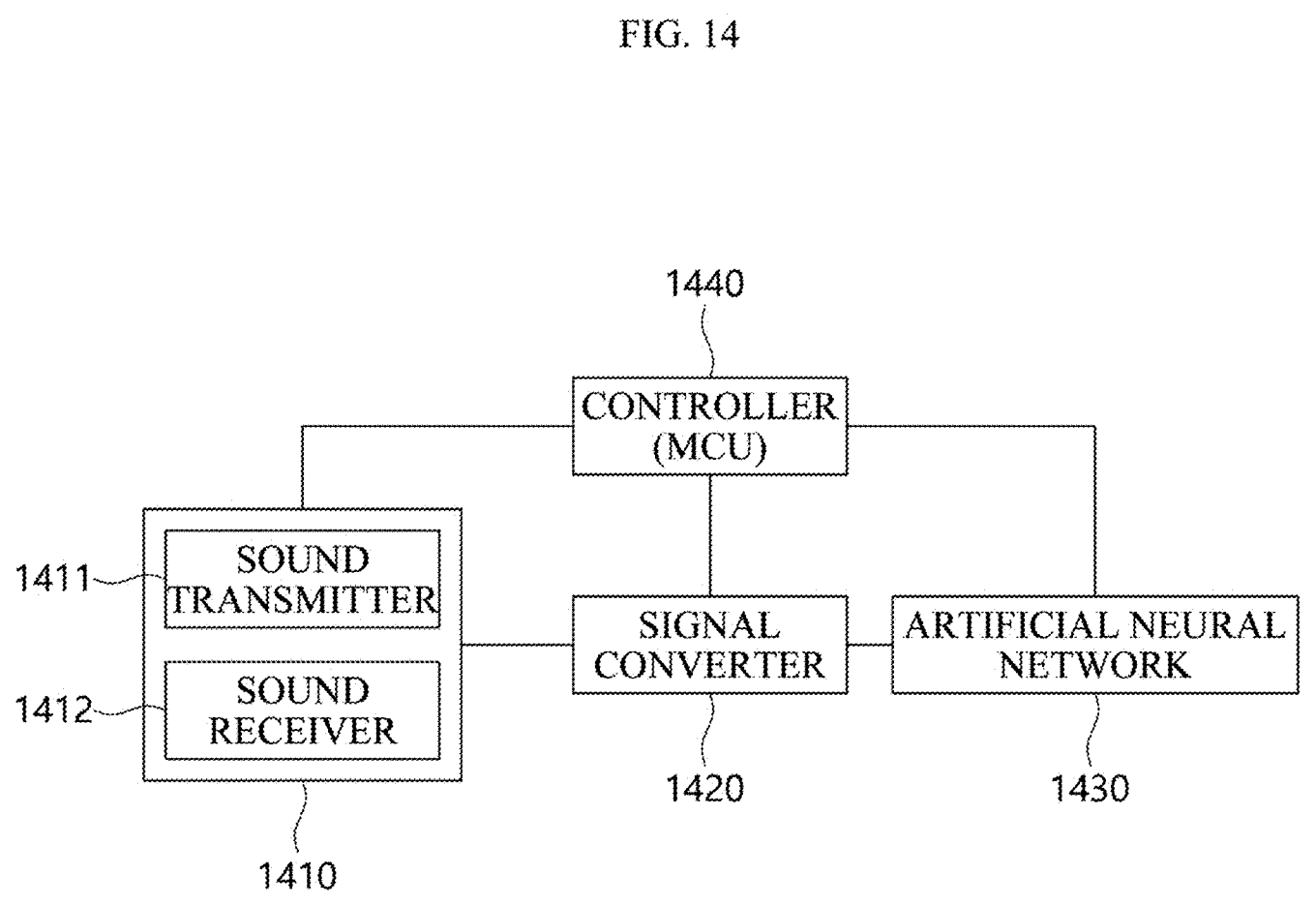

CONTROLLER (MCU)    1440

SIGNAL CONVERTER    1420

ARTIFICIAL NEURAL NETWORK    1430

SOUND TRANSMITTER    1411

SOUND RECEIVER    1412

```
model ConvNet(
  (conv1): Conv1d(1, 16, kernel_size=(64,), stride=(1,), padding=(32,))
  (bn1): BatchNorm1d(16, eps=1e-05, momentum=0.1, affine=True, track_running_stats=True)
  (pool1): MaxPool1d (kernel_size=8, stride=8, padding=1, dilation=1, ceil_mode=False)
  (conv2): Conv1d(16, 32, kernel_size=(32,), stride=(1,), padding=(16,))
  (bn2): BatchNorm1d (32, eps=1e-05, momentum=0.1, affine=True, track_running_stats=True)
  (pool2): MaxPool1d(kernel_size=8, stride=1, padding=0, dilation=1, ceil_mode=False)
  (conv3): Conv1d(32, 64, kernel_size=(16,), stride=(1,), padding=(8,))
  (bn3): BatchNorm1d (64, eps=1e-05, momentum=0.1, affine=True, track_running_stats=True)
  (conv4): Conv1d(64, 128, kernel_size=(8,), stride=(1,), padding=(4,))
  (bn4): BatchNorm1d(128, eps=1e-05, momentum=0.1, affine=True, track_running_stats=True)
  (pool4): AvgPool1d(kernel_size=(4,), stride=(1,), padding=(0))
  (fc): Linear(in_features=1536, out_features=9, bias=True) )
)
```

LEARNING STEP — 2001

REFLECTED SIGNAL REFLECTION STEP — 2002

FREQUENCY DOMAIN SIGNAL ACQUISITION STEP — 2003

ROAD SURFACE TYPE DETERMINATION STEP — 2004

FIRST LEARNING STEP — 2201

REFLECTED SIGNAL REFLECTION STEP — 2202

SIGNAL CONVERSION STEP — 2203

ATMOSPHERE ATTENUATION CORRECTION STEP — 2204

FREQUENCY DOMAIN SIGNAL ACQUISITION STEP — 2205

FIRST ROAD SURFACE TYPE DETERMINATION STEP — 2206

2310

2320

2301

2350

TARGET ROAD
SURFACE    2300

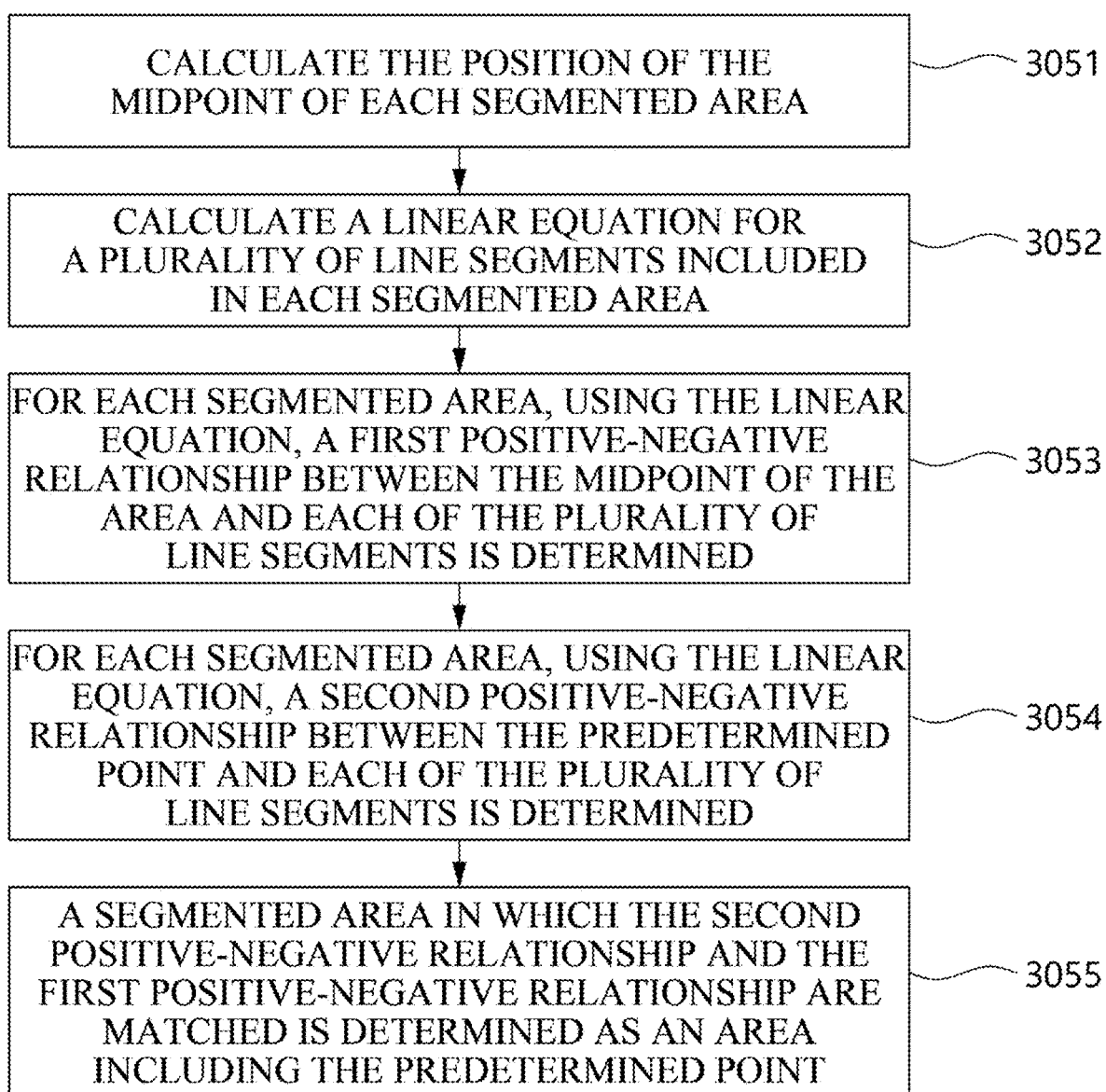

CALCULATE THE POSITION OF THE
MIDPOINT OF EACH SEGMENTED AREA — 3051

CALCULATE A LINEAR EQUATION FOR
A PLURALITY OF LINE SEGMENTS INCLUDED
IN EACH SEGMENTED AREA — 3052

FOR EACH SEGMENTED AREA, USING THE LINEAR
EQUATION, A FIRST POSITIVE-NEGATIVE
RELATIONSHIP BETWEEN THE MIDPOINT OF THE
AREA AND EACH OF THE PLURALITY OF
LINE SEGMENTS IS DETERMINED — 3053

FOR EACH SEGMENTED AREA, USING THE LINEAR
EQUATION, A SECOND POSITIVE-NEGATIVE
RELATIONSHIP BETWEEN THE PREDETERMINED
POINT AND EACH OF THE PLURALITY OF
LINE SEGMENTS IS DETERMINED — 3054

A SEGMENTED AREA IN WHICH THE SECOND
POSITIVE-NEGATIVE RELATIONSHIP AND THE
FIRST POSITIVE-NEGATIVE RELATIONSHIP ARE
MATCHED IS DETERMINED AS AN AREA
INCLUDING THE PREDETERMINED POINT — 3055

Figure 33:
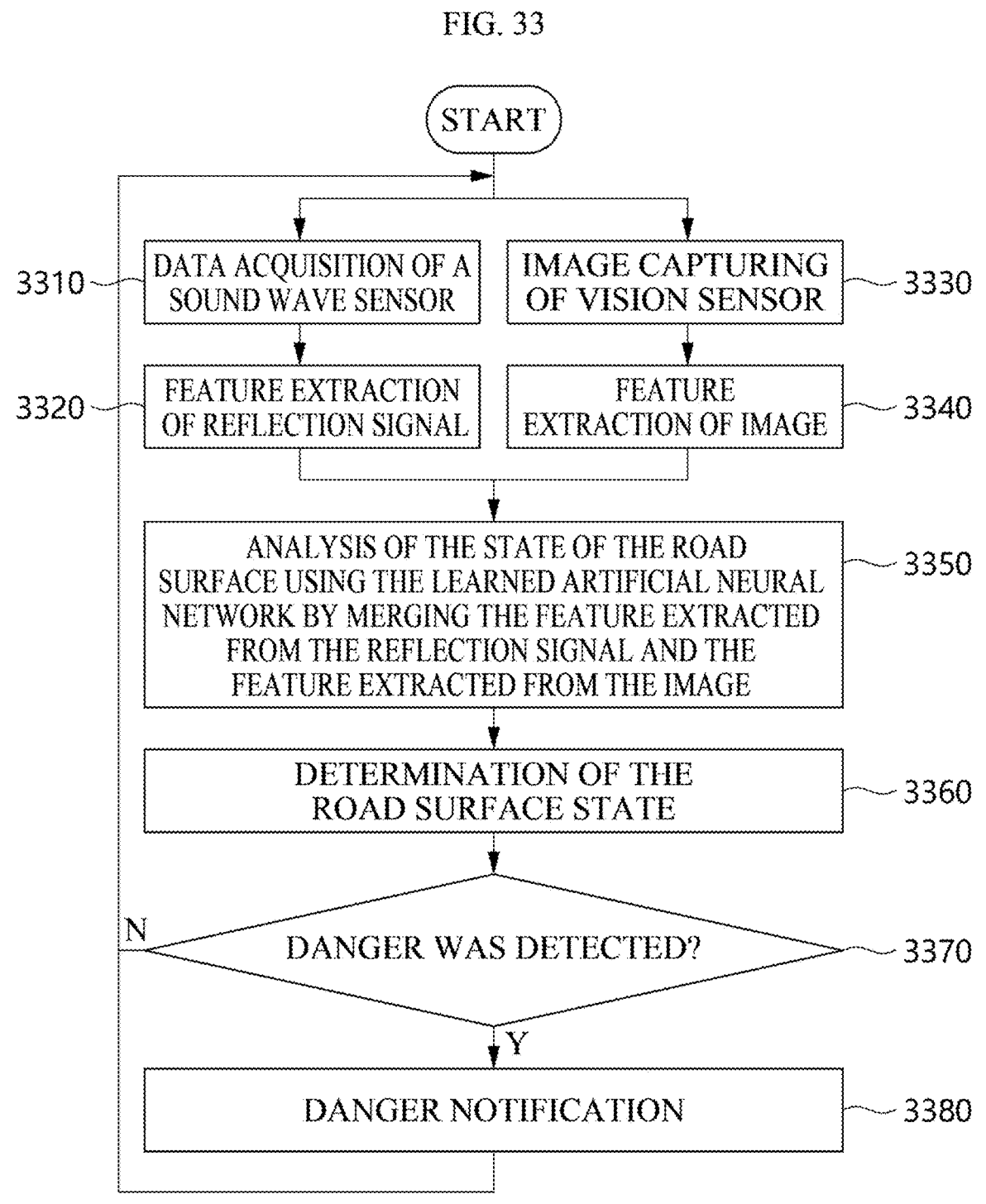

START

3310 — DATA ACQUISITION OF A SOUND WAVE SENSOR

3330 — IMAGE CAPTURING OF VISION SENSOR

3320 — FEATURE EXTRACTION OF REFLECTION SIGNAL

3340 — FEATURE EXTRACTION OF IMAGE

3350 — ANALYSIS OF THE STATE OF THE ROAD SURFACE USING THE LEARNED ARTIFICIAL NEURAL NETWORK BY MERGING THE FEATURE EXTRACTED FROM THE REFLECTION SIGNAL AND THE FEATURE EXTRACTED FROM THE IMAGE

3360 — DETERMINATION OF THE ROAD SURFACE STATE

3370 — DANGER WAS DETECTED?

N

Y

3380 — DANGER NOTIFICATION

ROAD SURFACE TEMPERATURE (°C) y

ACQUIRED SIGNAL OF SOUND SENSOR
X=(x1, x2, ..., xn)

BRINE SPRAY AMOUNT
(DISTRIBUTION DEGREE) (%) y

ACQUIRED SIGNAL OF SOUND SENSOR
X=(x1, x2, ...., xn)

FIG. 38

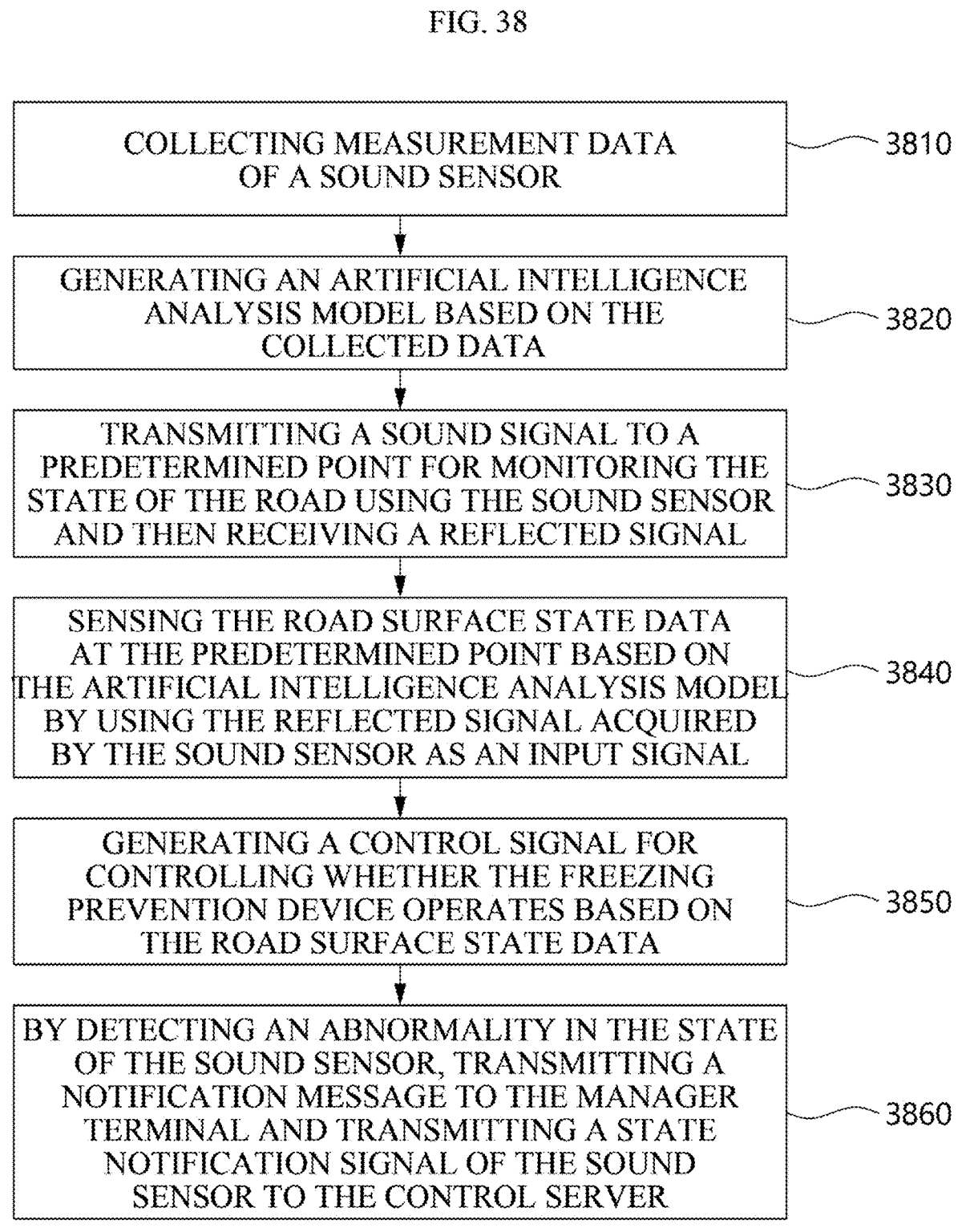

```
┌──────────────────────────────────────────────┐
│        COLLECTING MEASUREMENT DATA             │──── 3810
│           OF A SOUND SENSOR                    │
└──────────────────────────────────────────────┘
                      │
                      ▼
┌──────────────────────────────────────────────┐
│   GENERATING AN ARTIFICIAL INTELLIGENCE        │──── 3820
│      ANALYSIS MODEL BASED ON THE               │
│           COLLECTED DATA                       │
└──────────────────────────────────────────────┘
                      │
                      ▼
┌──────────────────────────────────────────────┐
│   TRANSMITTING A SOUND SIGNAL TO A             │
│  PREDETERMINED POINT FOR MONITORING THE        │──── 3830
│  STATE OF THE ROAD USING THE SOUND SENSOR      │
│   AND THEN RECEIVING A REFLECTED SIGNAL        │
└──────────────────────────────────────────────┘
                      │
                      ▼
┌──────────────────────────────────────────────┐
│    SENSING THE ROAD SURFACE STATE DATA         │
│    AT THE PREDETERMINED POINT BASED ON         │
│ THE ARTIFICIAL INTELLIGENCE ANALYSIS MODEL     │──── 3840
│   BY USING THE REFLECTED SIGNAL ACQUIRED       │
│    BY THE SOUND SENSOR AS AN INPUT SIGNAL      │
└──────────────────────────────────────────────┘
                      │
                      ▼
┌──────────────────────────────────────────────┐
│     GENERATING A CONTROL SIGNAL FOR            │
│   CONTROLLING WHETHER THE FREEZING             │──── 3850
│  PREVENTION DEVICE OPERATES BASED ON           │
│      THE ROAD SURFACE STATE DATA               │
└──────────────────────────────────────────────┘
                      │
                      ▼
┌──────────────────────────────────────────────┐
│ BY DETECTING AN ABNORMALITY IN THE STATE       │
│   OF THE SOUND SENSOR, TRANSMITTING A          │
│  NOTIFICATION MESSAGE TO THE MANAGER           │──── 3860
│  TERMINAL AND TRANSMITTING A STATE             │
│    NOTIFICATION SIGNAL OF THE SOUND            │
│     SENSOR TO THE CONTROL SERVER               │
└──────────────────────────────────────────────┘
```

DEVICE AND METHOD FOR ESTIMATING AND MANAGING ROAD SURFACE TYPES USING SOUND SIGNALS

CROSS-REFERENCE TO RELATED APPLICATIONS

This application is a bypass continuation of International PCT Application No. PCT/KR2022/017680, filed on Nov. 11, 2022, which claims priority to Republic of Korea Patent Application No. 10-2021-0158459, filed on Nov. 17, 2021; Republic of Korea Patent Application No. 10-2021-0158464, filed on Nov. 17, 2021; Republic of Korea Patent Application No. 10-2021-0158479, filed on Nov. 17, 2021; Republic of Korea Patent Application No. 10-2022-0133387, filed on Oct. 17, 2022; Republic of Korea Patent Application No. 10-2022-0133397, filed on Oct. 17, 2022; Republic of Korea Patent Application No. 10-2022-0133405, filed on Oct. 17, 2022; Republic of Korea Patent Application No. 10-2022-0089331 filed on Jul. 20, 2022; Republic of Korea Patent Application No. 10-2022-0089330, filed on Jul. 20, 2022; Republic of Korea Patent Application No. 10-2022-0089329, filed on Jul. 20, 2022; and Republic of Korea Patent Application No. 10-2022-0089328, filed on Jul. 20, 2022, which are incorporated by reference herein in their entirety.

TECHNICAL FIELD

The present disclosure pertains to a device for estimating road surface types using sound signals and a method for classifying and managing road surfaces using the same, and more particularly, to a device for classifying sound signals reflected on the road surface using artificial neural networks and controlling road surfaces or moving objects based on the classified road surfaces and a method for managing road surfaces using the same.

BACKGROUND

In general, since moving objects moving on the ground moves a ground plane, that is moving according to a friction coefficient of the road surface, it is important to accurately estimate the friction coefficient of the road surface in terms of stability control and maximum motion performance control.

The black ice accident, which is rapidly increasing in the winter, occurs due to a rapid change in the friction coefficient of the road surface in a situation that has not been recognized, and therefore, it can be said that the need for a friction coefficient estimation technique is well revealed.

In addition, regenerative braking technology is essential for increasing energy efficiency in electric vehicles that are recently commercialized, and the need for a technique for estimating the friction coefficient of the road surface in advance is expanded in terms of securing driving stability when regenerative braking is applied.

As a method for estimating such a road surface state or a road surface friction coefficient based on the same, in the related art, a method of using dynamic information of a vehicle and a method of using sensing information have been mainly used.

In the case of a method of using dynamic information of a vehicle, measurement information of various sensors mounted on the vehicle is substituted into a vehicle dynamic model and estimated. In this case, there is a disadvantage in that the accuracy is lowered in a situation that deviates from a predetermined modeling, and since the measurement can be performed only after passing through the road surface, the friction coefficient of the road surface cannot be estimated in advance.

In addition, in the case of an electromagnetic wave sensor-based method such as image information, the friction coefficient of the road surface can be estimated remotely, but there is a limitation in that the results can be changed depending on the installation position or direction of the sensor and require expensive sensor equipment and a signal processing device for the same.

Meanwhile, the road surface estimation technique using acoustic information is also actively discussed, and in the related art, the focus is on a technique for estimating the road surface state based on friction sound between the ground and the tire, and there is a limitation in that the accuracy is insufficient, and the front of the road surface state cannot be checked before passing through the road surface.

Therefore, in the conventional method, the road surface state cannot be determined in advance, or the determination process is non-economical and inaccurate, and there is a limitation in that the above-described problem cannot be solved efficiently.

SUMMARY

The present disclosure is intended to provide a device and method for estimating a road surface type using a sound signal to solve the above problem.

In addition, the present disclosure is intended to provide a device and method for controlling and managing a road surface in real time through estimation of a road surface type according to the present disclosure.

Meanwhile, the technical problems to be solved in the present disclosure are not limited to the above technical problems, and the technical problems not mentioned may be clearly understood by those skilled in the art to which the disclosure included in the present disclosure pertains from the present specification and the accompanying drawings.

According to various embodiments of the present disclosure, an electronic device for classifying a road surface using a sound signal includes: a transceiver configured to transmit and receive a sound signal, an atmosphere sensor; and at least one processor electronically connected to the transceiver and the atmosphere sensor, wherein the at least one processor is configured to transmit a sound signal toward a target road surface spaced apart from the electronic device by a first distance using the transceiver, receive a reflection signal of the sound signal for the target road surface using the transceiver, acquire atmosphere information related to the sound signal using the atmosphere sensor, acquire first data for the received reflection signal, generate second data by correcting the first data based on the atmosphere information, acquire third data related to frequency domain information of the second data based on the second data, and determine a type of the target road surface based on the third data and a road surface classification artificial neural network, and wherein the road surface classification artificial neural network is trained as a frequency domain data set generated based on a sound signal reflected from a road surface of a second distance different from the first distance.

According to an embodiment of the present disclosure, the second data may be generated by correcting the first data based on the atmosphere information and the first distance.

In addition, the first distance may be estimated based on a transmission time of the sound signal and a reception time of the reflection signal.

According to an embodiment of the present disclosure, the third data may be acquired by converting the second data into STFT (Short-Time Fourier Transformation).

According to an embodiment of the present disclosure, the at least one processor may be configured to generate a signal for controlling a road surface management device installed on the target road surface based on the determined type of the target road surface.

According to various embodiments of the present disclosure, the road surface management device may include a heating wire device or a brine spray device.

According to an embodiment of the present disclosure, the at least one processor may be configured to determine whether a preset weather condition is satisfied, and when the preset weather condition is satisfied, generate a signal for controlling the road surface management device.

In addition, the at least one processor may be configured to determine whether the type of the target road surface determined at the first time is changed at the second time, and when a first class determined as the type of the target road surface at the first time and a second class determined as the type of the target road surface at the second time are different, determine to generate a signal for controlling the device installed on the target road surface based on the type of the target road surface determined at the third time.

According to an embodiment of the present disclosure, the type of the target road surface may be determined at every first period, and the at least one processor may be configured to determine the type of the target road surface at every second period when the type of the target road surface is determined as the first class.

According to an embodiment of the present disclosure, the electronic device may further include at least one of an IR sensor for acquiring temperature information of the target road surface or a vision sensor for acquiring image information of the target road surface, and the at least one processor may be configured to determine the type of the road surface further based on the temperature information or the image information.

According to various embodiments of the present disclosure, a method of classifying a road surface using a sound signal performed by an electronic device includes transmitting a sound signal toward a target road surface spaced apart from the electronic device by a first distance; receiving a reflection signal of the sound signal for the target road surface; acquiring atmosphere information related to the sound signal; acquiring first data for the received reflection signal; generating second data by correcting the first data based on the atmosphere information; acquiring third data related to frequency domain information of the second data based on the second data; and determining a type of the target road surface based on the third data and a road surface classification artificial neural network, wherein the road surface classification artificial neural network may be trained as a frequency domain data set generated based on a sound signal reflected from a road surface of a second distance different from the first distance.

According to the present disclosure, by rapidly and accurately classifying the types of road surfaces based on the ultrasound signal, the road surfaces classified according to the control or the control of the vehicle can prevent unoccupied accidents.

In addition, according to the present disclosure, by automatically controlling the road surface management using the road surface classification information, the road surface can be managed economically and efficiently.

In addition, the present disclosure can provide more effective transportation network information to the user by acquiring information on the road surfaces in real time.

Meanwhile, the effects of the present disclosure are not limited to the above-described effects, and the effects that are not mentioned can be clearly understood by those skilled in the art to which the present disclosure pertains from the specification and the accompanying drawings.

BRIEF DESCRIPTION OF DRAWINGS

FIG. 3 is a flowchart illustrating a method performed by a road surface classification device according to the present disclosure.

FIG. 7 is a diagram illustrating a method of acquiring a data set for learning a road surface classification artificial neural network according to various embodiments of the present disclosure.

FIG. 9 is a diagram illustrating a multi-modal artificial neural network according to an embodiment of the present disclosure.

FIG. 14 is a configuration diagram of a road surface type estimation device according to an embodiment of the present disclosure.

FIG. 16 is a diagram for exemplifying a signal converter in a road surface type estimation device using sounds according to an embodiment of the present disclosure.

FIG. 17 is a diagram for explaining an artificial neural network in a road surface type estimation device using sounds according to an embodiment of the present disclosure.

FIG. 19 is a diagram for describing a code of a convolution execution unit of a road surface type estimation device using sounds of the present disclosure.

FIG. 24 is a configuration diagram of a road condition monitoring system including a vision sensor and a sound sensor according to an embodiment of the present disclosure.

FIG. 31 is a detailed flowchart of an embodiment of the analysis by merging step 3050 of FIG. 30.

FIG. 32 is a configuration diagram of a road state monitoring system provided with a vision sensor and a sound sensor according to another embodiment of the present disclosure.

FIG. 33 is a flowchart of another embodiment of a monitoring method in a road state monitoring system provided with a vision sensor and a sound sensor according to an embodiment of the present disclosure.

FIG. 38 is a flowchart of a control method of a freezing prevention device of road according to an embodiment of the present disclosure.

DETAILED DESCRIPTION OF EMBODIMENTS

Figure 1:
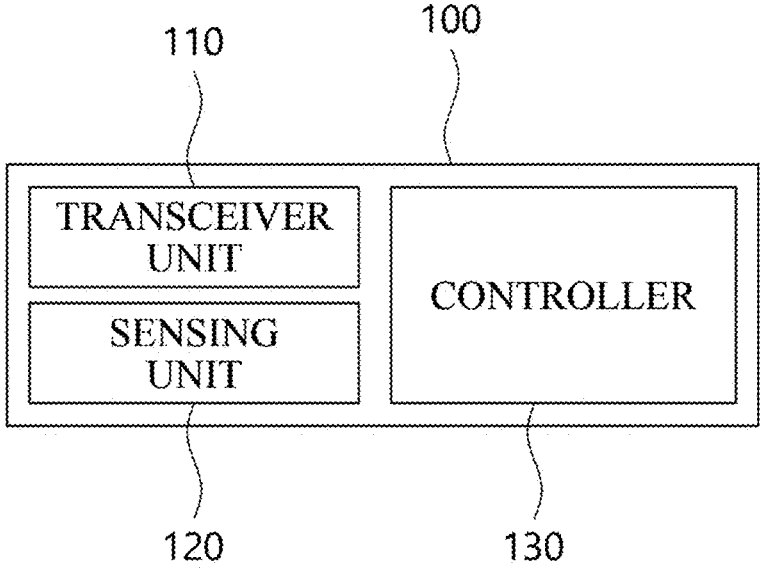
FIG. 1 is a block diagram of a road surface classification device according to various embodiments of the present disclosure.

Hereinafter, embodiments of the present disclosure will be described in detail with reference to the accompanying drawings. In describing the embodiments, descriptions of technical contents that are well-known in the art to which the present disclosure belongs and are not directly related to the present disclosure will be omitted. This is to clearly convey the subject matter of the present disclosure by omitting unnecessary descriptions.

For the same reasons, some components are exaggerated, omitted, or schematically illustrated in the accompanying drawings. In addition, the size of each component does not entirely reflect the actual size. In each drawing, the same or corresponding components are given the same reference numerals.

The advantages and features of the present disclosure, and methods of achieving them, will become apparent through the embodiments described in detail below with the accompanying drawings. However, it should be understood that the matter disclosed from the drawings does not specify or limit various embodiments, and that all changes, equivalents, and alternatives included in the spirit and technical scope of the various embodiments are included. Specific structural or functional descriptions of various embodiments are illustrated for the purpose of describing various embodiments only, and the embodiments of the present disclosure may be practiced in various forms and should not be construed as being limited to the embodiments explicitly described in this specification or the application.

That is, the embodiments of the present disclosure are provided so that the present disclosure is thorough and provides a given scope of the present disclosure to those of ordinary skill in the art to which the present disclosure belongs, and the invention of the present disclosure is defined only by the scope of the claims. Throughout the specification, the same reference numerals refer to the same components.

Terms such as "first" and/or "second" may be used to describe various components, but the components should not be limited by the terms. The terms are only for the purpose of distinguishing one component from another component, for example, the first component may be named as a second component, and similarly, the second component may be named as a first component, without deviating from the scope of the present concept.

It should be understood that when an element is referred to as being "connected" or "connected" to another component, it may be directly connected or connected to the other component, but other components may exist in the middle. On the other hand, when an element is referred to as being "directly connected" or "directly connected" to another component, it should be understood that there are no other components in the middle. Other expressions that describe the relationship between components, that are "between" and "immediately between" or "neighboring to" and "directly neighboring to" should be interpreted as well.

In the drawings, each block of the processing flowchart drawings and combinations of the flowchart drawings may be performed by computer program instructions. Since these computer program instructions may be mounted in a processor of a general-purpose computer, special purpose computer, or other programmable data processing device, the instructions performed through the processor of the computer or other programmable data processing device create means for performing the functions described in the flowchart block(s). Since these computer program instructions may be stored in a computer usable or computer readable memory that can direct a computer or other programmable data processing device to implement a function in a specific manner, the instructions stored in the computer usable or computer readable memory may produce a manufacturing item containing instruction means for performing the functions described in the flowchart block(s). Since the computer program instructions may be mounted on a computer or other programmable data processing device, the instructions performing the functions described in the flowchart block(s) may be provided in a computer or other programmable data processing device by generating a computer executed process by performing a series of operation steps on the computer or other programmable data processing device.

In addition, each block may represent a module, segment, or portion of code including one or more executable instructions for executing a specified logical function(s). In addition, it should be noted that in some alternative implementations, the functions mentioned in the blocks may occur out of order. For example, the two blocks shown in succession may be substantially simultaneously performed or the blocks may be performed in reverse order according to the functions corresponding to times.

The term "unit" used in this disclosure means software or hardware components such as Field Programmable Gate Array (FPGA) or Application Specific Integrated Circuit (ASIC). The "unit" performs specific roles, but is not limited to software or hardware. The "unit" may be configured to be in a storage medium that can be addressed or configured to reproduce one or more processors. Accordingly, according to some embodiments, the "unit" includes components such as software components, object-oriented software components, class components, and task components, processes, functions, attributes, procedures, subroutines, segments of program code, drivers, firmware, microcode, circuits, data, database, data structures, tables, arrays, and variables. The functions provided in the components and "units" may be combined into a smaller number of components and "units" or further separated into additional components and "units". In addition, the components and "units" may be implemented to reproduce one or more CPUs in a device or a secure multimedia card. In addition, according to various embodiments of the present disclosure, the "unit" may include one or more processors.

Hereinafter, the operating principles of the present disclosure will be described in detail with reference to the accompanying drawings. In describing the present disclosure in the following, a detailed description of related known functions or constructions will be omitted when it may make the subject matter of the present disclosure unnecessarily obscure. In addition, the terms described below are terms defined in consideration of the functions in the present disclosure, which may vary depending on the intention or customs of a user or an operator. Therefore, the definition should be made based on the contents throughout this specification.

The present disclosure relates to a system for classifying a road surface using a sound signal and managing a road surface or a vehicle operation therethrough.

The road surface classification device according to an embodiment of the present disclosure may include a device installed in a road infrastructure or a moving object and determining a type or state of the road surface.

The road surface classification device according to another embodiment of the present disclosure may include a server device that determines the type or state of the road surface based on information received from the device installed in the road infrastructure or the moving objects.

FIG. 1 is a block diagram of a road surface classification device according to various embodiments of the present disclosure.

Referring to FIG. 1, the road surface classification device 100 according to an embodiment of the present disclosure may include a transceiver unit 110, a sensing unit 120, and a controller 130. Meanwhile, the road surface classification device according to various embodiments of the present disclosure may include additional components in addition to the hardware components described above, and is not limited to the components illustrated in FIG. 1. FIG. 1 is a diagram for illustrating hardware components constituting the road surface classification device 100 of the present disclosure, and the road surface classification device according to another embodiment of the present disclosure may be configured by omitting some of the components illustrated in FIG. 1.

The transceiver unit 110 is a hardware component set to transmit and receive a sound signal, and may include a transmitter (not shown), a receiver (not shown), or a transceiver (not shown). Hereinafter, each of the transmitter and the receiver constituting the transceiver unit 110 will be described in detail.

The transmitter is a device that generates and launches a sound signal, and may be disposed in a direction in which the sound signal is launched toward the road surface. In this case, the launched sound signal may include a high-frequency ultrasound signal.

Meanwhile, the frequency of the generated sound signal may be fixed according to the type of the transmitter, and may be set or variable by a user input. In addition, the sound signal may be transmitted by a user input, a control of the controller or the server, or may be transmitted by a predetermined rule, or may be transmitted one or more signals periodically during one cycle. In this case, the number of sounds transmitted or the transmission period may be variable.

The receiver is a device that receives a sound signal reflected from the road surface, and may be disposed to receive the sound signal reflected from the road surface.

Meanwhile, the receiver may directly receive the sound signal transmitted from the adjacent transmitter except to the reflection signal. The signal directly received from the transmitter is a signal irrelevant to the classification of the road surface to be determined through the road surface classification device of the present disclosure, and this noise signal may be referred to as a cross-talk.

According to an embodiment of the present disclosure, the transmitter and the receiver may be installed to be spaced apart to reduce the occurrence of the cross-talk. In addition, according to another embodiment of the present disclosure, a structure may be additionally disposed between the transmitter and the receiver in order to reduce the occurrence of a disturbance of signal (for example, a cross-talk). The structure may be formed of a material or a structure having physical properties to attenuate or absorb sound signals, and may be an electronic device configured to implement such physical properties.

Meanwhile, the transmitter and the receiver are not necessarily physically distinguished within the road surface classification device of the present disclosure, but may be implemented as one integrated form, for example, a transceiver. In the following description, a transceiver is a term including both a transmitter, a receiver, or a transceiver, and a transceiver may mean a hardware device in which a transmitter and a receiver are integrated together, and may mean including both physically distinguished transmitters and receivers, or each of them.

The transceiver may transmit or receive sounds within an orientation angle range according to hardware performance. The road surface classification device 100 according to various embodiments of the present disclosure may use a transceiver having different orientation angle in consideration of the target or environment in which the road surface classification device is installed. For example, the orientation angle of the transceiver used in the road surface classification device disposed in the road infrastructure may be smaller than the orientation angle of the transceiver used in the road surface classification device installed in the vehicle.

When the transmitter and the receiver are configured to be distinguished from each other in the road surface classification device, the transmitter and the receiver according to various embodiments of the present disclosure may be arranged in consideration of the orientation angle between them. The receiver according to an embodiment of the present disclosure may be disposed outside the range of the orientation angle of the transmitter, and through this, the outermost sound signal of the orientation angle radiated by the transmitter may not be sensed in the receiver. The receiver according to another embodiment of the present disclosure may be disposed on the outer side based on the center of the transmitter's orientation angle so that the crosstalk signal sensed by the receiver is less than or equal to the reference value.

Meanwhile, the transceiver according to various embodiments of the present disclosure may be designed or arranged to react only to the specific frequency characteristic of the reflected wave for the road surface.

The sensing unit 120 is a hardware component that acquires information necessary for road surface classification according to the present disclosure through measurement, and the sensing unit 120 according to the present disclosure may include an atmosphere sensor, a camera and/or an IR sensor.

The sensing unit 120 according to various embodiments of the present disclosure may include an atmosphere sensor. The atmosphere sensor is a hardware device for acquiring information related to the atmosphere state, and the atmosphere information measured or acquired by the atmosphere sensor may include at least one of temperature, humidity, or atmospheric pressure. In addition, the atmosphere information may further include information on wind. In this case, the information on the wind may include physical amounts related to the wind, such as wind speed, wind volume, or wind direction. In this specification, the atmosphere sensor may mean a device including at least one of a temperature sensor, a humidity sensor, or an atmospheric pressure sensor. In addition, the atmosphere sensor may mean a device capable of sensing a plurality of different atmosphere information. The atmosphere sensor according to an embodiment of the present disclosure may measure the temperature, humidity, atmospheric pressure, and/or wind speed of the place where the road surface classification device is located.

The sensing unit 120 according to various embodiments of the present disclosure may further include a camera and/or an IR sensor. The camera is a device that acquires an image and can acquire image information on the road surface, and the IR sensor can acquire temperature information on the road surface by detecting radiant heat emitted from the road surface. Since the temperature information acquired by the IR sensor is temperature information on the road surface, and the temperature information acquired by the atmosphere sensor is temperature information on the atmosphere, the values indicated by each temperature information acquired by different sensors may be different.

Various information measured or acquired by the sensing unit 120 of the present disclosure may be used in combination to improve the accuracy of the road surface classification. That is, the road surface classification result output by the road surface classification device 100 according to various embodiments of the present disclosure may be generated based on a plurality of information, and specific embodiments thereof will be described below.

Meanwhile, according to an embodiment of the present disclosure, the camera and/or IR sensor included in the sensing unit 120 is exemplary, and the sensing unit 120 may further include any sensing device that acquires information that can be used to classify the road surface in addition to the above atmosphere sensor, camera, or IR sensor.

The controller 130 is configured to perform a method performed by the road surface classification device of the present disclosure, and may include at least one processor including a logic circuit and an arithmetic circuit. The controller 130 may process data according to a program and/or instructions provided from a memory (not shown) and generate a control signal according to the result of the processing.

According to various embodiments, the controller 130 may control at least one other component (e.g., a hardware or software component) of the road surface classification device 100 connected to the controller 130 and may perform various data processing or arithmetic operations. According to an embodiment, as at least a part of the data processing or arithmetic operation, the controller 130 may store a command or data received from another component (e.g., the receiver 120 or the sensing unit 120) in a volatile memory (not shown), process the command or data stored in the volatile memory (not shown), and store the resultant data in a non-volatile memory (not shown). For example, the signal acquired through the receiver 120 may be converted to a digital signal through an analog to digital converter (ADC) circuit included in the controller 130 and processed. In addition, the converted digital signal may be pre-processed as input data for input to the artificial neural network. A specific method of processing the reception signal and/or data of the present disclosure will be described below.

According to an embodiment, the controller 130 may include a main processor (e.g., a central processing unit (CPU) or an application processor (AP)) or an auxiliary processor (e.g., a graphic processing unit (GPU), a neural processing unit (NPU), an image signal processor, a sensor hub processor, or a communication processor) that can operate independently or together with the main processor. For example, when the road surface classification device 100 includes a main processor and an auxiliary processor, the auxiliary processor may be set to use lower power than the main processor or to be specific to a specified function. The auxiliary processor may be implemented separately from the main processor or as a part thereof.

The road surface classification device according to various embodiments of the present disclosure may include a communication unit (not shown). The communication unit refers to hardware components that receive commands or data input from a user or another external device, transmit commands or data generated by the road surface classification device to the outside, or transmit commands or receive commands from other components of the road surface classification device may include a wired and wireless communication module and/or input/output interface. The road surface classification device according to an embodiment of the present disclosure may receive information from an external electronic device (e.g., a controller or a management server installed outside of the road surface classification device) or transmit information generated by the road surface classification device to the external electronic device. Meanwhile the communication unit may be implemented separately implemented by a circuit element included in the control That is, the road surface classification device according to various embodiments of the present disclosure may be a device that provides information necessary to classify the road surface in conjunction with an external electronic device.

According to an embodiment of the present disclosure, the artificial neural network (not shown) for classifying the road surface of the present disclosure may be included and provided in the controller 130 as a software-on-chip (SOC) or micro controller unit (MCU). Alternatively, the artificial neural network may be provided in the form of software operating by the controller 130 and updated by communication unit from an external server or user input.

Meanwhile, the artificial neural network according to various embodiments of the present disclosure may be implemented in an external electronic device (e.g., the controller or the server), and in this case, data generated based on the sound signal and data necessary for road surface classification, such as atmosphere information, may be transmitted from the controller 130 of the road surface classification device to the external electronic device, and the external electronic device may classify the road surface based on the data received from the road surface classification device.

According to another embodiment of the present disclosure, the road surface classification device may be a server device. In this case, the road surface classification device may not include the transceiver unit 110 and the sensing unit 120, and may receive data necessary for road surface classification from an external electronic device through a communication unit (not shown), and may classify the road surface through the controller 130 based on the received data. In addition, the classified road surface classification result and/or control information related thereto may be transmitted to an external electronic device.

Figure 2:
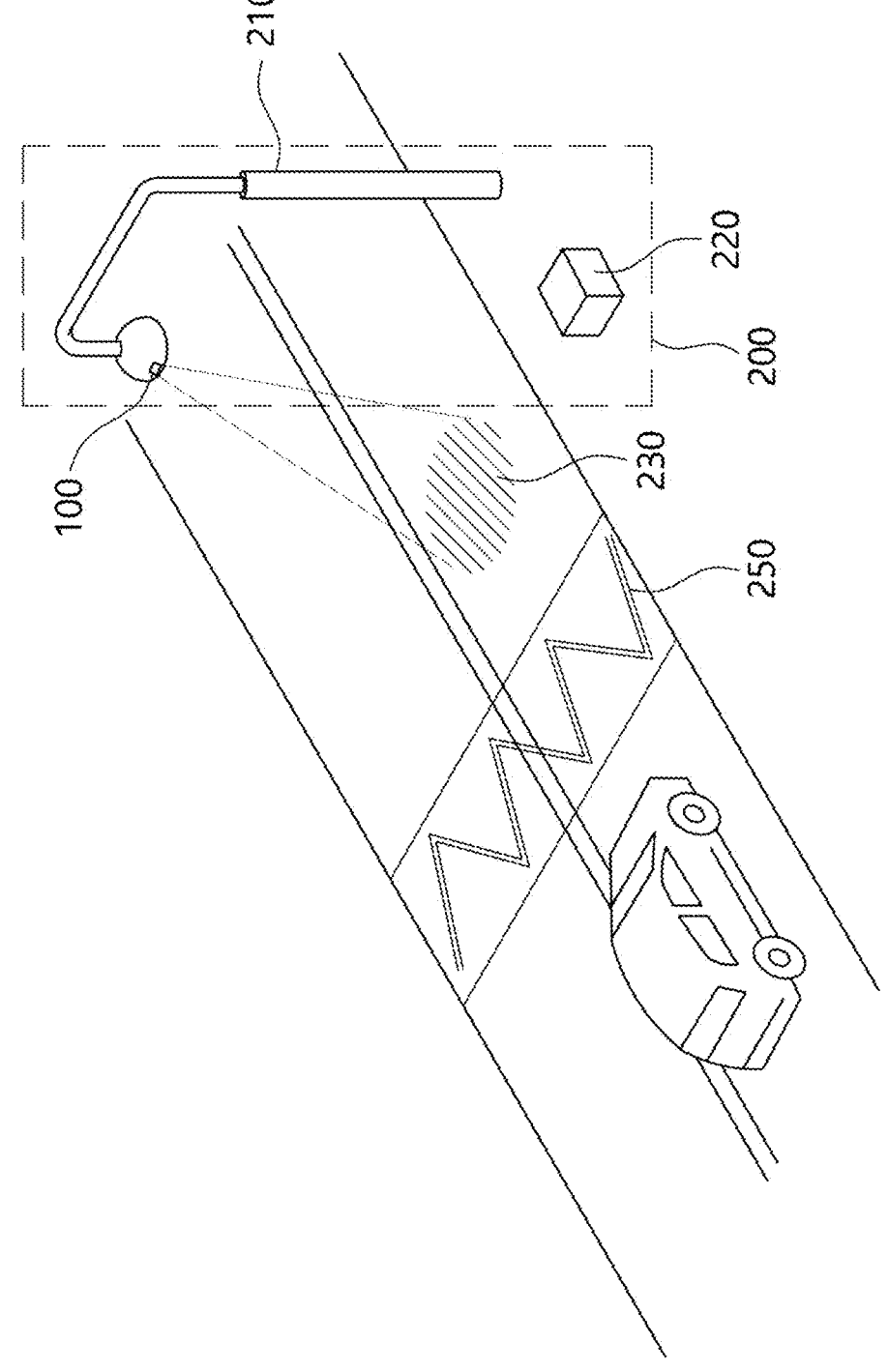
FIG. 2 is a diagram illustrating that a road surface classification device according to an embodiment of the present disclosure is installed and operated in a road infrastructure.

FIG. 2 is a diagram illustrating that a road surface classification device according to an embodiment of the present disclosure is installed and operated in a road infrastructure.

Referring to FIG. 2, the road surface classification device 100 may be installed to face the road surface 230 to be classified by the road infrastructure 200.

In the present disclosure, the road infrastructure 200 is a generic term for traffic facilities including a pillar-shaped structure 210 such as a signal lamp, a street lamp, a road guide signboard, or an image information processing device installed on or on the road side, and means a structure that can be installed with a road surface classification device on the road, and is not limited to the above example. According to an embodiment of the present disclosure, the fact that the road surface classification device 100 is installed in the road infrastructure 200 may mean that it is installed at the upper end of the pillar-shaped structure 210, but is not limited thereto.

The road infrastructure 200 may include a controller 220 for controlling electronic devices installed in the pillar-shaped structure 210. The electronic device installed on the pillar-type structure 210 may include a light emitting device used for streetlamps or signal lamps, CCTV, a traffic information collection camera, or a road surface classification device of the present disclosure.

The controller 220 is a device that controls electronic devices installed on the pillar-shaped structure 210, and for example, may be a street light controller that controls the operation of the streetlight, and when the pillar-shaped structure is a streetlight, and may be a traffic signal controller that controls the signal of the signal light when the pillar-shaped structure is a signal light.

The controller 220 according to various embodiments of the present disclosure may control the operation of the road surface classification device 100 of the present disclosure, and may control the road surface where the road infrastructure 200 is located based on the road surface classification information or command obtained from the road surface classification device 100.

The controller 220 according to various embodiments of the present disclosure may serve as a gateway between the road surface classification device 100 and a management server (not shown). That is, the controller 220 may include a wired/wireless communication module and transmit information obtained from the road surface classification device to the management server or receive commands or data for controlling the road surface classification device or the road from the management server.

The controller 220 according to various embodiments of the present disclosure may include the artificial neural network of the present disclosure, and through this, the road surface may be directly classified based on information acquired from the road surface classification device. In this case, since the performance of the processor or memory included in the controller 220 may be superior to the performance of the processor or memory of the road surface classification device, the artificial neural network provided to the controller 220 may be superior to the performance of the artificial neural network provided to the road surface classification device 100.

The controller 220 according to various embodiments of the present disclosure may control the road surface management device 250 equipped in the road based on the classified road surface to manage the road surface.

The road surface management device 250 according to various embodiments of the present disclosure may include a snow removal device such as a heating wire device or a brine spray device installed on a road, or a drainage facility. Details of the operation of the road surface management device according to various embodiments of the present disclosure will be described later.

Hereinafter, a method of classifying a road surface by the road surface classification device according to the present disclosure will be described in detail.

In general, because different materials have different acoustic impedances, the reflection signals for the same sound incident signals vary for each material. Therefore, by using these physical properties, the material can be distinguished by analyzing the reflection signal. In particular, since the acoustic impedance is a physical quantity having frequency characteristics, if the reflection signal is analyzed in the frequency domain, the material of the reflected surface can be more finely classified.

An artificial neural network may be used to perform a road surface classification method using sound reflection signals according to various embodiments of the present disclosure.

The neural network model of the artificial neural network according to various embodiments of the present disclosure may include a plurality of hierarchy or layers.

The neural network model may be implemented in the form of a classifier that generates road surface classification information. The classifier can perform multiple classifications. For example, a neural network model may be a multiple classification model that classifies results for input data into multiple classes.

The neural network model according to an embodiment of the present disclosure may include a deep neural network (DNN) of a multi-layer perceptron algorithm including an input layer, a plurality of hidden layers, and an output layer.

The neural network model according to another embodiment of the present disclosure may include a convolutional neural network (CNN). As a CNN structure, at least one of AlexNet, LENET, NIN, VGGNet, ResNet, WideResnet, GoogleNet, FractaNet, DenseNet, FitNet, RitResNet, High-wayNet, MobileNet, DeeplySupervisedNet can be used. The neural network model may be implemented using a plurality of CNN structures.

For example, the neural network model may be implemented to include a plurality of VGGNet blocks. As a more specific example, a neural network model may be provided by combining a first structure in which a CNN layer having 64 filters of 3×3 size, a Batch Normalization (BN) layer, and a ReLU layer are sequentially combined, and a second block in which a CNN layer having 128 filters of 3×3 size, a ReLU layer, and a BN layer are sequentially combined.

The neural network model may include a Max pooling layer following each CNN block, and may include a Global Average pooling (GAP) layer, a Fully Connected (FC) layer, and an activation layer (e.g., sigmoid, soft max, and the like) at the end.

The artificial neural network according to various embodiments of the present disclosure refers to a neural network model for extracting characteristics from a frequency-converted signal of a sound signal to classify a road surface, and is not limited to the above example.

The road surface classification artificial neural network according to various embodiments of the present disclosure may be trained by using frequency domain data of a reflection signal as an input value, and the trained artificial neural network may classify a road surface from which the target signal is reflected by using frequency domain data of the target signal as an input value.

The frequency domain data may mean to data obtained by performing frequency domain transformation on a digital signal converted through ADC sampling of the reflection signal.

As the frequency domain transformation method according to various embodiments of the present disclosure, Short-Time Fourier Transform (STFT), Fast Fourier Transform (FFT), cepstrum (cepstruam) transform, wavelet transform, cross-correlation method, convolution transform, and the like may be used. The above-described frequency domain transformation method is exemplary, and is not limited to the listed transformation methods, and various transformation or analysis methods for analyzing a sound signal in the time domain in the frequency domain may be used.

As an example of the frequency domain data according to various embodiments of the present disclosure, spectrogram data obtained through STFT transformation may be included.

As another example of the frequency domain data according to various embodiments of the present disclosure, data obtained by applying cross-correlation method may be included. In this case, cross-correlation synthesis for input data may correspond to the step of inputting data to the convolution layer, so CNN-based learning and classification may be possible using the step.

Meanwhile, the frequency domain data used for learning may be labeled with information necessary for road surface classification. In this case, the labeled information may include road surface type and/or atmosphere information.

According to an embodiment of the present disclosure, in order to train the road surface classification artificial neural network, the learning data set may include a data set in which the type of road surface from which each data is obtained is labeled in the frequency domain data.

The type of road surface classified by the road surface classification device according to an embodiment of the present disclosure may include asphalt, cement, soil, ice, marble, paint, slush (which is mixed with water), snow, water and so on. The listed classes are exemplary, and in various embodiments of the present disclosure, the number or group of classes to be classified according to the situation may vary. Meanwhile, instead of using this direct labeling method or group name, each input data may be grouped like the first class and the second class in a random manner. This random grouping may be a result of classification using an unsupervised neural network where the training data does not include labels. but it is not limited thereto.

FIG. 3 is a flowchart illustrating a method performed by the road surface classification device according to the present disclosure. According to various embodiments, the operations illustrated in FIG. 3 are not limited to the order illustrated, but may be performed in various orders. In addition, according to various embodiments, more operations than the operations illustrated in FIG. 3 may be performed, or at least one operation less than the operations illustrated in FIG. 3 may be performed. FIGS. 4 to 12 may be referred to as drawings for explaining the operations illustrated in FIG. 3.

Referring to FIG. 3, in step 301, the road surface classification device according to various embodiments of the present disclosure may transmit or launch a sound signal toward the classification target road surface using a transmitter. In step 301, the sound signal may be transmitted at least once, and the number of transmission times or transmission periods of the signal may be changed according to a user input, a preset condition, or a control of a server. When the sound signal is transmitted multiple times within one determination period, since a plurality of data for classification or state determination of the road surface may be acquired, the accuracy of the road surface classification may be improved. A detailed embodiment of the period of transmitting the sound signal and the operation of transmitting the multiple times within one period will be described below with reference to FIG. 4.

In step 302, the road surface classification device may receive a signal reflected from the target road surface using a receiver. Since the reflection signal is a reflected signal for the transmitted sound signal, the sound signal and the reflection signal may correspond to each other. When a plurality of sound signals are transmitted, the reflection signal may be received multiple times.

In the case of transmitting the sound signal, the road surface classification device according to various embodiments of the present disclosure may acquire atmosphere information through the atmosphere sensor of the sensing unit 120. In this case, the time when the atmosphere information is acquired does not necessarily need to be matched with the time when the sound signal is transmitted, and it means that there is a correspondence with each other within a predetermined time interval. That is, the road surface classification device may acquire atmosphere information corresponding to one sound signal or acquire one atmosphere information corresponding to a plurality of sound signals. The road surface classification device according to various embodiments of the present disclosure may process the reflection signal corresponding to the sound signal based on the atmosphere information corresponding to the launched sound signal.

Meanwhile, the time from when one sound signal is transmitted from the transmitter to when the reflection signal is received by the receiver may be defined as the time of flight (ToF). Since the propagation speed of the sound in the atmosphere may be determined under a specific weather condition, the distance between the road surface classification device and the target road surface may be measured based on the ToF and the atmosphere information. Conversely, when the distance between the road surface classification device and the target road surface is known in advance, the ToF may be estimated. Therefore, the road surface classification device according to various embodiments may identify the reception signal corresponding to the sound signal transmitted from the transmitter. That is, by determining the reception interval of the reception signal corresponding to the sound signal transmitted from the transmitter, the signal received in that interval can be determined as a reflection signal for the transmitted sound signal, and the signal received in other intervals can be considered as noise or as a reflection signal for another sound signal. A detailed embodiment of a control method of a road surface classification device that controls a noise signal using this will be described later with reference to FIG. 5.

In step 303, the road surface classification device 100 may pre-process the received reflection signal through a controller to acquire data for input to the road surface classification artificial neural network according to the present disclosure. In the present disclosure, the preprocessing of the signal means an integral process of acquiring data for input to the artificial neural network based on the received reflection signal, and the preprocessing operation in step 303 may include an operation of sampling an analog signal into a digital signal, an operation of correcting an amount of attenuation or ToF correction for the sampled signal, a frequency domain transformation operation and so on. A preprocessing process for acquiring input data for the road surface classification artificial neural network according to various embodiments of the present disclosure will be described in detail with reference to FIGS. 6 to 8.

In step 304, the input data acquired through the preprocessing process may be input to the road surface classification artificial neural network. Meanwhile, the road surface classification artificial neural network according to various embodiments of the present disclosure may be trained as a learning data set including a plurality of data acquired for various road surfaces to classify the road surface. The trained road surface classification artificial neural network may output results based on the input data.

The output result according to an embodiment of the present disclosure may include information related to a probability value for each of the classification classes of the road surface. When the artificial neural network model is trained to divide the road surface into a plurality of types, the probability that the target road surface corresponds to each of the plurality of road surface types may be expressed by numerical values and output. In this case, one or more classes may be output in the order of the probability of the output classes of the road surface.

The output result according to another embodiment of the present disclosure may be output by determining a specific class from among the plurality of classes. In this case, the probability value for the corresponding class may be equal to or greater than a threshold or a difference between the probability value and the second class may be equal to or greater than a threshold.

Meanwhile, the output result of the road surface classification artificial neural network according to various embodiments of the present disclosure is information related to the material or state of the road surface, and may be output in a necessary form to the user according to the design of the artificial neural network without being limited to the above example.

In step 305, the road surface classification device may perform various operations according to the output results. By changing or adding a control operation based on the road surface classification result, the accuracy of the result or the efficiency of the road surface management may be improved.

According to various embodiments of the present disclosure, when an output result differs from an immediately preceding output result, a process of comparing the output result with the immediately preceding output result may be performed prior to controlling the road surface by the output result in order to distinguish whether the change in road surface condition is due to a change in weather conditions or an output error. Specific embodiments of this will be described in detail with reference to FIGS. 10 and 11. In this case, the road surface classification device may change the frequency or number of transmissions of the sound signal based on the output result.

According to various embodiments of the present disclosure, when the output result is related to a specific class (e.g., snow, ice, or slush), a command or signal for controlling the road surface may be generated and transmitted through the road surface management device. An embodiment of managing the road surface according to the output result will be described in detail with reference to FIG. 12.

Figure 4:
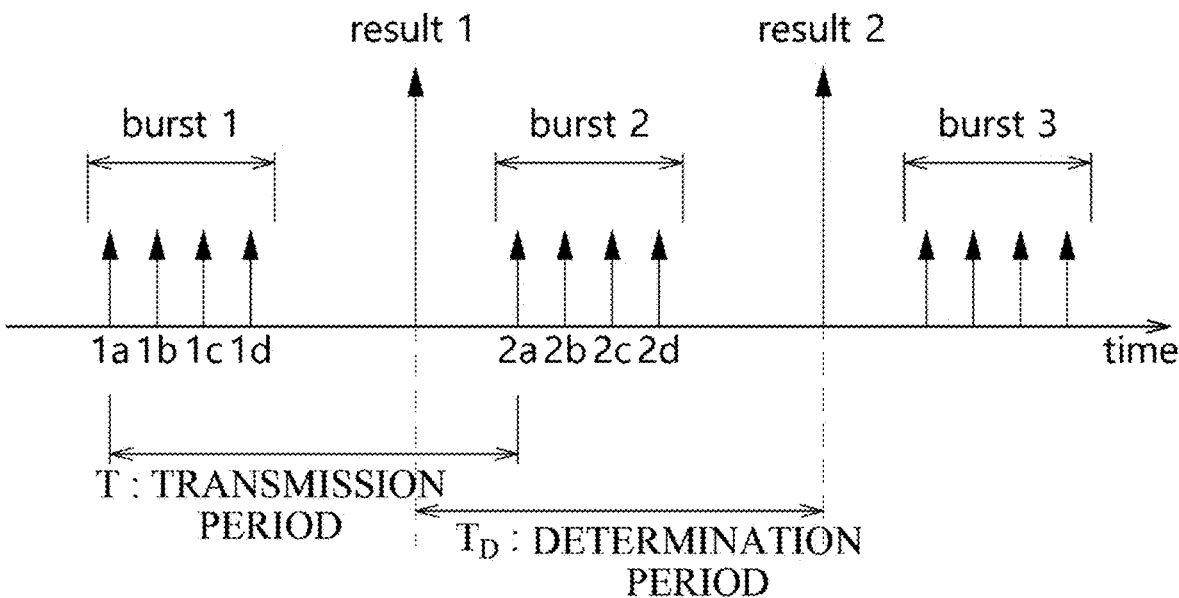
FIG. 4 is a diagram illustrating a sound signal transmitted from a road surface classification device according to various embodiments of the present disclosure on a time axis.

FIG. 4 is a diagram illustrating a sound signal transmitted by a road surface classification device according to various embodiments of the present disclosure on the time axis.

Referring to FIG. 4, the sound signal may be transmitted a plurality of times within one transmission period. In the present disclosure, a set of sound signals transmitted within one transmission period to determine the road surface state is called a burst.

The number of sound signals included in one burst may be changed according to a user setting or a predetermined rule. In addition, the interval between the sound signals included in one burst may be changed according to a user setting or a predetermined rule. The interval between the sound signals included in a burst may be constant or not. In addition, the intensity of the sound signals included in one burst may be the same or different from each other.

In the present disclosure, the number, interval, intensity, and duration of the sound signals included in one burst are called a burst configuration. In the present disclosure, different bursts may have the same or different burst configuration. The burst configuration for each burst may be changed according to a user setting or a predetermined rule.

The number of sound signals included in a burst according to an embodiment of the present disclosure may be one.

The number of sound signals included in a burst according to another embodiment of the present disclosure may be a plurality.

In the present disclosure, the transmission period means the transmission interval of the burst for the road surface classification device to classify the state or material of the target road surface. When the burst is composed of one signal, that is, if only a single signal is transmitted, the transmission period may mean the time interval between the regularly transmitted adjacent sound signals. Referring to FIG. 4, the transmission period may correspond to the time interval between the first signal 1*a* included in burst 1 and the first signal 2*a* included in the next burst 2. The transmission period may be changed according to a user setting or a predetermined rule.

According to various embodiments of the present disclosure, the number and/or transmission period of the sound signals included in a burst may be changed according to the result of the road surface classification or the weather condition. For example, in certain weather conditions, such as when it is snowing or the temperature is below freezing, the number of sound signals transmitted may be increased or the transmission period may be changed short to improve the accuracy of the road surface classification. A specific embodiment thereof will be described in detail with reference to FIGS. 10 and 11.

Meanwhile, according to various embodiments of the present disclosure, the transmission period may vary according to the installation position of the road surface classification device or objects. This is to distinguish between the reflected reception signal from the road surface and the crosstalk signal caused by the transmission signal from the transmitter. The transmission period of road classification devices installed in road infrastructure may be longer than that of road classification devices installed in vehicles. Therefore, the determination period of the road surface classification device installed in the road infrastructure may be longer than the determination period of the road surface classification device installed in the vehicle.

According to various embodiments of the present disclosure, the road surface classification device may measure or determine the ToF for the target road surface or the object. For example, the road surface classification device may transmit one or more sound signals and determine the ToF for the target road surface or the object based on the reception signal. Alternatively, the ToF may be determined based on the distance between the road surface classification device and the target road surface.

The road surface classification device according to various embodiments of the present disclosure may determine an appropriate transmission period and burst configuration based on the determined ToF and transmit with the determined transmission period and burst configuration. The transmission period according to an embodiment of the present disclosure may be set longer than the ToF for the road surface. The duration of the burst according to an embodiment of the present disclosure may be set shorter than the transmission period.

In the road surface classification result of the target road surface by the road surface classification device according to various embodiments of the present disclosure, one result corresponding to one burst may be output. Alternatively, the road surface classification device may display the classification result for all the sound signals included in one burst. When one result is output, the result may be output based on a plurality of classification results for each of the plurality of sound signals included in the burst.

Referring to FIG. 4, the first result (result 1) is the road surface classification result obtained by the first burst (burst 1) based on the reflection signal for the road surface. In this case, the first result may be the result obtained based on the road surface classification result of each of the signals 1*a*, 1*b*, 1*c*, and 1*d* included in the first burst. For example, the most frequent value of the results of 1*a*, 1*b*, 1*c*, and 1*d* may be output as the result. Alternatively, the road surface classification result for the first burst may be output based on the average value obtained by summing the results of 1*a*, 1*b*, 1*c*, and 1*d*.

In the present disclosure, the time interval between the road surface classification results of the adjacent bursts, that is, the time interval between the first result and the second result, may be referred to as the determination period for the road surface classification. The determination period may coincide with the transmission period. However, in the case of the determination process, since the output time may be irregular according to the operation of processing the signal, the determination period may not be constant or may not coincide with the transmission period.

The road surface classification device according to various embodiments of the present disclosure may change the transmission period in order to change the determination period. Alternatively, the determination period may be changed according to a user setting or a predetermined rule. A detailed embodiment of changing the determination period will be described in detail with reference to FIGS. 10 and 11.

Figure 5:
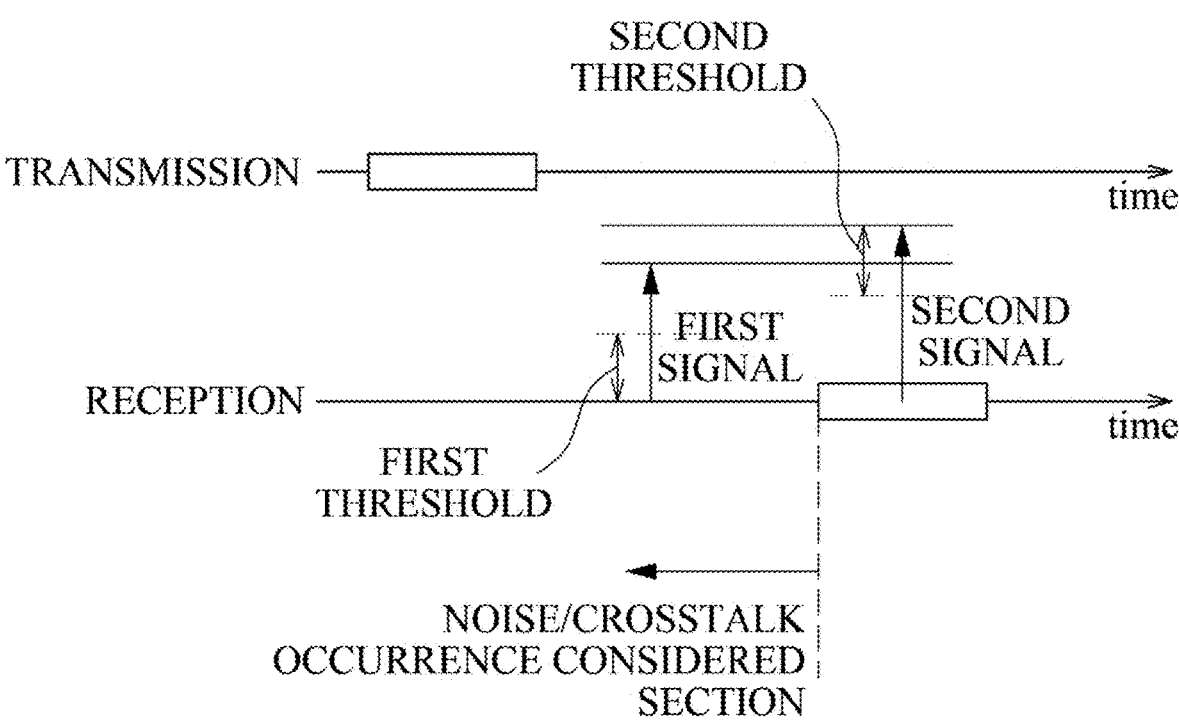
FIG. 5 is a diagram illustrating a transmission interval of a sound signal and a reception interval of a reflection signal according to an embodiment of the present disclosure.

FIG. 5 is a diagram illustrating the transmission period of the sound signal and the reception period of the reflection signal according to an embodiment of the present disclosure.

Referring to FIG. 5, the road surface classification device may transmit a burst or sound signal in the transmission period. Although the case that one signal is transmitted for convenience of explanation, present disclosure is not limited to illustrate. In other words, it can be understood that transmitting a sound signal by a road surface classification device in this disclosure includes transmitting a burst consisting of a plurality of signals with a period as well as emitting one signal in a single case.

As described above, the road surface classification device according to various embodiments of the present disclosure may determine the ToF for the road surface of the transmitted sound signal, and thus may predetermine the corresponding reception interval for one transmission interval.

According to various embodiments of the present disclosure, when a signal is sensed by the receiver before the reception interval, the road surface classification device may regard it as a noise signal or a crosstalk signal, and may control the transmitter of the road surface classification device to reduce it.

Specifically, referring to FIG. 5, when the intensity of the first signal received before the reception interval is greater than the first threshold, or when the difference between the intensity of the second signal received in the reception interval and the intensity of the first signal received before the reception interval is less than the second threshold, the power supplied to the transmitter may be changed to control this. The first threshold and/or the second threshold may be predetermined or set by a user input or an external device.

For example, when the intensity of the first signal is greater than the first threshold, it may be determined that the influence of the crosstalk is large and may be controlled to reduce the vibration of the transmitter. Alternatively, when the intensity of the second signal is smaller than the intensity of the first signal, it may be determined that the noise caused by the external environment is larger than the reception signal and may be controlled to increase the vibration of the transmitter. According to an embodiment of the present disclosure, the vibration of the transmitter may be controlled by adjusting the magnitude of power supplied to the transmitter.

Figure 6:
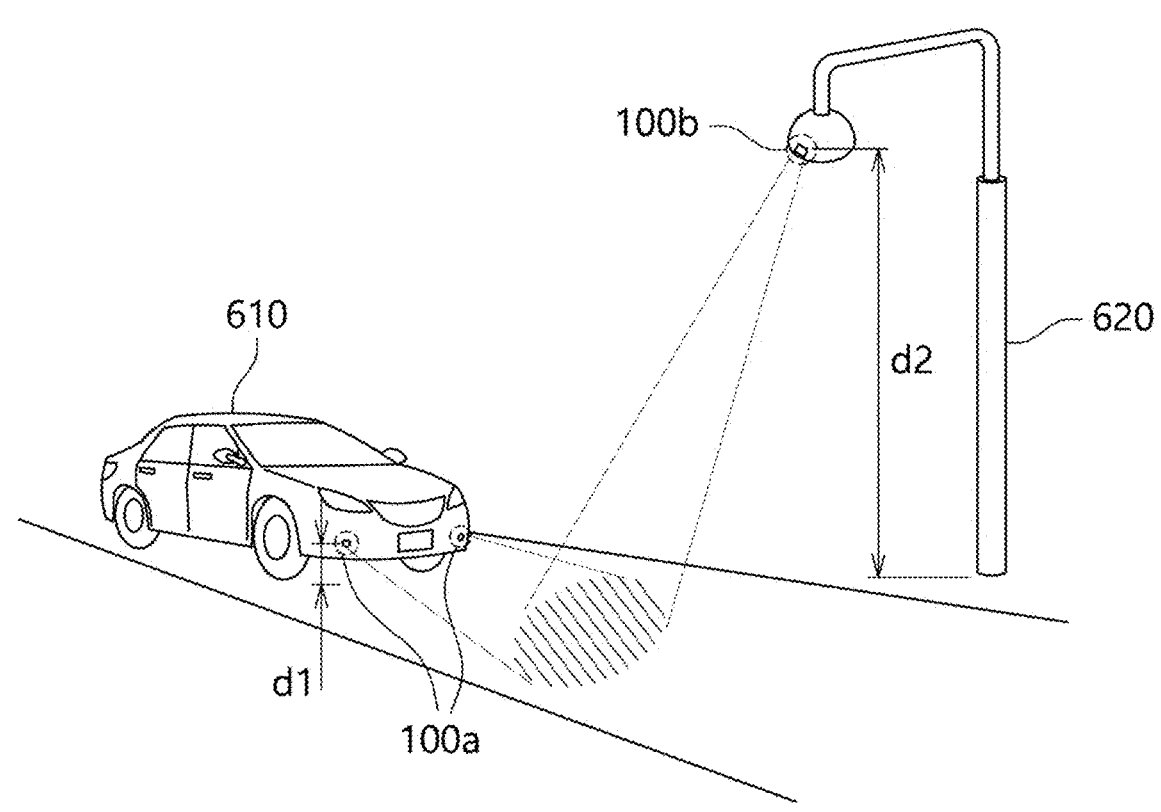
FIG. 6 is a diagram illustrating an object to which a road surface classification device according to various embodiments of the present disclosure is installed.

FIG. 6 is a diagram illustrating an object to which a road surface classification device according to various embodiments of the present disclosure is installed.

Referring to FIG. 6, the road surface classification device 100 according to various embodiments of the present disclosure may be installed in the moving object 610 or the road infrastructure 620. In this case, the road surface classification device 100*a* installed on the moving object 610 such as the vehicle and the road surface classification device 100*b* installed on the road infrastructure 620 have different heights for the road surface, so the ToF of the transmission sound signal is different.

Since sounds propagate through the space, the amplitude decreases as the distance from the sound source increases, and if they proceed in air, attenuation by the medium occurs. Therefore, the characteristics of the reflection signals for the road surfaces having different ToFs may different even if they are in the same state.

Meanwhile, the road surface classification device of the present disclosure uses an artificial neural network to classify the road surface based on a reflection signal for the road surface, so many data sets are needed to train the artificial neural network.

FIG. 7 is a diagram illustrating a method of acquiring a data set for learning a road surface classification artificial neural network according to various embodiments of the present disclosure.

Referring to FIG. 7, a learning data set for learning artificial neural networks for road surface classification according to various embodiments of the present disclosure may be acquired for various road surfaces for each road surface classification (class) using a transceiver included in the mobile measurement equipment 700. In general, it is important to collect a large amount of data in various terrains and environments to improve the classification performance of the artificial neural network, and for this, it is important to collect data using equipment that is easy to move.

The mobile measuring equipment 700 of the present disclosure refers to a sensor device mounted on equipment that moves on a road, such as bicycles, cars, or scooters, and may include equipment that can be moved by humans or mechanical devices.

Meanwhile, the ToF of the learning data collected by the mobile measuring equipment 700 may be similar to the ToF of the road surface classification device 100*a* installed in the moving object 610 such as the vehicle of FIG. 6. Alternatively, the location of the mobile measuring equipment relative to the ground may be installed in consideration of the location of the road surface classification device installed in the moving object relative to the ground. In this case, the road surface classification artificial neural network trained with the learning data set acquired by the mobile measuring equipment according to various embodiments of the present disclosure may be used directly in the road surface classification device 100*a* installed in the moving object without any additional correction on the reflection signal.

However, as shown in FIG. 6, when the road surface classification device is installed at a different height from the moving object such as the road infrastructure (100*b*), and the reflection signal acquired by the road surface classification device is directly input to the road surface classification artificial neural network, the classification accuracy of the target road surface may be lowered.

Figure 8:
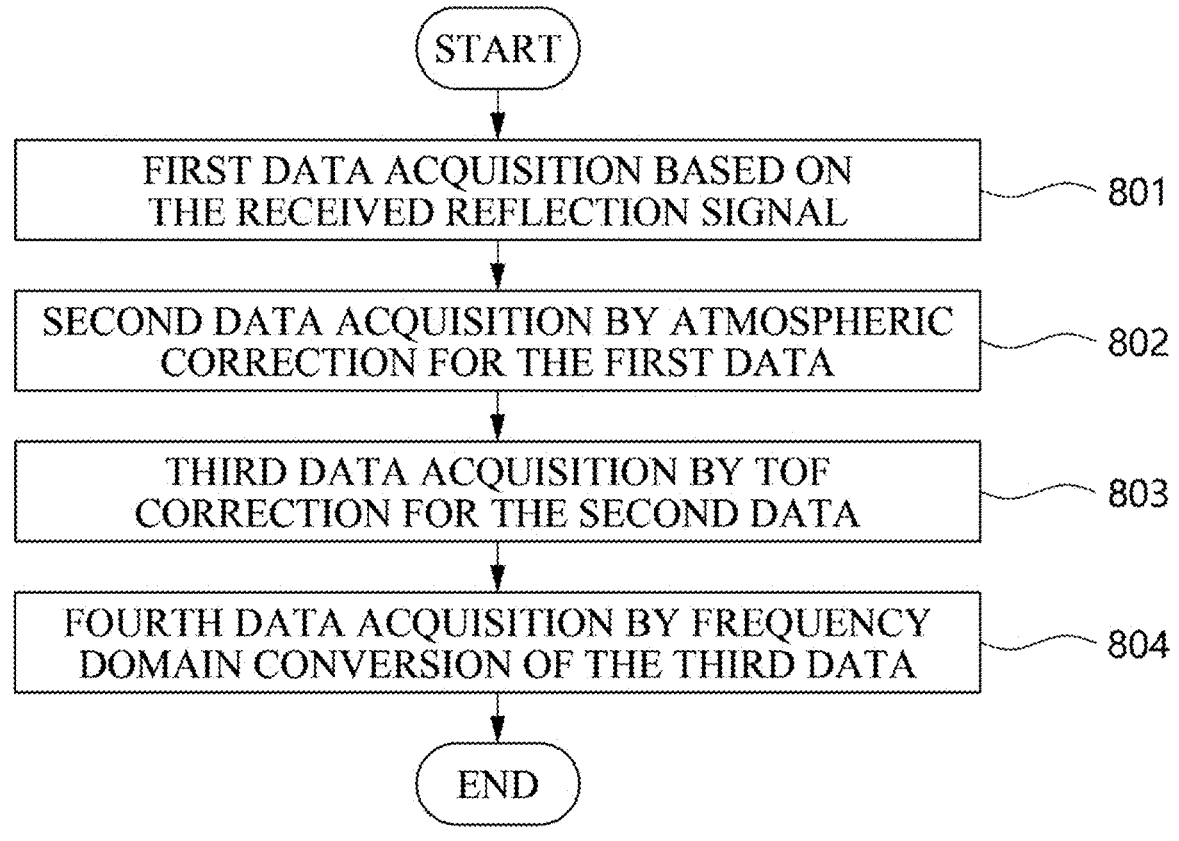
FIG. 8 is a flowchart illustrating a process of preprocessing a reflection signal received by a road surface classification device according to various embodiments of the present disclosure.

FIG. 8 is a flowchart illustrating a process in which the road surface classification device according to various embodiments preprocesses the received reflection signal. The preprocessing process of FIG. 8 is an example for expressing the technical idea of the present disclosure, and according to various embodiments, more operations may be performed or fewer at least one operation may be performed than the operations illustrated in FIG. 8.

In operation 801, the road surface classification device according to various embodiments of the present disclosure may acquire first data based on the received reflection signal.

As described above, the reflection signal received through the receiver may be an analog signal, and thus the road surface classification device of the present disclosure may convert the reflection signal into a digital signal through the ADC circuit included in the controller 130. Alternatively, the transceiver included in the road surface classification device according to one embodiment of the present disclosure may process the reflection signal reflected through the road surface in the form of a digital signal to acquire the first data.

In operation 802, the road surface classification device according to various embodiments of the present disclosure may acquire second data by applying atmospheric correction to the data converted into the digital signal.

The sound propagates in the air and is attenuated due to the influence of the medium, and the amount of attenuation is determined by the propagation distance and the attenuation coefficient. Meanwhile, since the attenuation coefficient is a number determined based on temperature, humidity, air pressure, and the frequency of the sound signal, the road surface classification device according to various embodiments of the present disclosure can calculate the amount of attenuation of the sound signal based on this.

The road surface classification device according to various embodiments a may generate second data by correcting the attenuation of the received reflection signal based on the atmosphere information such as temperature, humidity, air pressures and so on, acquired through the atmosphere sensor.

Meanwhile, the propagation distance of the sound required for the atmospheric correction may be input in advance by the user or may be acquired based on ToF. That is, depending on the position at which the road surface classification device is installed, distance information on the road surface may be input in advance, or as described above, distance information on the road surface may be acquired based on ToF information and atmosphere information acquired by the road surface classification device.

In step 803, the road surface classification device according to various embodiments of the present disclosure may acquire third data by applying distance correction to the second data that corrected the amount of attenuation at atmosphere.

As described above, referring to FIGS. 6 and 7, the sound signal, which is the basis of the learning data of the road surface classification artificial neural network according to various embodiments of the present disclosure, may be a signal obtained by being reflected at a distance d1 from the road surface. Therefore, in order to increase the classification performance of the road surface classification device 100*b* installed at a height d2 different from d1, the sound signal acquired at d2 may be corrected as if it is the sound signal acquired at d1.

Meanwhile, steps 802 and 803 may be performed in one procedure. For the digital signal obtained in step 801, sound data in which the amount of atmospheric attenuation and the distance to the road surface are corrected based on the atmosphere information and the distance information may be obtained.

In addition, the correction procedure of step 802 and/or 803 may be omitted depending on the installation position of the road surface classification device according to various embodiments of the present disclosure.

In step 804, the road surface classification device according to various embodiments of the present disclosure may acquire frequency domain data by performing transformation to analyze the corrected sound data in the frequency domain. The frequency domain transformation method according to various embodiments of the present disclosure is as described above. The obtained frequency domain data is input data for the road surface classification artificial neural network according to various embodiments of the present disclosure, and when the frequency domain data is input to the road surface classification artificial neural network, the road surface classification artificial neural network may output the road surface classification result for the target road surface.

The road surface classification device according to various embodiments of the present disclosure may output the result based on additional information other than the sound signal. Other information that may be additionally acquired other than the sound signal may include image information acquired through the vision sensor (camera), road surface temperature information acquired through the IR sensor, and environment information acquired through the communication unit.

According to an embodiment of the present disclosure, the road surface classification device may combine two or more different determination criteria.

Since the area that may be identified through the sound may correspond to a part of area of the road surface, image information that may be identified in a wider area may be used assistance in the road surface classification result. For example, it may be determined as effective road surface information only when the results identified through the image information and the output value of the road surface classification artificial neural network match. Meanwhile, the road surface classification device according to various embodiments of the present disclosure may further include a separate image-based road surface classification artificial neural network for obtaining the road surface classification result for the image information.

In addition, according to various embodiments, the road surface classification device may verify the result value for a specific road surface state by applying a specific temperature condition. For example, when the road surface temperature is higher than 0 degrees Celsius, ice cannot be physically formed under atmospheric pressure, and thus when the road surface classification result is classified as ice under the corresponding temperature condition, it may be determined to correspond to an error. Therefore, when the road surface or the atmosphere temperature acquired through the IR sensor or the atmosphere sensor of the sensing unit is confirmed to be above a specific temperature, if the state of the road surface indicated by the road surface classification result is related to ice, an additional operation may be performed instead of outputting the corresponding result. Alternatively, when the road surface temperature is above or below the specific temperature, the result may be further utilized for the image information to output the result.

In addition, according to various embodiments of the present disclosure, the road surface classification device may output the road surface classification result in further consideration of the weather environment information. For example, when receiving weather environment information related to the weather, such as when it's snowing or raining, the ranking of the road surface classification result for the class that is highly to be classified in the corresponding weather may be adjusted.

Meanwhile, since the above-described image information and the temperature information are useful information for classifying the state of the road surface, the road surface classification artificial neural network may enhance the learning performance and the classification performance by receiving related additional data together instead of learning only with data based on the sound signal.

Figure 9:
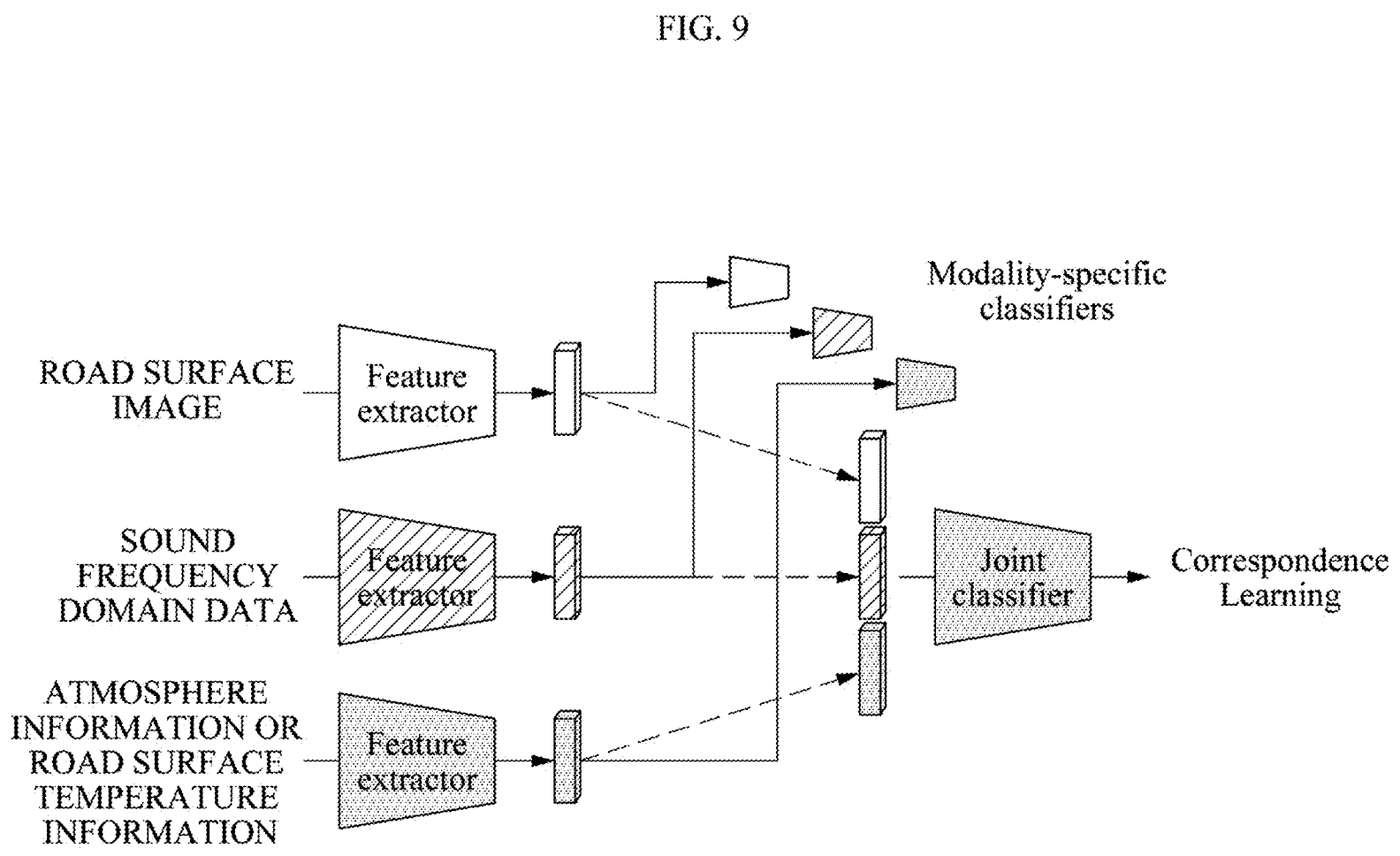

FIG. 9 is a diagram illustrating a multi-modal artificial neural network according to an embodiment of the present disclosure.

Referring to FIG. 9, the road surface classification artificial neural network according to various embodiments of the present disclosure may include a multi-modal artificial neural network. The multi-modal artificial neural network may function as one classifier through a classifier based on different information by inputting at least one of image information, atmosphere information, or road surface temperature information together in addition to input data related to the sound signal. The more accurate road surface classification result may be obtained by inputting a plurality of information related to one road surface state together through such a corresponding learning. That is, the road surface classification device according to various embodiments of the present disclosure may output the road surface result by combining the plurality of information. Meanwhile, the input data illustrated in FIG. 9 is exemplary, and only a part of the image information, atmosphere information, and/or road surface temperature information may be utilized, or additional information may be further utilized.

Figure 10:
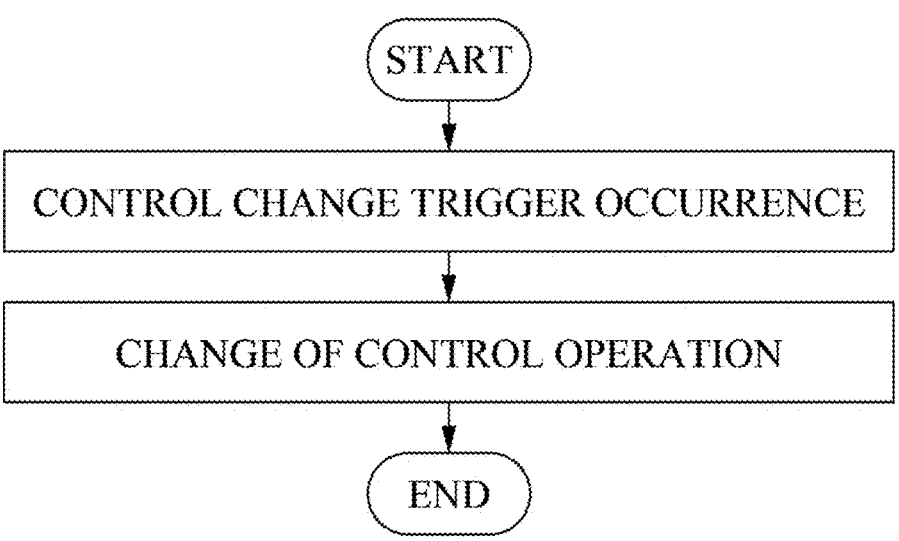
FIG. 10 is a flowchart illustrating an operation of changing a control operation based on a predetermined control change trigger by a road surface classification device according to an embodiment of the present disclosure.

FIG. 10 is a flowchart illustrating an operation in which the road surface classification device according to an embodiment of the present disclosure changes the control operation based on a predetermined control change trigger.

In this disclosure, the control change trigger means a situation or condition for changing the operation of the road surface classification device according to various embodiments of the present disclosure, and may be preset by a user or set by a command from an external device.

Meanwhile the control operation of the road surface classification device is changed by the control change trigger means a scheme set before the control change trigger occurs in the road surface classification device, such as a burst configuration, a transmission period, a determination period, a road surface classification result output scheme and so on.

The control change trigger may include, but is not limited to, a change in the road surface classification result (class) or output of a particular class, weather conditions, time conditions, geographic conditions, and so on.

As an example of a control change trigger, when the road surface classification result changes, the operation of the road surface classification device may be changed.

Figure 11:
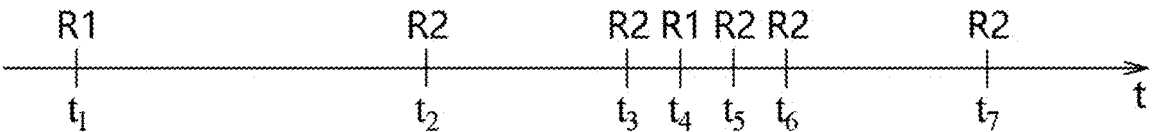
FIG. 11 is a diagram illustrating a scenario in which the road surface classification results are changed according to an embodiment of the present disclosure.

FIG. 11 is a diagram illustrating a scenario in which the road surface classification result changes according to an embodiment of the present disclosure.

Referring to FIG. 11, the road surface classification result of the road surface classification device according to an embodiment of the present disclosure may be changed to a first class (R1) at a first time (t1) and a second class (R2) at a second time (t2). The second class may be a class different from the first class.

According to an embodiment of the present disclosure, the second class may indicate a road surface state related to ice, and the first class may be a classification result related to other road surface states.

When the road surface state changes, the road surface classification device according to various embodiments of the present disclosure may need to change the control operation.

For example, when the road surface classification result is different from the previous classification result, the road surface classification device may change the transmission period or change the burst configuration in order to check whether an error occurs in the road surface classification result. That is, the number of determination times may be increased by shorter the transmission period or the number of sound signals included in the burst may be increased to increase the number of determination times. Alternatively, instead of changing the transmission period or the burst configuration directly, it may be determined whether the transmission period or the burst configuration is changed based on the follow-up determination.

Referring to FIG. 11, as the result of the second time is different from the result of the first time (R1≠R2), the road surface classification device according to an embodiment of the present disclosure may control the transmission period to be changed shortly, and more results may be obtained during a short time interval (t3 to t6). Meanwhile, during the corresponding time interval (t3 to t6), the number of determination times to the second class is larger than the number of determination times to the first class, and thus the road surface classification device may determine that the determination to the second class is accurate, change the transmission period to the original state, and output the result at the seventh time (t7), which is the time based on the changed transmission period.

According to various embodiments of the present disclosure, as an example of changing the control operation based on the follow-up determination when the preceding determination changes, when the first class (R1) is determined at the first time (t1) and the second class (R2) is determined at the second time (t2) different from the first class, instead of changing the transmission period immediately, it may be determined whether the determination accuracy of the second class or the transmission period is changed based on the result of the third class at the third time (t3) that is next determination time. That is, when the result of the third class is determined to be r2, the changed class may be determined to be accurate at the second time, and the transmission period may not be changed, and when the result of the third class is not determined to be r2, the determination of r2 may be determined to be error, and the transmission period may be changed.

Meanwhile the determination result at each time may be a result corresponding to each burst according to various embodiments of the present disclosure.

The road surface classification device according to various embodiments of the present disclosure present disclosure may further perform an operation related to manage the road surface based on the results of the plural determinations in the changed control operation. For example, after determining the accuracy of the changed specific class, the relevant class may be considered correct and the road surface management operation related to the changed class may be performed. Details related to the road surface management operation will be described with reference to FIG. 12.

As another example of the control change trigger, when the weather condition or the time condition is changed, the operation of the road surface classification device may be changed.

As an example of the weather condition, when the temperature is less than zero Celsius or when the temperature under zero Celsius is forecast, the road surface classification device according to various embodiments of the present disclosure may change the control operation by shortening the transmission period or increasing the number of transmissions within the burst to quickly determine whether a black ice occurs. As another example of the weather condition, there may be a weather environment such as strong wind, rain, heavy snow and so on, and information related to the weather environment may be obtained through an atmosphere sensor included in the road surface classification device or may be obtained from an external device through a communication unit.

As an example of the time condition, since black ice may occur more easily at night than the day, the transmission period or the burst configuration may be changed at a specific time in consideration of this point. As another example of the time condition, since the summer may have less change in the road surface state than in the winter, the control operation may be changed by longing the transmission period or reducing the number of transmissions within the burst to reduce power consumption.

As another example of the control change trigger, when the geographic condition is changed, the operation of the road surface classification device may be changed. When the road surface classification device is installed in the road infrastructure, the geographic condition may not be changed, but the transmission period or the burst configuration may be different for each regional condition. When the road surface classification device is installed in a moving object such as a vehicle, the transmission period or the burst configuration may be different when entering a specific region. For example, when enters the black ice vulnerable section, the control operation may be changed as described above when the road surface classification device receives the relevant information.

Meanwhile, the control change trigger related to the above-mentioned weather condition, time condition, or geographic condition is illustrative and not limited thereto, and may be set by a user input or a signal received from an external electronic device such as a server device.

Figure 12:
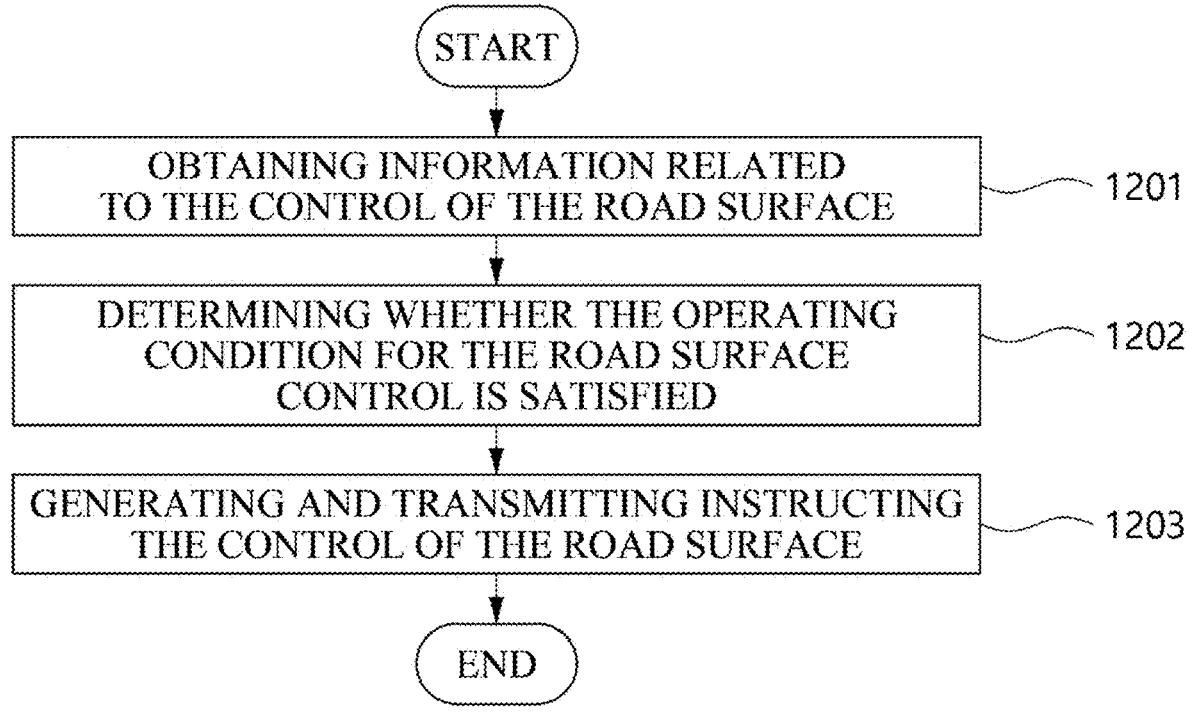
FIG. 12 is a diagram illustrating a road surface management method by a road surface classification device according to various embodiments of the present disclosure.

FIG. 12 is a diagram illustrating a road surface management method by a road surface classification device according to various embodiments of the present disclosure.

Referring to FIG. 12, in step 1201, the road surface classification device may obtain information related to the control of the road surface. According to various embodiments of the present disclosure, the information related to the control of the road surface may include the result obtained in step 304 of FIG. 3 or the final result obtained through the changing control operation of FIG. 10. In addition, the information related to the control of the road surface may include the weather information and/or the road surface temperature information obtained by the road surface classification device.

In step 1202, the road surface classification device according to various embodiments a may determine whether the operating condition for the road surface control is satisfied based on the obtained information.

For example, when the road surface classification result obtained in step 1201 is related to black ice, that is, if a class related to ice is obtained, the road surface classification device may determine that the condition for operating the road surface management device installed on the road surface is satisfied to eliminate or prevent the ice state of the road surface.

Alternatively, the operating condition of the road surface control may be determined by combining the obtained road surface classification result and the weather information. For example, if weather information satisfied certain conditions, that there is a high danger of ice forming and that the conditions have been met to activate a road surface management device installed on the roadway to clear or prevent ice conditions on the roadway may be determined.

Examples of weather information for operating the road surface management device may include the following conditions.

(1) If the snow, rain, sleet, or frost are forecasted or drop,
(2) If the surface temperature of the road is zero or lower,
(3) If the time is a dawn,
(4) If the temperature is rapidly lowered,
(5) If the strong wind is blow, When at least one of the above weather conditions is satisfied, if the road surface classification result is obtained as a specific class (e.g., water, slush, ice), it may be determined that the road surface control is necessary.

The road surface management device according to various embodiments of the present disclosure may include a brine spray device or a heating wire device, but is not limited thereto.

In step 1203, the road surface classification device according to various embodiments of the present disclosure may generate a road surface control signal based on the obtained information and the determination. The road surface control signal may include a signal or command necessary to control the road surface management device installed on the road surface.

The road surface classification device according to various embodiments of the present disclosure may be interlocked with the road surface management device installed on the road. When the road surface classification device is directly interlocked with the road surface management device, the road surface classification device may generate a command signal for controlling the road surface management device and transmit the command signal to the road surface management device. Alternatively, when the road surface classification device is indirectly interlocked with the road surface management device through an external server, the road surface classification device may generate a signal instructing the control of the road surface management device and transmit the signal to the external server.

Meanwhile, when the road surface management device receives the road surface control signal, the operation of controlling the road surface may be performed based on the road surface control signal. For example, the road surface management device may spray brine or operating the heating wire device based on the road surface control signal.

As another embodiment of the road surface management of the present disclosure, the road surface classification device may determine the danger of damage of the road surface.

Asphalt may be damaged due to repeated passages of vehicles exceeding a specific weight. Particularly, when water seeped between the asphalt freezes, the volume may be expanded, and when large vehicles s such as trucks pass, the road surface may be damaged.

According to various embodiments of the road surface classification device installed on the road infrastructure may periodically sense ToF of the road surface, and thus may measure traffic information s such as traffic vehicle information and traffic amount.

Figure 13A:
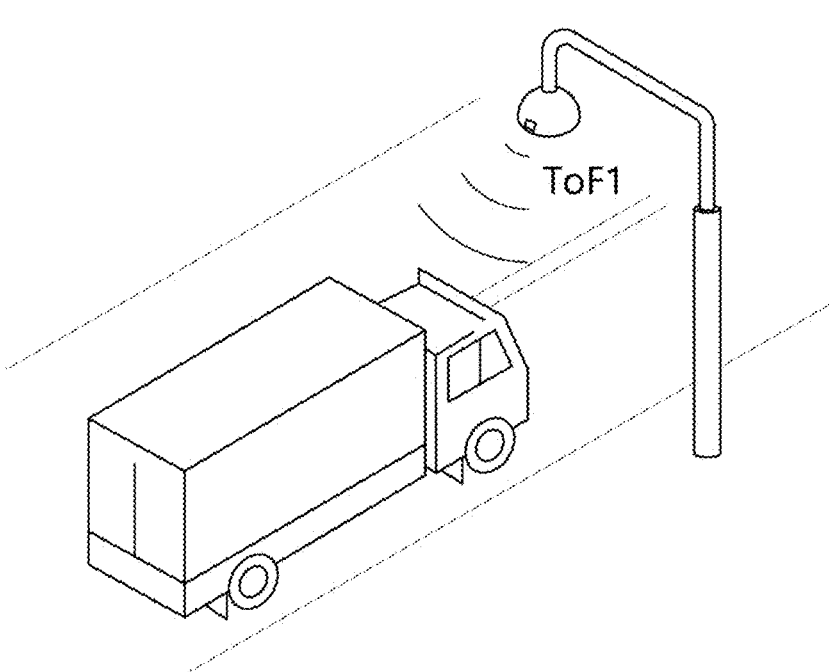
FIGS. 13A and 13B are diagrams illustrating that the road surface classification device according to an embodiment of the present disclosure collects traffic information.
Figure 13B:
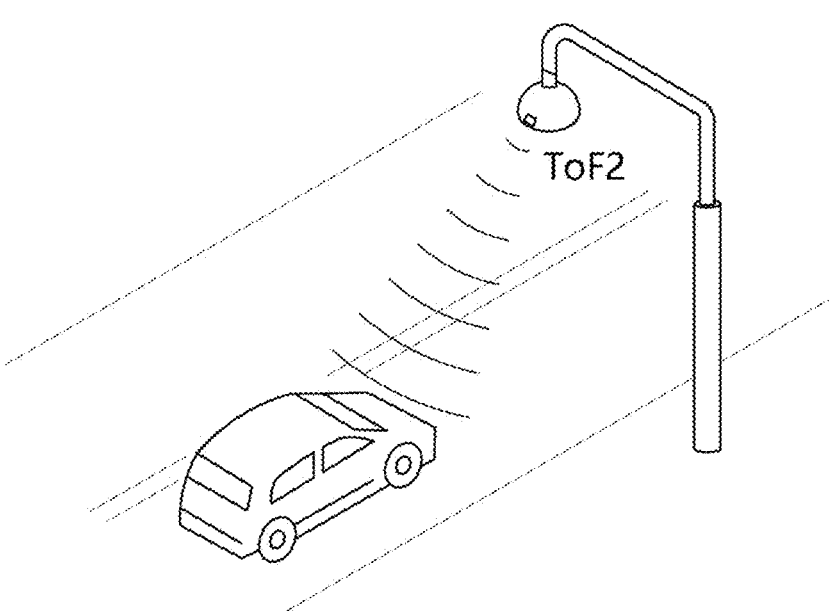

FIGS. 13A and 13B are diagrams illustrating that the road surface classification device according to an embodiment of the present disclosure collects traffic information.

Referring to FIGS. 13A and 13B, the road surface classification device may collect traffic information on the road surface based on the measurement of ToF. The traffic information collected by the road surface classification device according to various embodiments of the present disclosure may include information related to the degree of damage of the road surface or traffic amount.

As described above, since the road surface classification device may obtain information on the installation height of the road surface classification device, the ToF corresponding to the installation height of the road surface classification device may be determined as the reference ToF. That is, the ToF of the reflection signal reflected from the road surface may be referred to as the reference ToF.

Therefore, the road surface classification device according to an embodiment of the present disclosure may determine that there is no vehicle on the road surface when the ToF obtained by the road surface classification device is identified to correspond to the reference ToF. In addition, when the obtained ToF is identified to be shorter than the reference ToF, it may determine that there is a vehicle on the road surface. In addition, the information on the size (height) of the object on the road surface estimated based on the obtained ToF may be obtained.

Since the shorter the ToF value may mean that there is a high object from the road surface, the road surface classification device may determine that a large vehicle passes through the signal having a short ToF. The criterion for determining the large vehicle may be preset by the user input or the signal of the external device.

The road surface classification device according to various embodiments of the present disclosure may estimate the traffic amount passing over the road surface during the time based on the ToF value obtained during the predetermined time interval. In addition, the traffic amount information obtained by the road surface classification device of the present disclosure may further include information related to the size of the passed vehicle.

Referring to FIG. 13A, the ToF 1, under which the large vehicle is passing, is measured to be smaller than the ToF 2 of FIG. 13B, under which the small vehicle is passing.

The road surface classification device according to various embodiments of the present disclosure may obtain road surface state information and/or weather information, and thus may combine the obtained information and the traffic amount information to determine the danger of damage to the road surface and inform it to the outside. The road surface state information may include the road surface classification result and/or road surface temperature information.

For example, the information on the number of passes of the large vehicle may be measured during the period in which the road surface classification result is determined as the class related to ice, and the information related thereto may be provided to the user or the external device. The external device may include a server device of an organization that manages roads. Alternatively, the information on the traffic amount of the vehicle may be obtained during the period in which the road surface temperature is measured at a specific temperature or lower, and may be transmitted to the external device. In this case, the degree of damage to the road surface may be estimated based on the traffic amount of the large vehicle under the specific road surface classification result or the specific weather condition. Alternatively, by providing the obtained information about the traffic amount of the large vehicle to the external device, the danger of damage to the road surface may be managed.

The road surface classification device according to various embodiments of the present disclosure may determine whether to use the road surface classification or to use to collect traffic information based on the ToF of the acquired reception signal. That is, when the ToF of the acquired reception signal is within an error range from the reference ToF, it may be determined as a reflection signal for the road surface and used for road surface classification, and when the ToF of the acquired reception signal is shorter than the reference ToF, it may be determined to be acquired from the vehicle and traffic information may be acquired based thereon.

In order to collect traffic amount information, the road surface classification device may shorten the transmission period of the sound signal than the transmission period for road surface classification. That is, the transmission period of the sound signal may be variously set depending on the needs of the user, and the acquired signal may be processed variously depending on the purpose.

Meanwhile, the road surface classification device of the present disclosure may include a road surface type estimation device. It is apparent that the operation performed through the road surface type estimation device according to various embodiments of the present disclosure may be performed by the road surface classification device according to various embodiments of the present disclosure.

FIG. 14 is a configuration diagram of the road surface type estimation device according to an embodiment of the present disclosure.

As shown in FIG. 14, the road surface type estimation device using sounds according to an embodiment of the present disclosure may include a sound transceiver 1410, a signal converter 1420, an artificial neural network 1430, and a controller (MCU) 1440. Meanwhile, the road surface type estimation device may further include an atmospheric attenuation correction unit (not shown) and an atmosphere information measuring unit (not shown).

The sound transceiver 1410 may transmit the sound signal to the corresponding road surface to know the type and then receive the reflected signal.

The sound transceiver 1410 may include a sound transmitter 1411 that outputs a transmission signal under the control of the controller 1440, and a sound receiver 1412 that receives a reflection signal that is returned by the transmission signal being reflected any of the face.

The signal converter 1420 may perform frequency conversion on a predetermined region in the time domain of the reception signal to acquire a frequency domain signal (e.g., a spectrogram).

The signal converter 1420 may include a Short-Time Fourier Transform (STFT) converter, a Fast Fourier Transform (FFT) converter, a cepstrum (capstruam), or a wavelet transform. In this case, the frequency domain signal (the spectrogram) may be 2D or 3D.

The artificial neural network 1430 may take the frequency domain signal (spectrogram) as an input signal, extract characteristics of the input signal based on a trained road surface classification model, and estimate the type of the road surface.

Meanwhile, the signal converter 1420 may include an analog digital converter (ADC). The ADC may convert an analog signal of the reception signal into a digital signal.

The atmospheric attenuation correction unit (not shown) may calculate and correct the atmospheric attenuation of the digital signal.

The artificial neural network 1430 may perform convolution on the input signal based on the trained road surface classification model and estimate the type of the road surface by classifying.

Meanwhile, the artificial neural network 1430 may classify and learn using at least one or more of decision trees, linear discriminant analysis, logistic regression classifiers, naive bayes classifiers, support vector machines, nearest neighbor classifiers, and ensemble classifiers.

Decision trees may include Fine tree, Medium tree, Coarse tree, All tree, and Optimizable tree, discriminant analysis includes Linear discriminant, Quadratic discriminant, All discriminants, and Optimizable discriminant, Naive Bayes classifiers may include Gaussian Naive Bayes, Kernel Naive Bayes, All Naive Bayes, and Optimizable Naive Bayes, support vector machines (SVMs) include Linear SVM, Quadratic SVM, Cubic SVM, Fine Gaussian SVM, Medium Gaussian SVM, Coarse Gaussian SVM, All SVM, and Optimizable SVM, nearest neighbor classifiers may include Fine KNN, Medium KNN, Coarse KNN, Cosine KNN, Cubic KNN, Weighted KNN, All KNN, and Optimizable KNN, and ensemble classifiers may include Boosted trees, Bagged trees, Subspace Discriminant, Subspace KNN, RUSBoosted trees, All Ensembles, and Optimizable Ensembles.

The controller (MCU) 1440 may control the operations of the sound transceiver 1410, the signal converter 1420, and the artificial neural network 1430.

The signal converter 1420 and the artificial neural network 1430 express software implemented in a program as a component.

Meanwhile, although not illustrated in the drawings, the road surface type estimating device using sound signal according to various embodiments of the present disclosure includes a storage (memory) in which the trained road surface classification model and the software implemented in the program are stored. The storage (memory) may be included in the controller (MCU).

Meanwhile, the road surface type estimating device using sounds according to the present disclosure may further include an atmosphere sensor (not illustrated) capable of measuring temperature, humidity, and atmospheric pressure in the air.

According to the control of the controller 1440, atmosphere information including the temperature, humidity, and atmospheric pressure may be used in the atmospheric attenuation correction unit or transmitted to the input of the artificial neural network 1430.

Figure 15:
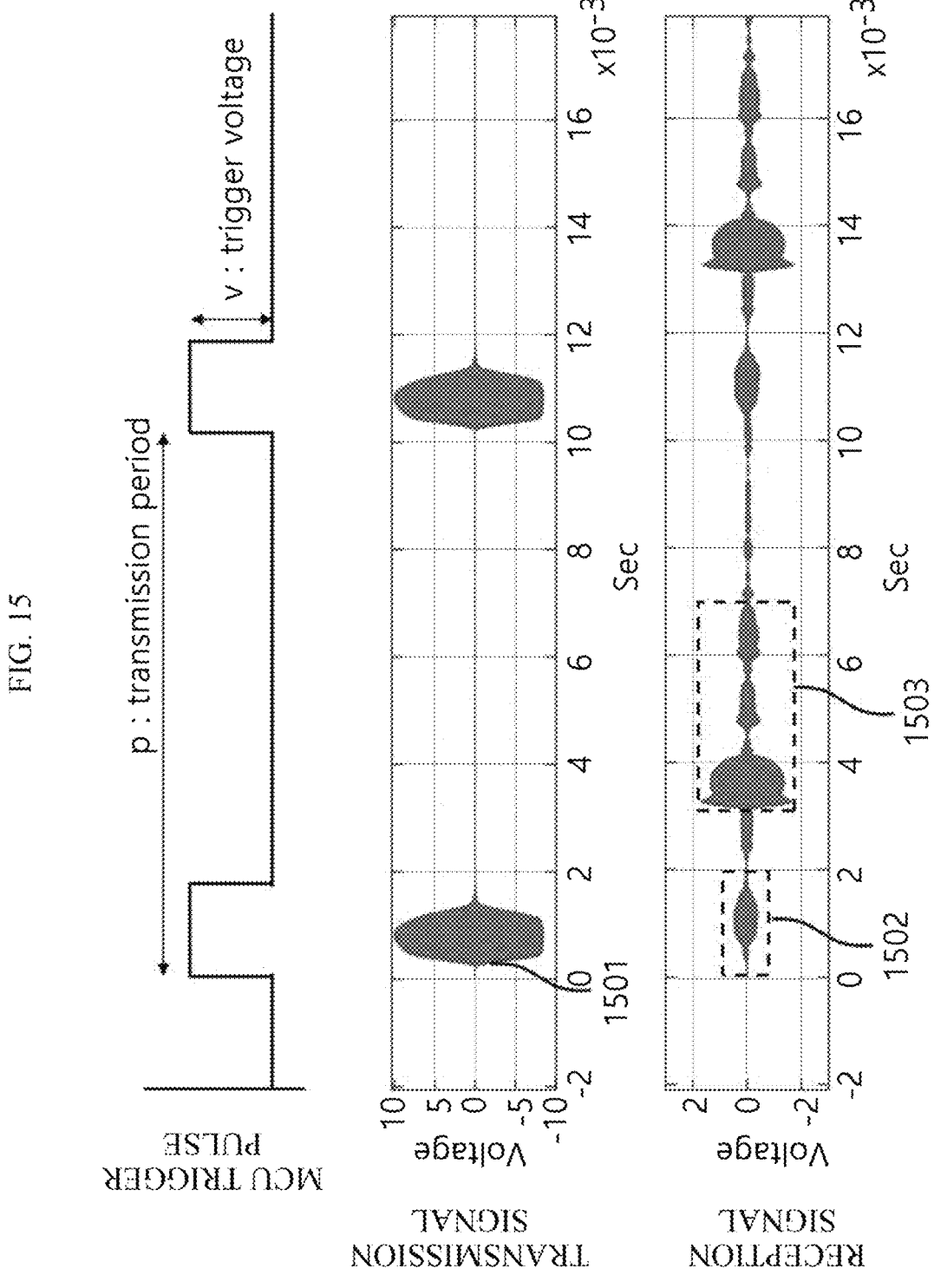
FIG. 15 is a diagram for explaining a transmission signal and a reception signal in a road surface type estimation device using sounds according to an embodiment of the present disclosure.

FIG. 15 is a diagram for describing transmission signals and reception signals in the road surface type estimating device using sound signal according to an embodiment of the present disclosure.

As illustrated in FIG. 15, the controller (MCU) 1440 may transmit a trigger signal having a predetermined transmission period (p: transmission period) with a predetermined magnitude (v: trigger voltage) to the sound transceiver 1410.

Then, the sound transmitter 1411 of the sound transceiver 1410 may output a sound signal 1501 having a specific frequency, for example, 40 kHz, to a corresponding road surface to know the type.

Thereafter, the sound receiver 1412 of the sound transceiver 1410 may receive a reflection signal returning to the road surface.

Here, the signal 1502 received in the same timeline as the sound signal 1501 may be a crosstalk signal of the sound signal transmitted by the sound transceiver 1410. In addition, the controller 1440 may determine the signal 1503 as the reception signal during a predetermined time from the point where the amplitude received after the transmission delay is the largest.

For example, when the time at which the amplitude of the signal received after the crosstalk signal is the largest is t_0, a total (a+b) ms from t_0−a ms to t_0+b ms can be observed, and a is 0.2 and b is 5 in the reception signal 203 of FIG. 15. Depending on the environment or conditions, a and b are variable values that can be adjusted.

In the example of FIG. 15, 10 ms which is the time until the transmitted sound signal sufficiently disappeared was used as one transmission period, and the sampling frequency of the sound transceiver 1410 was 1 MHz, which was 25 times the frequency of 40 kHz sounds.

Meanwhile, as described above, a plurality of reception signals may be sensed according to the transmission period to sense the state of the road surface, or a single reflection signal received after transmitting a sound once to sense the state of the road surface.

Figure 16:
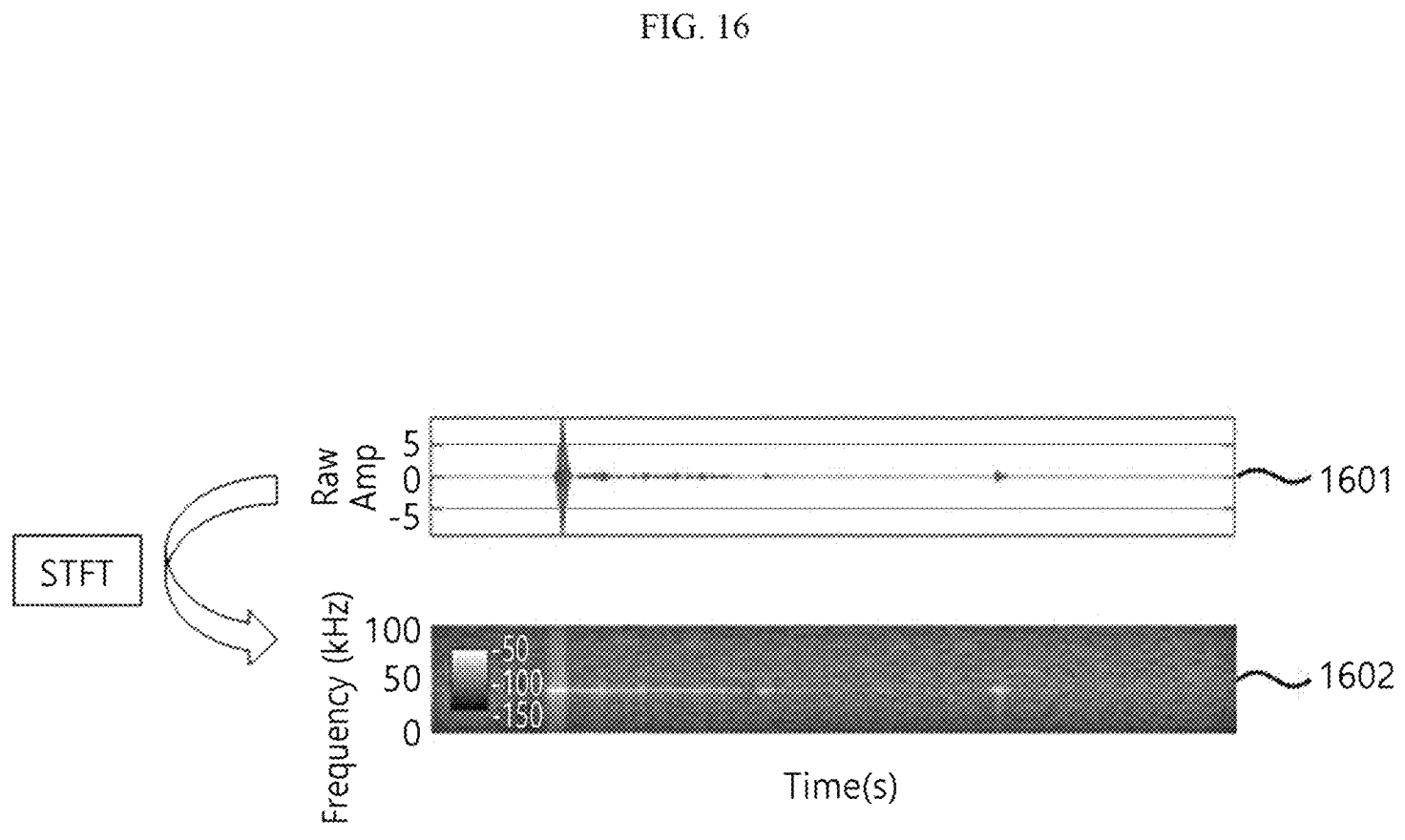

FIG. 16 is a diagram for exemplarily explaining a signal converter in a road surface type estimation device using sound signal according to an embodiment of the present disclosure.

In FIG. 16, as an example using signal converter to a STFT converter will be described.

As shown in FIG. 16, the STFT converter may obtain the 2D spectrogram 1602 by short-time Fourier transform on the signals 1503 and 1601 during a predetermined time received after the transmission delay, except for the crosstalk signal 1502 of the sound signal transmitted by the sound transceiver 1410 among the reflection signals received in FIG. 15.

The signal 1503 for one period may be Fourier transformed, or the reception signal for multiple periods may be Fourier transformed.

In the present disclosure, the material may be distinguished using acoustic impedance and surface roughness information. The acoustic impedance is not a constant, and the value may vary for each frequency at which the sounds vibrate. Therefore, analysis in the frequency domain may be useful. Fourier transform, which is one of various methods for converting the time-domain reception signal into the frequency domain signal, may be used. In addition, Short-Time Fourier Transform may be used to confirm the FFT every time (sampling time).

In addition, frequency analysis may be possible using wavelets, and in one embodiment of the present disclosure, it is exemplarily described that the STFT is used to reduce the calculation amount and secure sufficient data.

The short-time Fourier transform (STFT) is a method designed to consider the change in the time that has not solved in the existing Fourier transform. The STFT is to split the long signal that changes with time in a short time unit and then apply Fourier transform.

Since the STFT separates the signal according to the window length, the length of the signal used for Fourier transformation is reduced, and thus the resolution of the frequency may deteriorate. On the other hand, when the window length is increased to improve the resolution of the frequency, the resolution of the time may deteriorate. Wavelet transform (WT) may be used to overcome the limitations of the resolution due to the trade-off relationship between the frequency and time.

If the window length is determined in the STFT, the WT performs the STFT several times while changing the window length. In addition, if a sine curve that extends temporally to infinity is used as a basic function in STFT, the wavelet has various kinds of functions that exist for a finite period. The wavelet function may include Morlet, Daubechies, Coiflets, Biorthogonal, Mexican Hat, Symlets, and so on.

Figure 17:
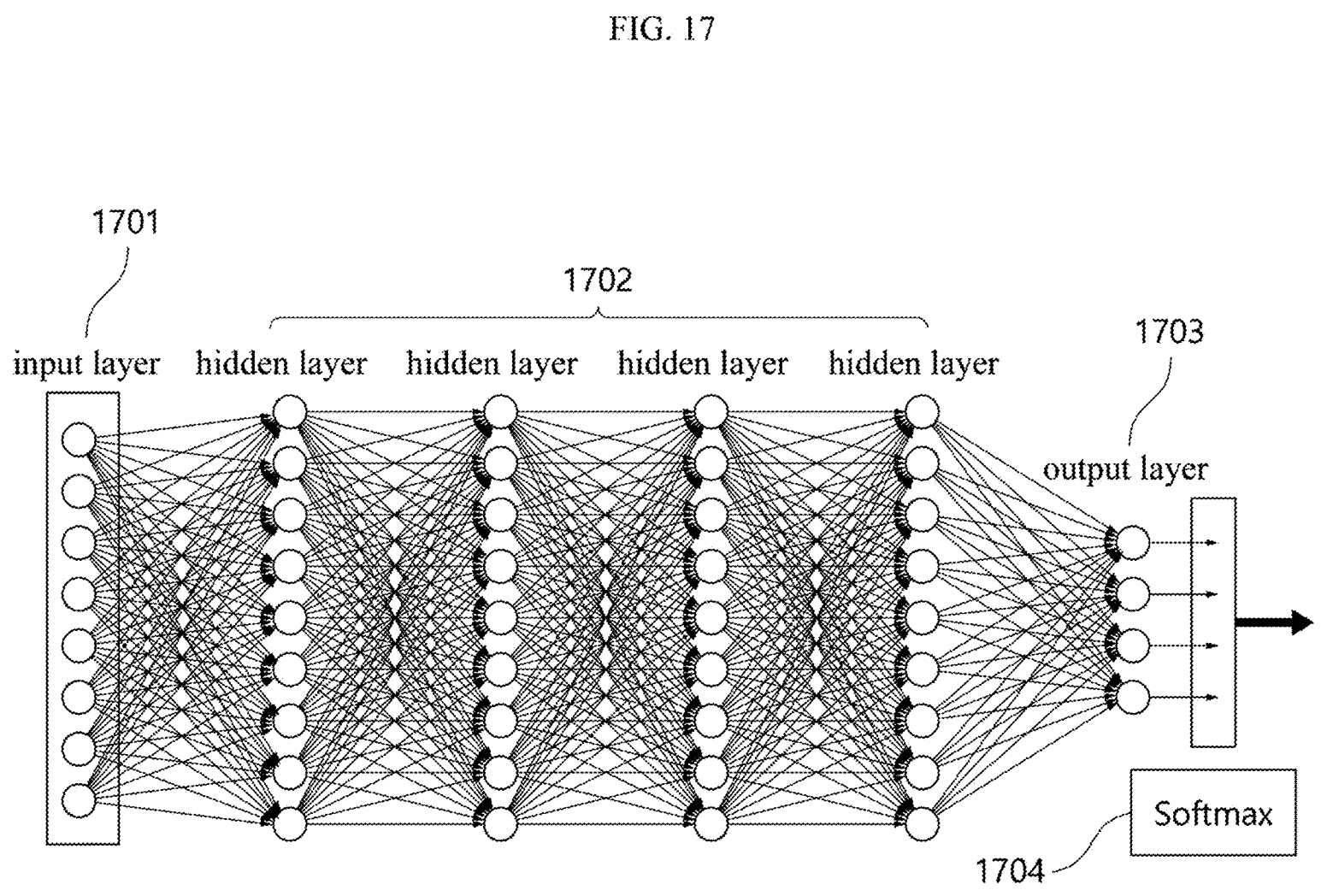

FIG. 17 is a diagram for explaining an artificial neural network in a road surface type estimation device using sounds according to an embodiment of the present disclosure.

As shown in FIG. 17, the artificial neural network may include deep neural network (DNN) of a multi-layer perceptron algorithm including an input layer 1701, a plurality of hidden layers 1702, and an output layer 1703. In addition, the artificial neural network according to various embodiments of the present disclosure may include deep convolutional neural network (DCNN) of a multi-layer perceptron algorithm further including a convolution execution unit (not shown).

The input layer 1701 may flatten the data of the spectrogram 1702 and receive the flattened data in ID.

The data input to the input layer 1701 may be characterized and classified through the plurality of hidden layers 1702.

The output layer 1703 may output a probability value for each kind of trained road surface.

The artificial neural network may determine and output the kind of road surface having the highest probability among the probability values output from the output layer 1703 by using softmax 1704.

On the other hand, the artificial neural network may receive atmosphere information (temperature, humidity, and pressure information) and may be used as the input of the input layer 1701.

In addition, the artificial neural network may also Fourier transform the sound signal 1501 transmitted to the road surface and may be used as the input of the input layer 1701.

Meanwhile, when the artificial neural network is DCNN, the convolution execution unit may perform convolution operations on the received digital input signal multiple times, perform batch normalization, a ReLU function, and a MaxpPooling function for each convolution operation, and output the flattened data in the last convolution operation to the transfer layer.

In this case, the transfer layer is the input layer 1701 of CNN, and the flattened output data of the convolution execution unit may be received in one dimension (1D), and the subsequent operations are the same as above.

Figure 18:
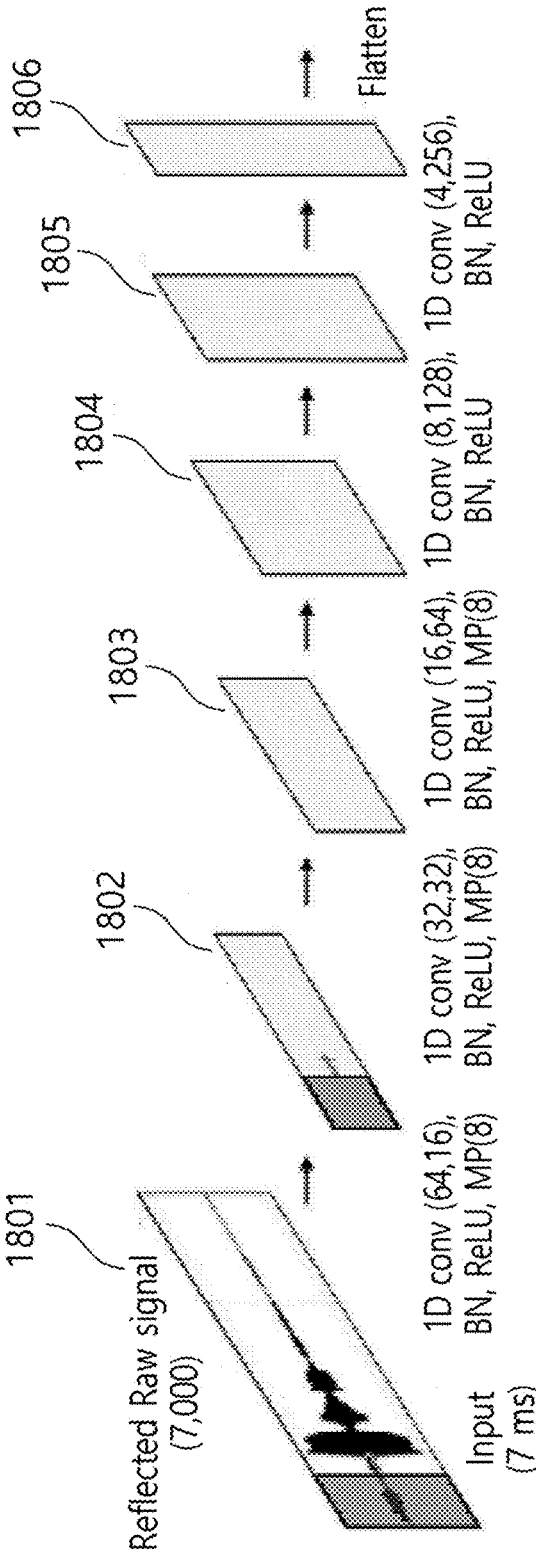
FIG. 18 is a diagram for explaining the operation of the convolution execution unit.

FIG. 18 is a diagram for explaining the operation of the convolution execution unit.

The convolution execution unit may perform a plurality of (e.g., five) ID convolution operations on the input signal, perform a Batch Normalization, ReLU, and MaxpPooling function for each convolution operation, and the output of the last convolution operation may be flattened data.

Referring to FIG. 18, for example, the input signal 1801 may be about 7000 reception signals during 7 ms, the first convolution execution result 1802 may be the result of performing ID cony (64,16), BN, ReLU, and MP (8) on the input signal 1801, the second convolution execution result 803 may be the result of performing ID cony (32,32), BN, ReLU, and MP (8) on the first convolution execution result 1802, the third convolution execution result 1804 may be the result of performing ID cony (16,64), BN, ReLU, and MP (8) on the second convolution execution result 403, the fourth convolution execution result 1805 may be the result of performing ID cony (8,128), BN, and ReLU on the third convolution execution result 1804, and the fifth convolution execution result 1806 may be the result of performing ID cony (4,2568), BN, and ReLU on the fourth convolution execution result 1805.

FIG. 19 is a diagram illustrating codes of a convolution execution unit of a road surface type estimation device using sounds according to the present disclosure.

FIG. 19 is a code implementing a part of the convolution execution unit illustrated in FIG. 18 in software.

The codes may include a plurality of BatchNorm functions, and MaxPooling functions.

As one example of one embodiment of the present disclosure one-dimensional convolution followed by one-dimensional batch normalization followed by MaxPooling is repeated in four sets, and finally, the probability per road surface is output by outputting as many values as the number of road surfaces to be classified through the fully connected layer.

Meanwhile, in the present disclosure, a method of performing one-dimensional (1d) convolution operations is described as an example, but convolution operations may be 2d and 3d as well as 1d.

Figure 20:
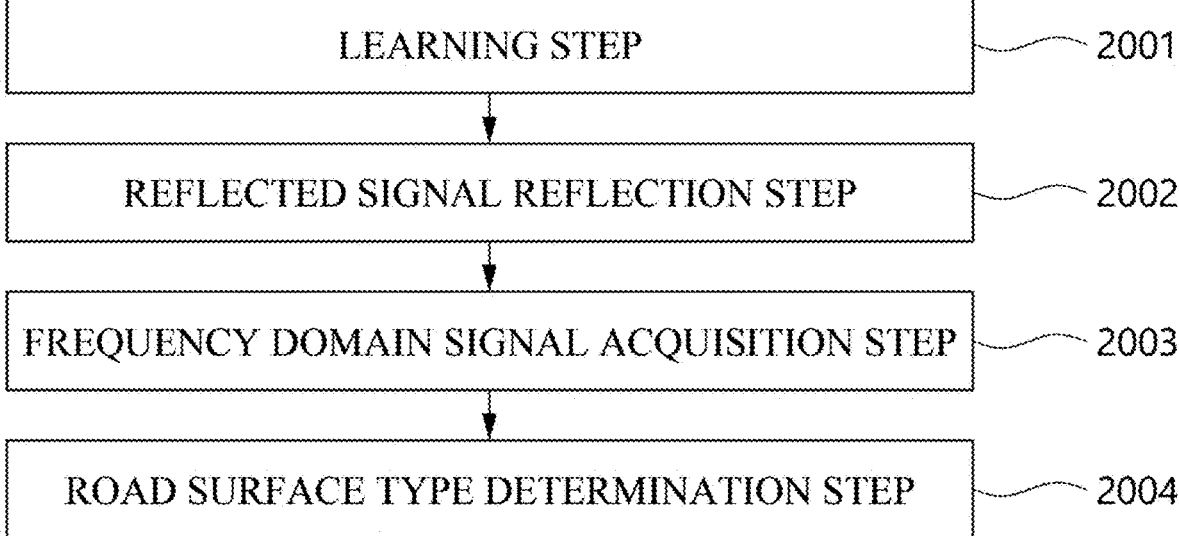
FIG. 20 is a flowchart of a method of estimating a road surface type using domain transform of sounds according to an embodiment of the present disclosure.

FIG. 20 is a flowchart of a road surface type estimation method using domain transform of sounds according to an embodiment of the present disclosure.

First, in order to perform a road surface type estimation method using domain transform of sounds according to the present disclosure, first, a learning step 2001 may be preceded to generate a road surface classification model.

In the learning step 2001, For a plurality of types of road surfaces, after transmitting an sound signal, receiving a reflected signal, converting the signal into a frequency domain signal (e.g., a spectrogram), and inputting the frequency domain signal (spectrogram) into the artificial neural network to train the road surface classification model.

Here, to convert the frequency domain signals STFT (Short-Time Fourier Transform), FFT (Fast Fourier Transform), cepstrum, or wavelet Transform may be used. The frequency domain signals may be 2D or 3D.

Thereafter, under the control of the controller, sound signal may be transmitted to the corresponding road surfaces to know the type, and the reflected signal may be received (2002).

Thereafter, under the control of the controller, the signal conversion may be performed on the preset region of the reception signal to obtain the frequency domain signal (2003).

In the frequency domain signal acquisition step 2003, the frequency domain signal may be obtained by domain-converting the signal during a predetermined time received after the transmission delay every period of the sound signal, excluding the crosstalk signal of the transmitted sound signal.

Thereafter, under the control of the controller, the frequency domain signal may be the input signal of the artificial neural network, and the characteristics of the input signal may be extracted and classified based on the trained road surface classification model to determine the type of the road surface (2004).

The artificial neural network may include Deep Neural Network: DNN of a multi-layer perceptron algorithm including an input layer 1701, a plurality of hidden layers 1702, and an output layer 1703. In this case, the output layer 1703 may output a probability value for each type of the trained road surface, and the artificial neural network may determine the type of the road surface having the highest probability by using softmax 1704.

The artificial neural network may receive atmosphere information (temperature, humidity, and atmospheric pressure information) and may be used as the input layer.

In addition, the artificial neural network may also convert the sound signal transmitted to the road surface into a Fourier transform and may be used as the input layer.

Figure 21:
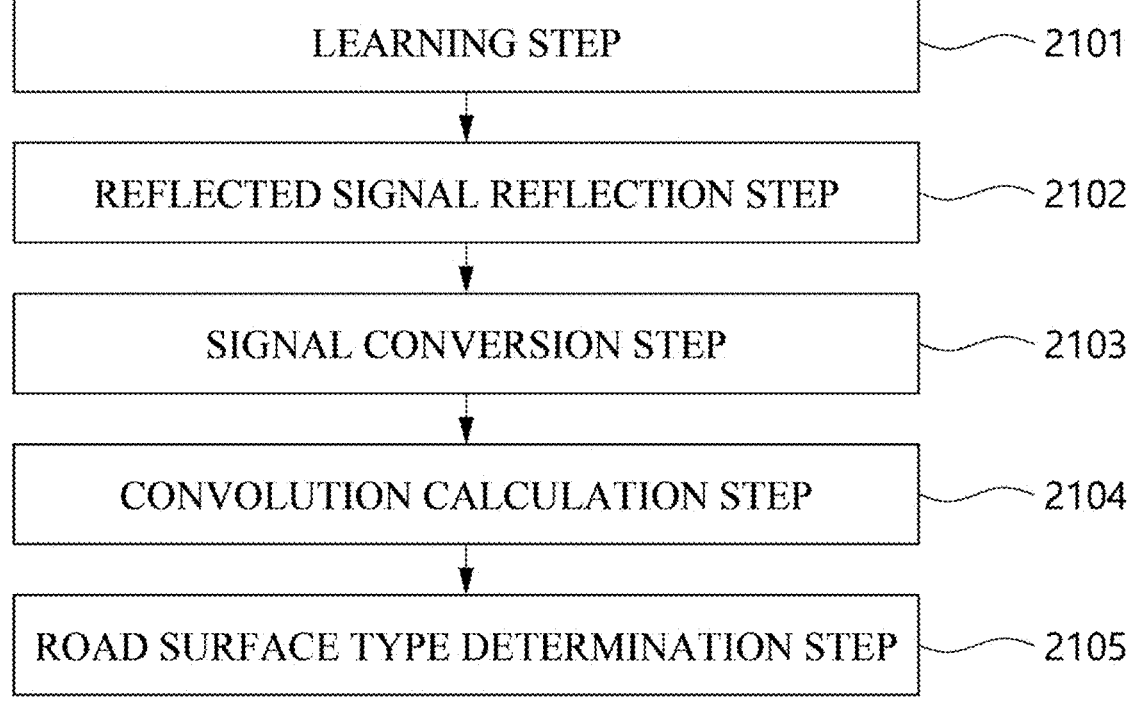
FIG. 21 is a flowchart illustrating an embodiment of a method of estimating a road surface type using sounds according to the present disclosure.

FIG. 21 is a flowchart illustrating an embodiment of a method of estimating a road surface type using sounds according to the present disclosure.

First, in order to perform the method of estimating a road surface type using sounds according to the present disclosure, the learning step 2101 may be preceded to generate a road surface classification model.

In the learning step 2101, the sound signal may be transmitted to a plurality of types of road surfaces, and then the reflection signal may be received, and the corresponding signal may be converted into a digital signal, and the converted digital signal may be input to the artificial neural network to perform a multi-convolution operation to train the road surface classification model.

Thereafter, under the control of the controller, the sound signal may be transmitted to the corresponding road surface to know the type, and then the reflection signal may be received (2102).

Thereafter, under the control of the controller, the analog signal may be converted into a digital signal for the preset region of the reception signal (2103).

In the signal conversion step 2103, excluding the cross-talk signal of the transmitted sound signal, for each period of the sound signal, the signal during the predetermined time may be converted into a digital signal based on the point where the amplitude of the received signal after the transmission delay is the largest.

For example, when the time at which the amplitude of the signal received after the crosstalk signal is the largest is t_0, a total (a+b) ms from t_0−a ms to t_0+b ms may be observed, and a and b may be variably adjusted according to the environment or condition.

Thereafter, under the control of the controller, the digital signal may be received to perform multiple convolutional operations on the artificial neural network (2104).

In the convolution operation step 2104, the convolution operation may be performed for the digital signal a plurality of times, and a Batch Normalization, a ReLU function, and a MaxpPooling function may be performed for each convolution operation, and the output of the last convolution operation is flattened data.

Meanwhile, in the present disclosure, a method of performing a one-dimensional (1D) convolution operation has been described as an example, but the convolution operation may be 2D and 3D as well as 1D.

Thereafter, under the control of the controller, based on the road surface classification model trained by the artificial neural network, the characteristics of the convolution-calculated signal (flattened data) may be extracted and classified to determine the type of the road surface (2105).

The artificial neural network may include a convolution execution unit that receives the digital signal and performs a plurality of convolution operations, and a Deep Convolution Neural Network (DCNN) of a Multi-Layer Perceptron algorithm that includes a transfer layer, a plurality of hidden layers, and an output layer. In this case, the output layer may output a probability value for each type of trained road surface, and the artificial neural network may determine and output the type of road surface having the highest probability using softmax.

The artificial neural network may receive atmosphere information (temperature, humidity, atmospheric pressure information) and may be used as the input of the convolution execution unit.

In addition, the artificial neural network may use the sound signal transmitted to the road surface as the input of the convolution execution unit.

Figure 22:
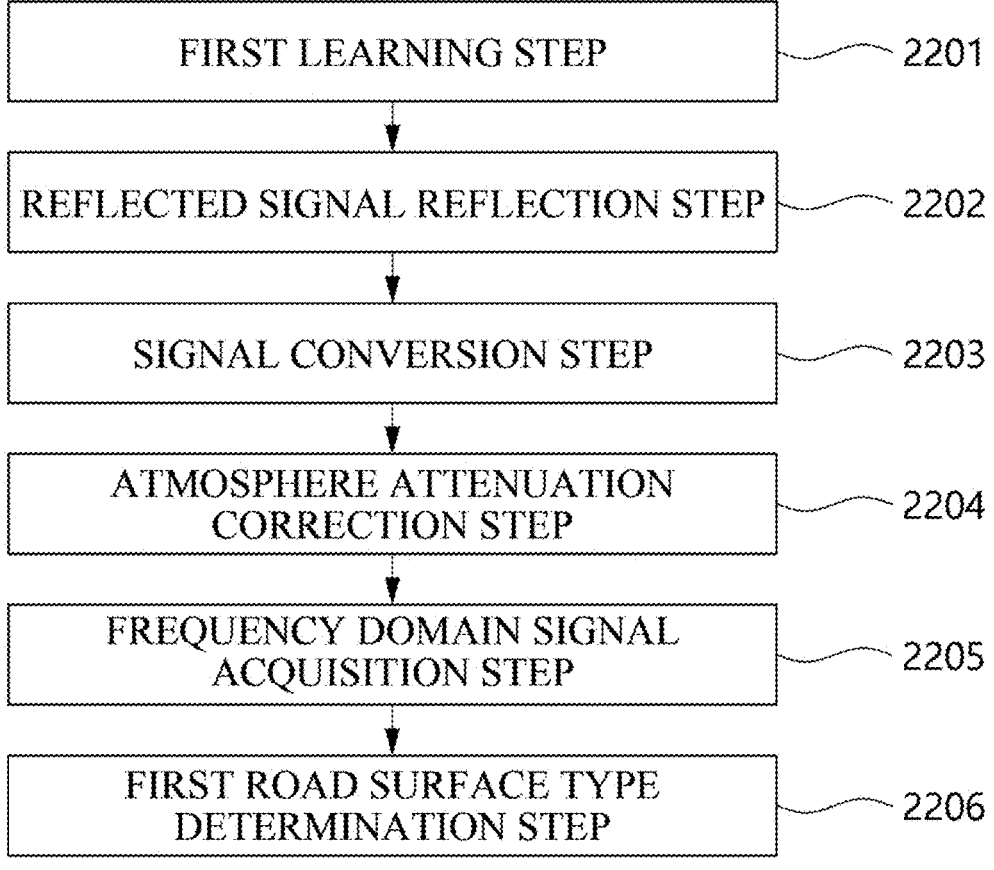
FIG. 22 is a flowchart illustrating a method of estimating a type of road surface using sounds corrected for atmospheric attenuation according to an embodiment of the present disclosure.

FIG. 22 is a flowchart illustrating a method of estimating a type of road surface using sounds having a corrected atmospheric attenuation amount according to an embodiment of the present disclosure.

First, in order to perform the method of estimating a type of road surface using sounds according to the present disclosure, the learning step (2201) may be preceded to generate a road surface classification model.

In the learning step 2201, for a plurality of road surfaces, a sound signal is transmitted, a reflected signal is received, the corresponding signal may be converted to a digital signal, the converted digital signal may be corrected for atmospheric attenuation, and converted to a frequency domain signal, and the frequency domain signal is input to a neural network to learn a road surface classification model.

Here, in the learning step 2201, to convert the frequency domain signals, STFT (Short-Time Fourier Transform), FFT (Fast Fourier Transform), cepstrum, or wavelet Transform may be used. The frequency domain signals may be 2D or 3D.

Thereafter, based on the control of the controller, the sound signal may be transmitted to the corresponding road surface that wants to know the type, and the reflection signal may be received (2202).

Thereafter, based on the control of the controller, the analog signal of a predetermined area of the reception signal may be converted into a digital signal (2203).

In the signal converting step 2203, excluding the crosstalk signal of the transmitted sound signal, for each period of the sound signal, the signal during the predetermined time may be converted into a digital signal based on the point where the amplitude of the received signal after the transmission delay is the largest.

For example, when the time at which the amplitude of the signal received after the crosstalk signal is the largest is t_0, a total (a+b) ms from t_0−a ms to t_0+b ms may be observed, and a and b may be variably adjusted according to the environment or condition.

Thereafter, the atmospheric attenuation amount of the digital signal can be calculated and corrected by the control of the controller (2204).

In the atmospheric attenuation correction step (2204), the atmospheric attenuation amount can be calculated and corrected using Equations 1 to 8 below. The atmospheric attenuation correction step can be performed by the atmospheric attenuation correction unit, which is a software implemented by the controller or the program.

First, the saturation pressure (Psat) can be calculated using <Equation 1> below.

$$P_{sat} = 10^{10.80\left(1-\left(\frac{To1}{T}\right)\right)-5.03log10\left(\frac{T}{To1}\right)+1.50\cdot10^{-4}*\left(1-10^{-8.30\left(\left(\frac{T}{To1}\right)-1\right)}\right)-4.30e-4\left(1-10^{-4.77\left(\left(\frac{To1}{T}\right)-1\right)}\right)-2.22}$$ [Equation 1]

Here, To1 is the triple point K of the atmosphere, and T is the current temperature [K].

The absolute humidity (h) can be calculated using <Equation 2> below.

$$h=h_{rin}P_{sat}/P_s$$ [Equation 2]

Here, hrin is the relative humidity [%], Psat is the saturation pressure [unit], and Ps is the constant pressure [atm].

Meanwhile, the scaled relaxation frequency for nitrogen (FrN) occupying 78% of the atmosphere can be calculated using <Equation 3> below.

$$FrN = \left(\frac{To}{T}\right)^{\frac{1}{2}\left(9+280*h*exp\left(-4.17\left(\left(\frac{To}{T}\right)^{\frac{1}{3}}-1\right)\right)\right)}$$ [Equation 3]

Here, To is the reference temperature [K], and T is the current temperature [K].

Meanwhile, the scaled relaxation frequency for oxygen (FrO) occupying 21% of the atmosphere can be calculated using <Equation 4> below.

$$FrO = \left(24 + 40400\,h\frac{0.02 + h}{0.391 + h}\right)$$ [Equation 4]

Here, h is the absolute humidity.

Meanwhile, the attenuation coefficient ($\alpha$: attenuation coefficient [nepers/m]) can be calculated using <Equation 5> below.

$$\alpha = Ps \cdot F^2\left(1.84 \cdot 10^{-11}\left(\frac{T}{To}\right)^{\frac{1}{2}} + \right.$$
$$\left(\frac{T}{To}\right)^{-\frac{5}{2}}\left(1.275e-2\cdot exp\left(-\frac{2239.1}{T}\right)\frac{FrO}{FrO+F^2} + \right.$$
$$\left.\left.1.068e-exp\left(-\frac{3352}{T}\right)\frac{FrN}{FrN+F^2}\right)\right)$$ [Equation 5]

Here, Ps is the constant pressure, F is the frequency of the sound signal (transmission sound signal), T is the current temperature [K], To is the reference temperature [K], FrO is the scaled relaxation frequency for oxygen, and FrN is the scaled relaxation frequency for nitrogen.

Meanwhile, the attenuation ratio (A, [unit: dB]) of the sound signal can be calculated using <Equation 6> below.

$$A=10\cdot log_{10} exp(2\alpha)\cdot d$$ [Equation 6]

Here, $\alpha$ is the attenuation coefficient, and d is the distance between the sound transceiver 100 and the corresponding road surface that wants to know the type.

The d can be calculated using <Equation 7> below using the t (time of flight) from the time that the signal is transmitted from the transmitter to the time that it is reflected off the road surface and detected by the receiver and the speed (Vair) of sound in the atmosphere.

$$d=V_{air}*t/2$$ [Equation 7]

Here, t is the time of flight, and Vair is the atmospheric sound speed [m/s].

Meanwhile, the atmospheric sound speed can be calculated using <Equation 8> below.

$$V_{air} = \sqrt{\frac{K_s}{\rho}} = \sqrt{\gamma RT} \approx 331.3\sqrt{\frac{T}{273.15}}$$ [Equation 8]

Here, Ks is the isentropic volume expansion rate of the object (coefficient of stiffness), and $\rho$ is the density of the object (atmosphere).

In this case, assuming the air (atmosphere) is an ideal air, Ks=$\gamma$P, $\gamma$ is the thermal capacity ratio (1.4 in the case of air), P is the pressure, R is the ideal air constant, and T is the absolute temperature [K]. Since excluding the temperature they are constats, it can be also approximately expressed.

The sound velocity among the atmosphere may be corrected and used for attenuation compensation according to the temperature, atmospheric pressure, and humidity of the air.

Thereafter, under the control of the controller, the frequency domain signal may be acquired by performing signal transformation on the predetermined region of the corrected digital signal (2205).

In the frequency domain signal acquisition step 2205, the frequency domain signal may be obtained by frequency-converting the signal during the predetermined time received after the transmission delay with respect to a signal converter at every period of the sound signal, excluding the crosstalk signal of the transmitted sound signal from the corrected digital signal.

Thereafter, under the control of the controller, the frequency domain signal may be the input signal of the neural network, and the characteristics of the input signal may be extracted and classified based on the trained road surface classification model to determine the type of the road surface (2206).

The neural network may include a deep neural network (DNN) of a multi-layer perceptron algorithm including an input layer, a plurality of hidden layers, and an output layer. In this case, the output layer may output the probability value for each type of the trained road surface, and the neural network may determine and output the type of the road surface having the highest probability using softmax.

Meanwhile, the structure of the neural network is not limited to the DNN mentioned above.

The neural network may receive atmosphere information (temperature, humidity, and atmospheric pressure information) and may be used as the input of the input layer.

In addition, the neural network may frequency transform the sound signal transmitted to the road surface and may be used as the input of the input layer.

Meanwhile, instead of acquiring the frequency domain signal in the frequency domain signal acquisition step and inputting the frequency domain signal to the artificial neural network, the artificial neural network may receive the digital signal that be corrected by atmospheric attenuation amount and perform multiple convolution operations under the control of the controller.

In the convolution operation step, the 1D convolution operation may be performed multiple times on the digital signal having the corrected atmospheric attenuation amount, and the batch normalization, ReLU function, and Maxp-Pooling function may be performed for each convolution operation, and the output of the last convolution operation may be flattened data.

Thereafter, under the control of the controller, the characteristics of the convoluted signal (flattened data) may be extracted and classified based on the road surface classification model trained by the artificial neural network to determine the type of the road surface.

In the case of performing convolution, the artificial neural network may include a deep convolution neural network (DCNN) of a multi-layer perceptron algorithm further including a convolution execution unit receiving the digital signal and performing multiple convolution operations. The output layer may output the probability value for each type of the trained road surface, and the artificial neural network may determine and output the type of the road surface having the highest probability using softmax.

Meanwhile, the structure of the artificial neural network is not limited to the DCNN mentioned above.

The artificial neural network may receive atmosphere information (temperature, humidity, and atmospheric pressure information) and may be used as the input of the convolution execution unit.

In addition, the artificial neural network may also use the sound signal transmitted to the road surface as the input of the convolution execution unit.

Hereinafter, a detailed embodiment in which a road surface classification device according to an embodiment of the present disclosure is installed and operated in a road infrastructure will be described in more detail.

Figure 23:
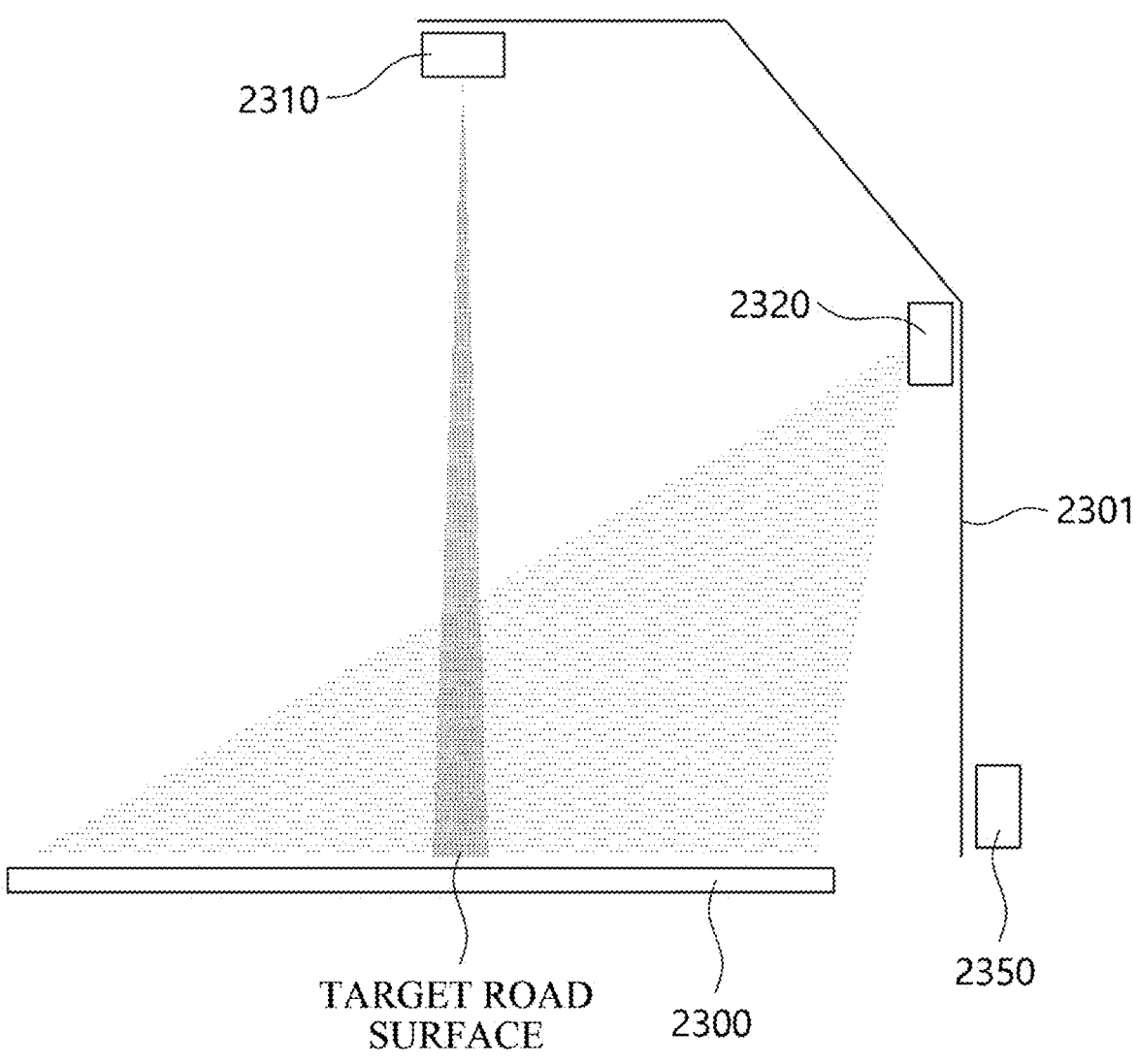
FIG. 23 is a diagram for explaining a road condition monitoring system equipped with a vision sensor and a sound sensor according to an embodiment of the present disclosure.

FIG. 23 is a diagram for explaining a road state monitoring system including a vision sensor and a sound sensor according to an embodiment of the present disclosure. FIG. 23 is a specific embodiment of the road infrastructure illustrated in FIG. 2.

As illustrated in FIG. 23, a structure 2301 is located on or near the road 2300, and a sound sensor 2310 and a vision sensor 2320 are provided in the structure 2301.

The sound sensor 2310 may be provided in the structure 2301 so as to be located on the road surface of the vehicle in the road 2300 and perpendicular to the road surface, and the vision sensor 2320 may be installed in the structure 2301 so that the entire area of the road is photographed.

Meanwhile, in FIG. 23, a communication unit 2350 for transmitting data obtained from the sound sensor 2310 and the vision sensor 2320 to a controller (not illustrated) is illustrated.

The vision sensor 2320 has spread solutions combined with artificial intelligence models in the entire industrial field along with the development of artificial neural networks, and is one of the mainstream technologies in the field of object recognition, detection, and segmentation. Due to the development of artificial intelligence technology, an algorithm that enables the vision sensor 2320 to operate in a manner similar to a method in which a person intuitively recognizes a target from a photo (image) and distinguishes a region is realized.

Meanwhile, the recognition of the object using the sound sensor 2310 is possible through waveform analysis of a signal reflected after striking the surface of the recognition target using sounds, and the reflected wave is determined according to the acoustic impedance or surface roughness of the surface of the target where the reflection is achieved.

That is, the sound sensor 2310, if it uses a wide range of sound spectra, is strong to external noise and enables black ice recognition of the road surface.

An embodiment includes disclosing a method of accurately recognizing a road surface of a wide range by fusing a vision sensor that can distinguish intuitively recognize a wide area and a sound sensor technology that can accurately recognize the target without being affected by a light source by using the physical properties of the target object.

Figure 24:
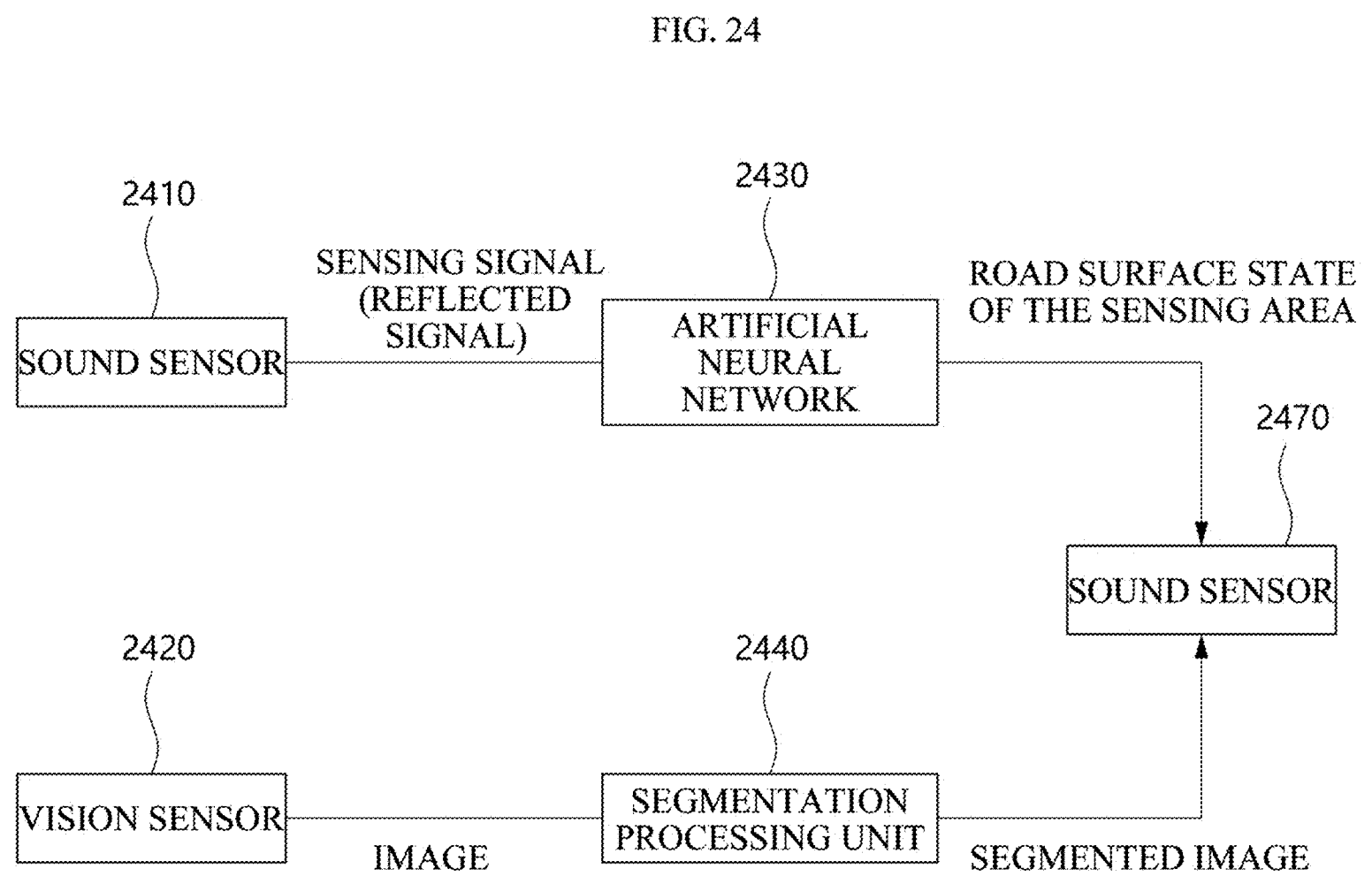

FIG. 24 is a configuration diagram of a road state monitoring system including a vision sensor and a sound sensor according to an embodiment of the present disclosure.

As illustrated in FIG. 24, a road state monitoring system including a vision sensor and a sound sensor according to an embodiment of the present disclosure may include a sound sensor 2410, a vision sensor 2420, an artificial neural network 2430, a segmentation processing unit 2440, and a controller 2470.

The sound sensor 2410 may transmit a sound signal to a predetermined point for road state monitoring and may receive a reflection signal.

The vision sensor 2420 may acquire an image of the road surface including the predetermined point.

The artificial neural network 2430 may classify the road surface state of the predetermined point based on the learned road state classification model by using the reflection signal acquired by the sound sensor 2410 as an input signal. The road surface state may include dry road, water, black ice, and snow.

The segmentation processing unit (2440) may divide the image acquired by the vision sensor (2420) into a plurality of distinguished segmentation regions based on the segmentation model as an input signal.

The controller (2470) may control the operations of the sound sensor (2410), the vision sensor (2420), the artificial neural network (2430), and the segmentation processing unit (2440), and determine the road surface state of the corresponding road by fusing the road surface state of the predetermined point output from the artificial neural network (2430), and the plurality of segmented regions output from the segmentation processing unit (2440).

The process of the controller (2470) determining the road surface state of the corresponding road will be described in detail with reference to FIG. 27.

The controller (2470) may calculate the segmentation region including the point where the sound sensor hits the ground. However, it is preferable that the ground hit point (sensing region) of the sound sensor at the time of installation of the system according to the present disclosure is set as the normal freezing section in the road surface, and the position of the sensing region may be already known in the system.

Finally, the sound sensor may output image information by assigning the classification class (road surface type) of waveform data to the segmentation region including the point where the ground hits (sensing region).

Figure 25:
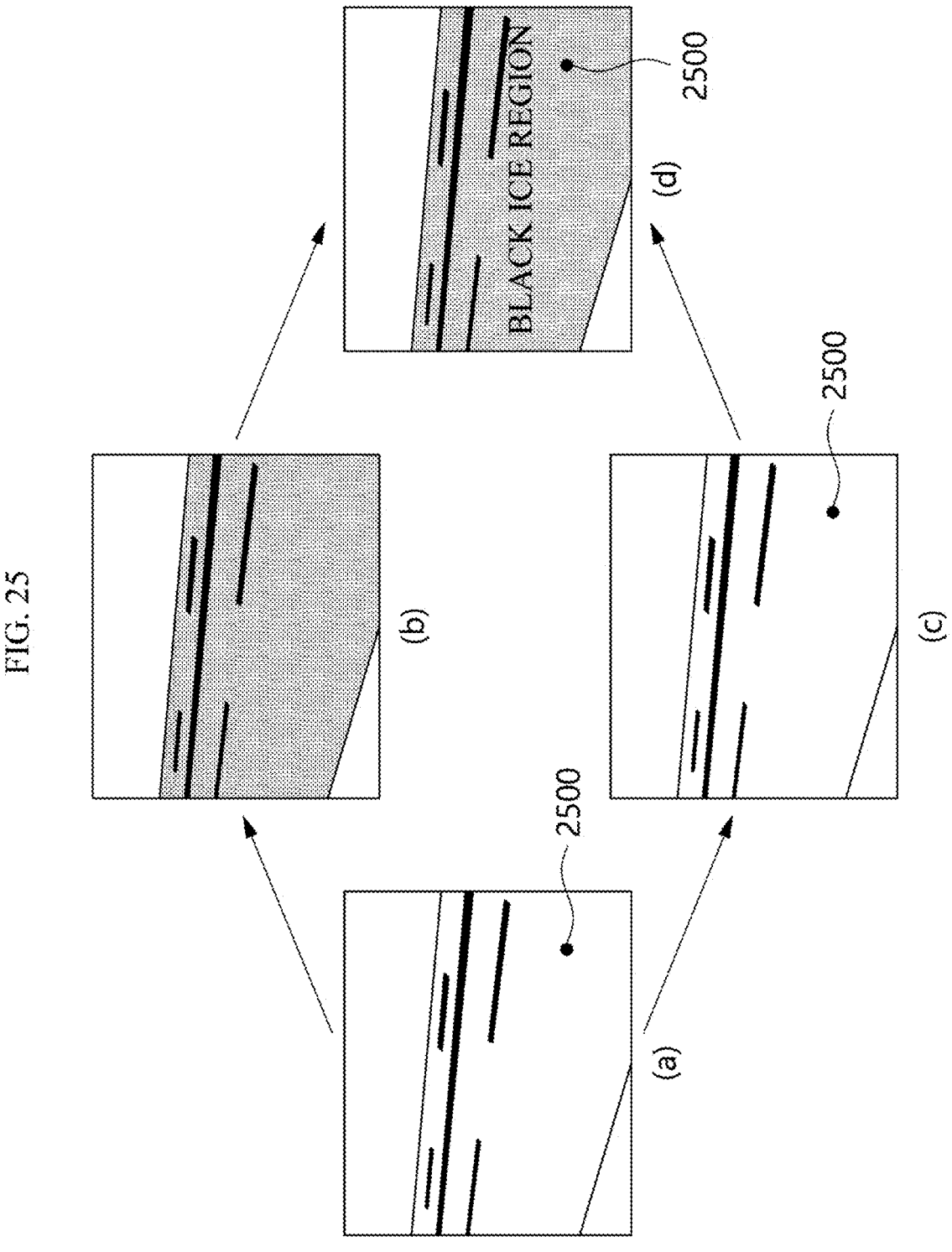
FIG. 25 is a diagram illustrating an example of recognizing a state of a uniform road surface in a road state monitoring system provided with a vision sensor and a sound sensor according to an embodiment of the present disclosure.

FIG. 25 is a diagram illustrating an example of recognizing a uniform road surface state in a road state monitoring system including a vision sensor and a sound sensor according to an embodiment of the present disclosure.

Referring to FIG. 25, (a) is a photographed image of the vision sensor (2420), and the position of the sensing region (predetermined region) (2500) of the sound sensor (2410) is displayed. (b) shows that the segmented region is displayed by segmenting the photographed image of (a). (c) classifies the road surface type based on the trained road surface classification model (the artificial intelligence model), and senses the road surface state of the sensing region (2500). (d) shows the image in which the black ice region is finally displayed by finding the segmentation region including the region (2500) sensed in (c) from the segmentation regions of (b).

Here, (b) shows that the entire area of the road is divided into one segmentation region, and the sensing region (2500) in which the road surface is sensed through the sound sensor (2410) is sensed as black ice, and thus the results of (d) may be finally output.

Figure 26:
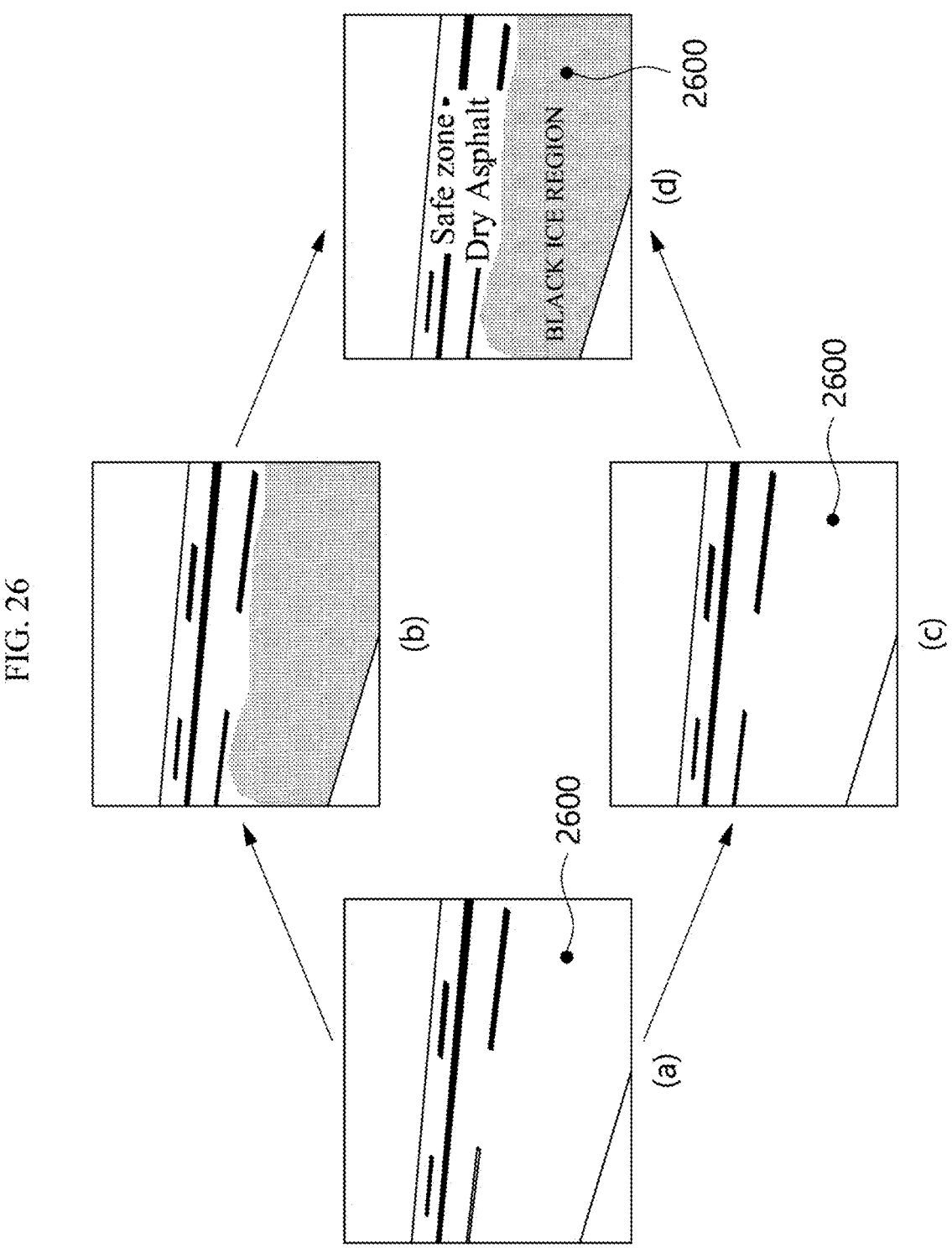
FIG. 26 is a diagram illustrating an example of recognizing a state of a non-uniform road surface in a road state monitoring system provided with a vision sensor and a sound sensor according to an embodiment of the present disclosure.

FIG. 26 is a diagram illustrating an example of recognizing a non-uniform road surface state in a road state monitoring system including a vision sensor and a sound sensor according to an embodiment of the present disclosure.

Referring to FIG. 26, (a) is a photographed image of the vision sensor (2420), and the position of the sensing region (predetermined region) (2600) of the sound sensor (2410) is displayed. (b) shows that the segmented region is displayed by segmenting the photographed image of (a). (c) classifies the road surface type based on the trained road surface classification model (the artificial intelligence model), and senses the road surface state of the sensing region (300). (d) shows the image in which the black ice region is finally displayed by finding the segmentation regions of (b).

Here, (b) may be divided into a plurality of segmentation regions including a road wet region and a dry region, and since the sensing region 2600 detected by the sound sensor 2410 was detected as black ice, the results as shown in (d) may be finally output.

In other words, the present disclosure may include a technology that can reliably determine the problem of which part/region of the road surface image obtained by the vision sensor corresponds to the road surface information correctly recognized by the sound sensor through the vision sensor.

In the present disclosure, the operation of the road surface detection algorithm may be performed by periodic (min, second unit) or non-synchronous requests, and the sensing of the danger of slipping of the road surface may acquire data through the sound sensor and the vision sensor, sense the type (state) of the road surface based on the data acquired by the sound sensor, and detect the region including the sensing portion of the sound sensor through image segmentation in the image obtained by the vision sensor.

That is, when the danger of black ice is sensed in the road surface, the danger information may be combined in the image divided into regions as a result of segmentation, and the danger information may be used in the form of transmitting a notification of the road surface danger section to the administrator (management server).

Figure 27:
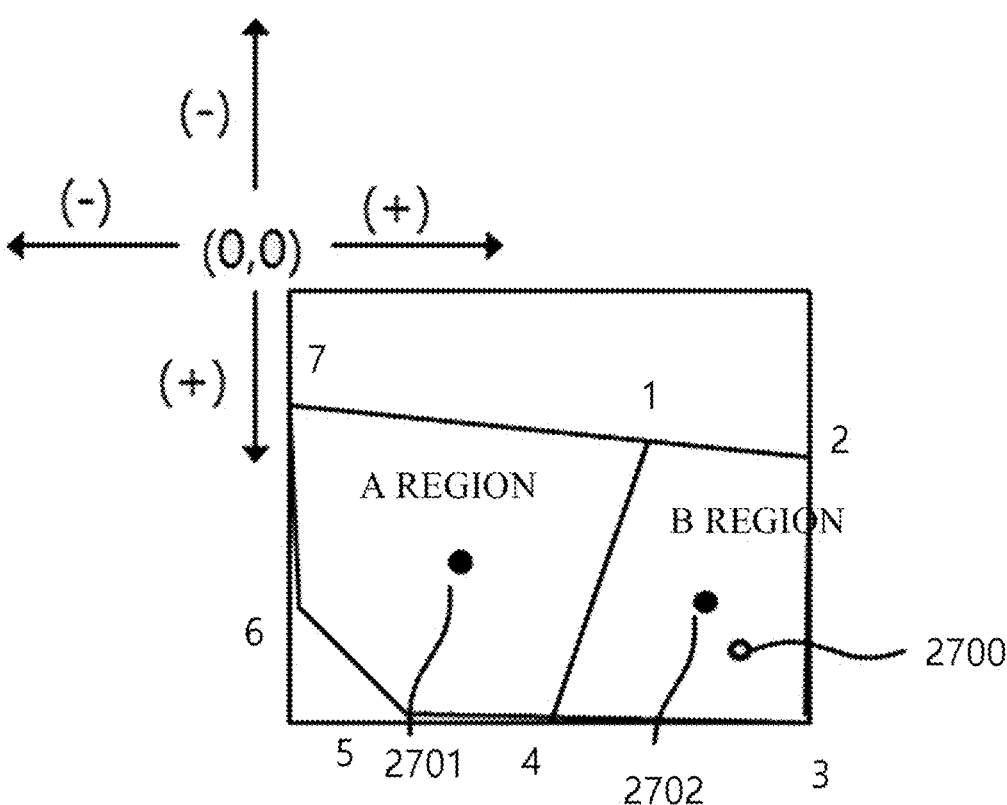
FIG. 27 is a diagram for explaining a method of locating a segmentation area of a sound sensor in a road state monitoring system provided with a vision sensor and a sound sensor according to an embodiment of the present disclosure.

FIG. 27 is a diagram for explaining a method of finding a segmentation region of the sensing region of the sound sensor in a road state monitoring system including the vision sensor and the sound sensor according to an embodiment of the present disclosure.

The controller may determine the road surface state of the road by fusing the road surface state of the predetermined point output from the artificial neural network and the plurality of segmentation regions output from the segmentation processing unit 2440.

The controller calculates the position of the midpoint of each of the segmentation regions, calculates a linear equation for the plurality of line segments included in each of the segmentation regions (the plurality of line segments forming each of the segmentation regions), determines the first positive-negative relationship between the midpoint of the corresponding region and each of the plurality of line segments using the linear equation for each of the segmentation regions, determines the second positive-negative relationship between the predetermined point and each of the plurality of line segments using the linear equation for each of the segmentation regions, and determines the segmentation region where the second positive-negative relationship and the first positive-negative relationship match with each other as the region including the predetermined point.

Referring to FIG. 27, it is assumed that the input RGB image is divided into a plurality of regions after being segmented, and among them, the A region and the B region are divided as shown in the drawing.

The midpoint of the 'A region' is represented by "2701", the midpoint of the 'B region' is represented by "2702", and the sensing region of the sound sensor (the predetermined point) is represented by "2700".

In FIG. 27, the positive-negative relationship is defined as right and down is (+) direction, and left and up is (−) direction, relative to the point (0,0) in the upper left corner of the image.

The A region is formed of a pentagon, and consists of line segments 14, 45, 56, 67, and 71.

The positive-negative relationship between the midpoint 2701 of the A region and the line segments 14, 45, 56, 67, and 71 of the A region becomes (−), (−), (−), (+), and (+), respectively.

The B region is formed in a quadrangle, and includes the line segments 12, 23, 34, and 41.

The positive-negative relationship between the midpoint 2702 of the B region and the line segments 12, 23, 34, and 41 of the B region becomes (+), (−), (−), and (+), respectively.

In this case, the positive-negative relationship between the detection region (predetermined point) of the sound sensor 2700 and the line segments 14, 45, 56, 67, and 71 of the A region becomes (+), (−), (−), (+), and (+), respectively, and the positive-negative relationship between the line segments 12, 23, 34, and 41 of the B region becomes (+), (−), (−), and (+), respectively.

Therefore, the detection region (predetermined point) of the sound sensor 2700 is included in the B region.

Figure 28:
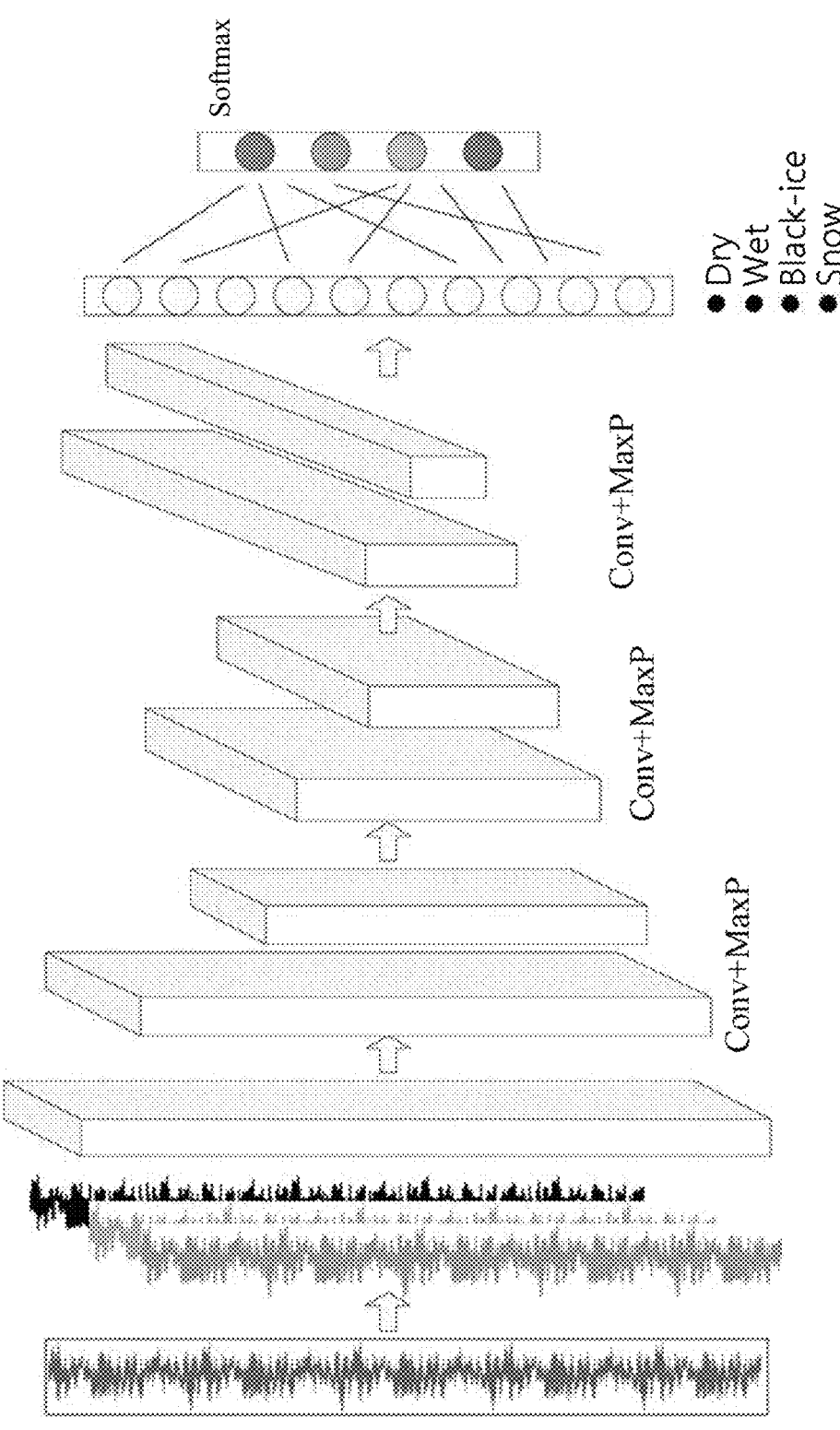
FIG. 28 is a diagram for explaining an example of an artificial neural network of a road state monitoring system provided with a vision sensor and a sound sensor according to an embodiment of the present disclosure.

FIG. 28 is a diagram for explaining an example of an artificial neural network of a road condition monitoring system including a vision sensor and a sound sensor according to an embodiment of the present disclosure.

Referring to FIG. 28, the artificial neural network may be formed of an artificial intelligence model implemented by any one of a 1D CNN (Conventional Neural Network) or an ANN (Artificial Neural Network).

The input of the artificial neural network may be a reflected signal received through the sound sensor, and the output may be a type of road surface of the predetermined detection region of the sound sensor.

Figure 29:
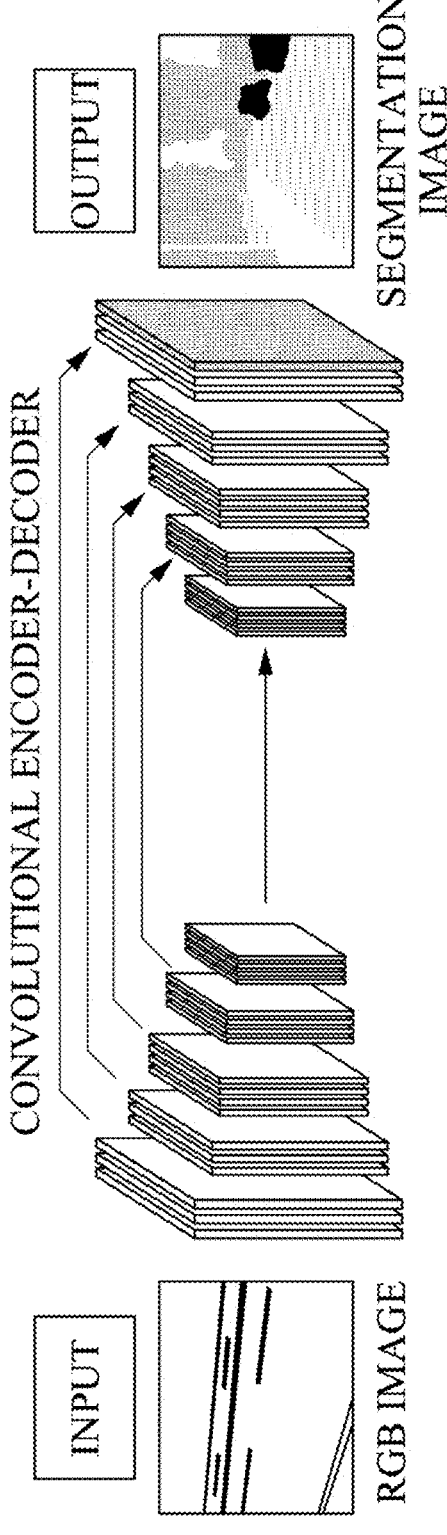
FIG. 29 is a diagram for explaining an example of a segmentation processing unit of a road state monitoring system provided with a vision sensor and a sound sensor according to an embodiment of the present disclosure.

FIG. 29 is a diagram for explaining an example of a segmentation processing unit of a road condition monitoring system including a vision sensor and a sound sensor according to an embodiment of the present disclosure.

Referring to FIG. 29, the segmentation processing unit may be formed of an image segmentation model based on a Conventional Neural Network (CNN) implemented by an Auto-Encoder or a U-Net.

The input of the segmentation processing unit is RGB image acquired through the vision sensor, and the output is a segmentation image in which regions distinguished in the image are displayed.

Figure 30:
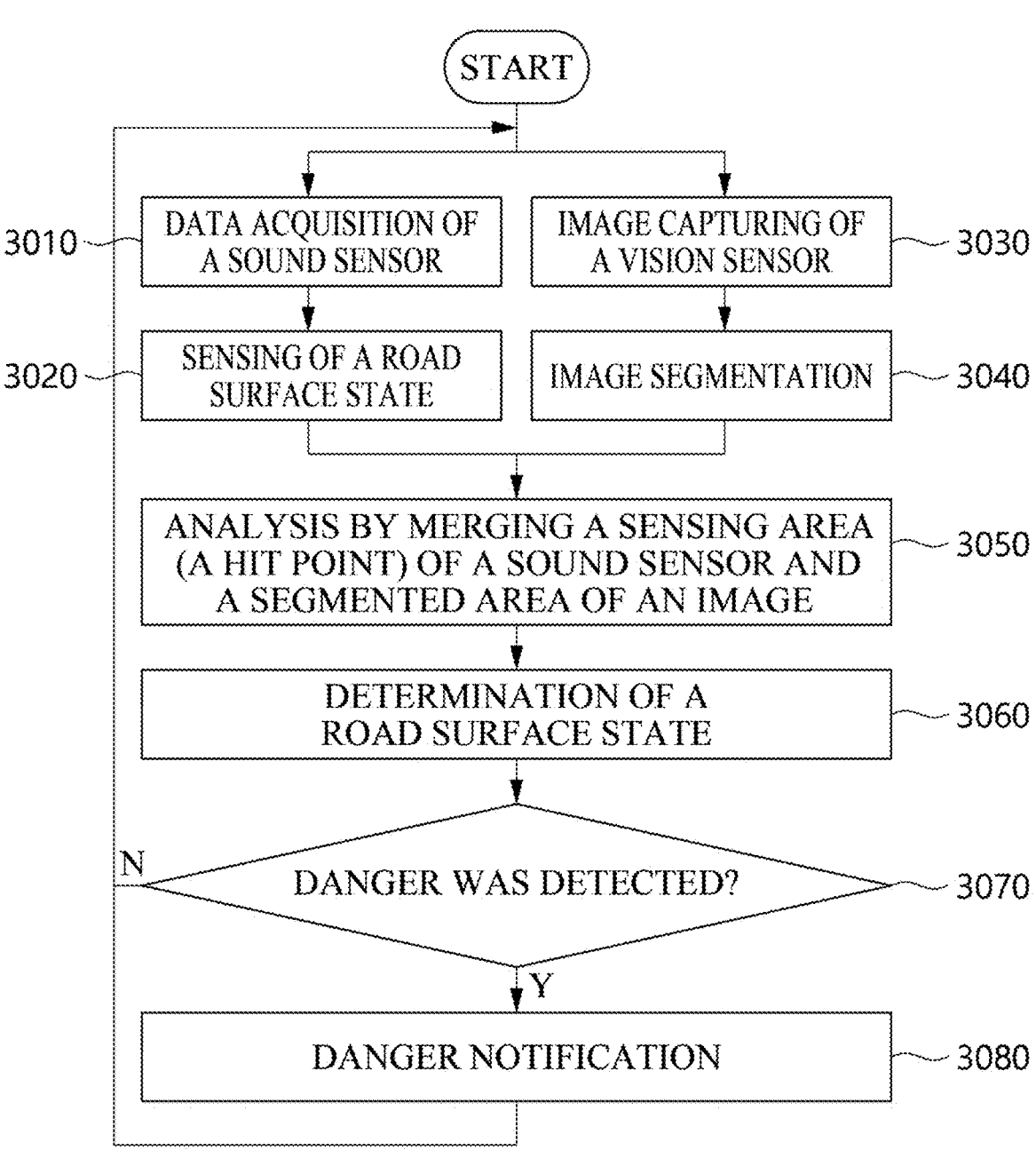
FIG. 30 is a flowchart of a monitoring method in a road state monitoring system provided with a vision sensor and a sound sensor according to an embodiment of the present disclosure.

FIG. 30 is a flowchart of a monitoring method in a road condition monitoring system including a vision sensor and a sound sensor according to an embodiment of the present disclosure.

First, for road condition monitoring, the sound sensor may receive a reflection signal after transmitting a sound signal to a predetermined point 3010.

Then, the road surface state of the predetermined point may be classified based on the trained road surface classification model as an input signal that is reflected signal acquired by sound sensor (3020).

Meanwhile, while the sound sensor transmits sound signal and receives the reflection signal, the vision sensor may acquire an image of the road surface including the predetermined point (3030).

Then, the image acquired by the vision sensor may be divided into a plurality of distinguished segmentation regions based on the segmentation model (3040).

Then, the road surface state may be analyzed by merging the road surface state of the predetermined point and the plurality of distinguished segmentation regions (3050).

Thereafter, the road surface state of the corresponding road may be determined according to the analysis by merging step 3050 (3060).

Thereafter, it may be determined whether a danger has been detected in the road surface state of the corresponding road (3070).

As a result of the determination of the danger step 3070, the danger may not be detected in the road surface state of the corresponding road, and thus may periodically proceed to steps "3010" and "3030".

Meanwhile, as a result of the determination of the danger step 3070, a signal for notifying the danger to the management server may be transmitted as the danger is detected in the road surface state of the corresponding road (3080).

Meanwhile, in the danger notification step (3080), the danger region may be displayed on the image including the plurality of distinguished segmented region and transmitted to the management server.

FIG. 31 is a detailed flowchart of the analysis by merging step 3050 of FIG. 30.

The analysis by merging step 3050 may include performing the following steps.

First, in the segmented image, the position of the midpoint of each segmented region is calculated (3051).

Thereafter, a linear equation is calculated for a plurality of line segments (a plurality of line segments forming each segmented region) included in each segmented region (3052).

Thereafter, for each segmented region, a first positive-negative relationship for each of the plurality of line segments and the midpoint of the corresponding area is determined using the linear equation (3053).

Thereafter, for each segmented region, a second positive-negative relationship for each of the plurality of line segments and the predetermined point is determined using the linear equation (3054).

Thereafter, the segmented region where the second positive-negative relationship and the first positive-negative relationship match with each other is determined as the area including the predetermined point (3055).

Figure 32:
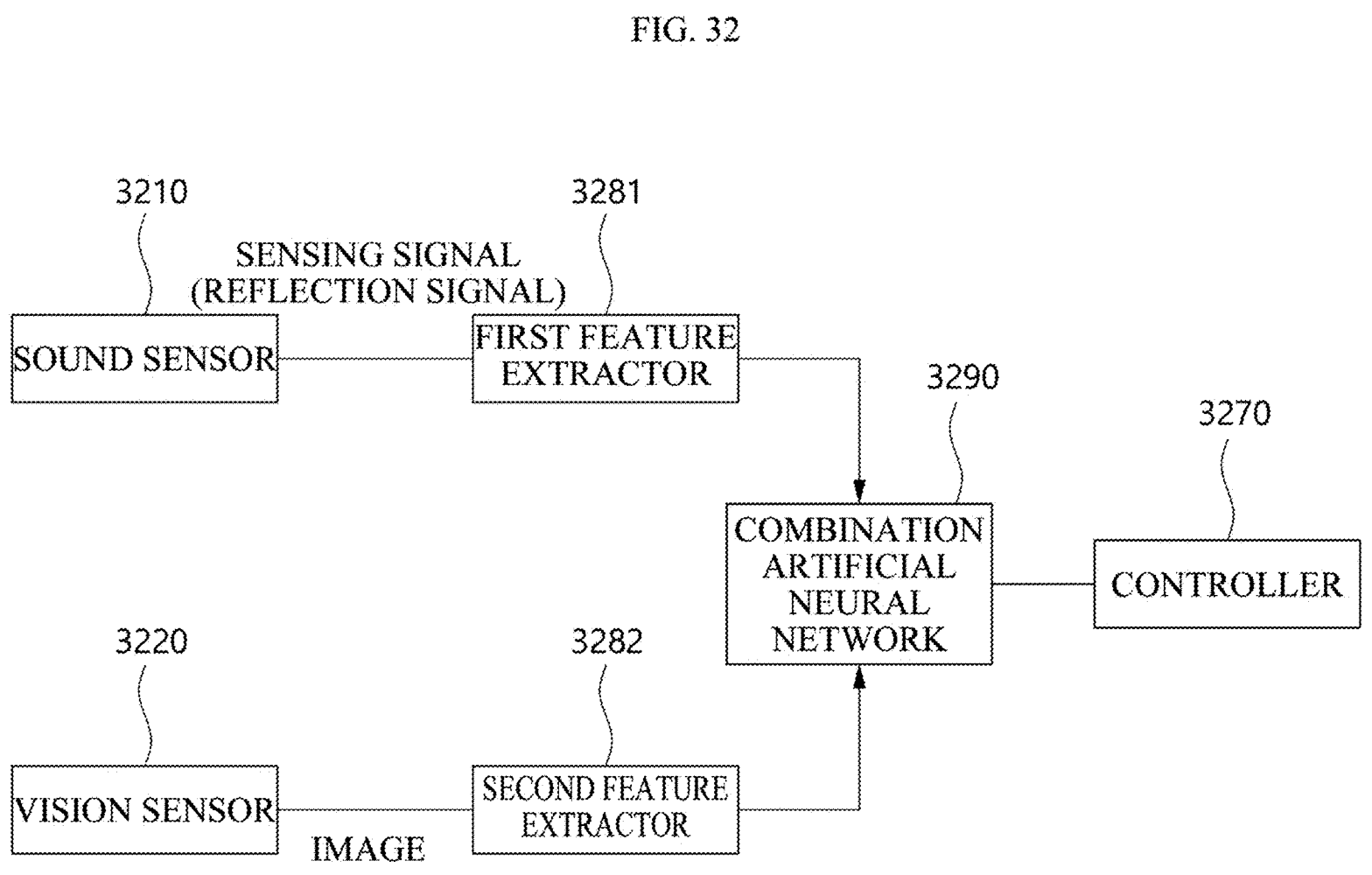

FIG. 32 is a configuration diagram of a road state monitoring system including a vision sensor and a sound sensor according to another embodiment of the present disclosure.

As shown in FIG. 32, the road state monitoring system including the vision sensor and the sound sensor according to an embodiment of the present disclosure may include a sound sensor 3210, a vision sensor 3220, a first feature extractor 3281, a second feature extractor 3282, a combination artificial neural network (joint classifier) 3290 and a controller 3270.

The sound sensor 3210 may transmit a sound signal to a predetermined point for road state monitoring and receive a reflection signal.

The vision sensor 3220 may acquire an image of a road surface including the predetermined point.

The first feature extractor 3281 may extract a first feature from the reflection signal acquired by the sound sensor 3210.

The second feature extractor 3282 may extract a second feature from the image acquired by the vision sensor 3220.

The combination artificial network 3290 may classify the road surface state of the corresponding road based on the learning road surface data joint classification model based on the input of the signal acquired by the sound sensor 3210 and the image acquired by the vision sensor 3220. The road surface state may include dry, water, black ice (ice), and snow.

The controller 3270 may control the operations of the sound sensor 3210, the vision sensor 3220, the first feature extractor 3281, the second feature extractor 3282, and the combination artificial neural network 3290.

In the combination artificial neural network 3290, the first feature extracted from the reflection signal and the second feature extracted from the image may be trained and classified by a classification model (data joint classification model) that separately weights each.

The first feature extracted from the reflection signal and the second feature extracted from the image may learn object (road surface type) classification by combining image data and sound data using correlation (Correspondence). In addition, it may be trained by analyzing the characteristics of the data to adjust the weight and influence of the image data-based classifier and the sound data-based classifier to make a final decision (prediction).

FIG. 33 is a flowchart of another embodiment of a monitoring method in a road state monitoring system including a vision sensor and a sound sensor according to the present disclosure.

First, for road state monitoring, the sound sensor may transmit the sound signal to a predetermined point and then receive the reflection signal (3310).

Thereafter, the first feature of the reflection signal may be extracted (3320).

Meanwhile, while the sound sensor transmits the sound and receives the reflection signal, the vision sensor may acquire an image of the road surface including the predetermined point (3330).

Thereafter, the second feature of the image may be extracted (3340).

Thereafter, the road surface state of the corresponding road may be analyzed based on a classification model trained by combining the first feature extracted from the reflection signal and the second feature extracted from the image (3350).

Here, the first feature extracted from the reflection signal and the second feature extracted from the image may be trained and classified by a classification model that separately weights each.

Thereafter, the road surface state of the corresponding road may be determined in accordance with the analysis of the road surface state step 3350 (3360).

Thereafter, it may be determined whether a danger is detected in the road surface state of the corresponding road (3370).

As a result of the determination of the danger step 3370, the danger may not be detected in the road surface state of the corresponding road and thus may proceed to the "3310" and "3330" steps periodically.

Meanwhile, as a result of the determination of the danger step 3370, the danger may be detected in the road surface state of the corresponding road and thus may transmit a signal to the management server informing the danger (3380).

Meanwhile, in the danger notification step 3380, a danger region may be displayed on the image including the plurality of distinct segmented regions and may be transmitted to the management server.

Hereinafter, a specific embodiment of controlling a heating wire device or a brine spray device as an example of a road surface management device according to an embodiment will be described in detail.

Figure 34:
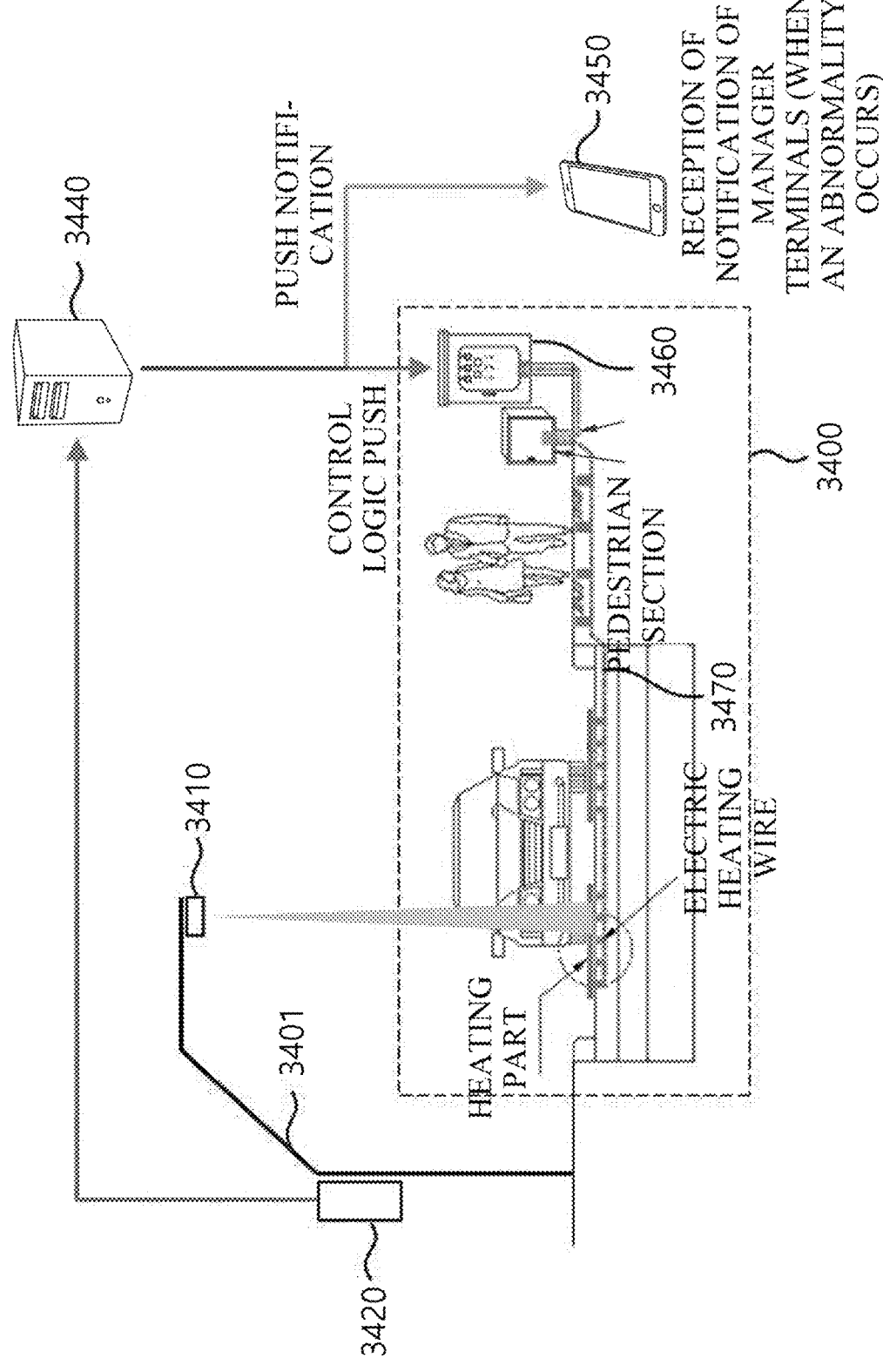
FIG. 34 is a diagram for explaining an operation of a control system of a heating wire device of road according to an embodiment of the present disclosure.

FIG. 34 is a diagram for explaining the operation of the control system of the heating wire device according to an embodiment. FIG. 34 is a specific embodiment of the road infrastructure illustrated in FIG. 2.

As illustrated in FIG. 34, the control system of the heating wire device of the road according to an embodiment of the present disclosure may include a structure 3401 located on the road, the structure 3401 may include a sound sensor 3410 and a communication unit 3420, and an automatic control box 3460 that controls the heating wire 3470 from the freezing prevention device 3400 may be controlled under the control of the control server 3440 based on the sensing data of the sound sensor 3410.

The sound sensor 3410 may be installed on the structure 3401 so as to be located on the roadway of the vehicle and perpendicular to the road surface, but is not limited thereto.

The structure 3401 means thing that may be install the sound sensor 3410 on the road, such as a street light.

The sound sensor 3410 may transmit a sound signal to a predetermined point for sensing the road state and then receive the reflection signal.

Meanwhile, the communication unit 3420 may transmit the data acquired through the sound sensor 3410 to the control server 3440.

In addition, when the control server 3440 senses whether the sound sensor 3410 fails (or is abnormal), the control server 3440 may transmit a notification to the manager terminal 3450.

Among the freezing prevention devices, in the heating wire method, the heating wire may operate excessively than the time required to cause fire in the asphalt, so it is important to operate how much the heating wire should be.

In the present disclosure, it is possible to precisely control the freezing prevention device by sensing the temperature change of the road surface due to the heating of the heating wire by the sound sensor.

Specifically, it is possible to generate artificial intelligence models learned based on the sound sensing data accumulated in the road surface environment to which various temperatures are applied, and to automatically control the operation of the heating wire device by sensing the temperature change of the road surface by analyzing the waveforms of the sound sensors acquired based on the artificial intelligence models.

For example, the heating wire may be started after grasping whether the road surface is dry or freeze through the waveform analysis of the sound sensor, and the operation of the heating wire may be set to stop when the road surface temperature on output of the sound sensor is maintained 4 degrees Celsius or more, that is, when the temperature is above the freezing point of water.

In addition, according to the present disclosure, it is possible to sense how much the brine is sprayed onto the road surface during the operation of the brine spray device.

Specifically, it is possible to generate artificial intelligence models learned based on the sound sensing data accumulated in the various distributed road surface environment, and to analyze the waveforms of the sound sensors acquired based on the artificial intelligence models to determine the dispersed (distributed) degree (spray degree) of the brine sprayed onto the road surface. If brine is distributed over a predetermined range in the road surface, it may be set to stop the brine spray.

The present disclosure relates to a road surface sensing and interlocking control technology in which a road heating wire device or a brine spray device that is installed/operated may be operated in a time, and may accurately control the operation of the heating wire device or the brine splay device by determining the road surface state recognition and melting conditions based on the sound sensor, rather than a conventional method of obtaining road surface information by using a temperature/humidity sensor.

It can be plugged into the existing snow removal equipment monitoring/control system without major modifications, and can provide services to improve the operational efficiency of snow removal equipment based on more accurate road surface danger notifications than the existing snow removal system.

The algorithm for determining whether to perform the removing snow may be built in the control server (service server) 3440 or may be built in the controller (MCU) provided together with the sound sensor 3410, and may be in form of transmitting to the automatic control box 3460 of the freezing prevention device 3400 through the communication unit.

The sensing of the road surface state is repeatedly performed periodically until a time at which the sound sensor is required to be recovered due to a failure of the sound sensor. When the sound sensor 3410 acquires a reflected wave (sensor value) and then is transmitted to the control server 3440 (service server) through the communication unit, when the sensor state is normal, the control server 3440 analyzes the reflected wave using a big data-based artificial intelligence model to determine whether the current removing snow is necessary, and controls whether the corresponding freezing prevention device is operated.

Meanwhile, whether normal or abnormal is determined through received sensor value, when the sensor state is abnormal, the operation stop command is transmitted to the automatic control box 3460 of the freezing prevention device 3400, a push alarm is transmitted to the manager terminal 3450 for the occurrence of the abnormal, and the operation stop history is transmitted to the control server (not shown) due to the failure.

Figure 35:
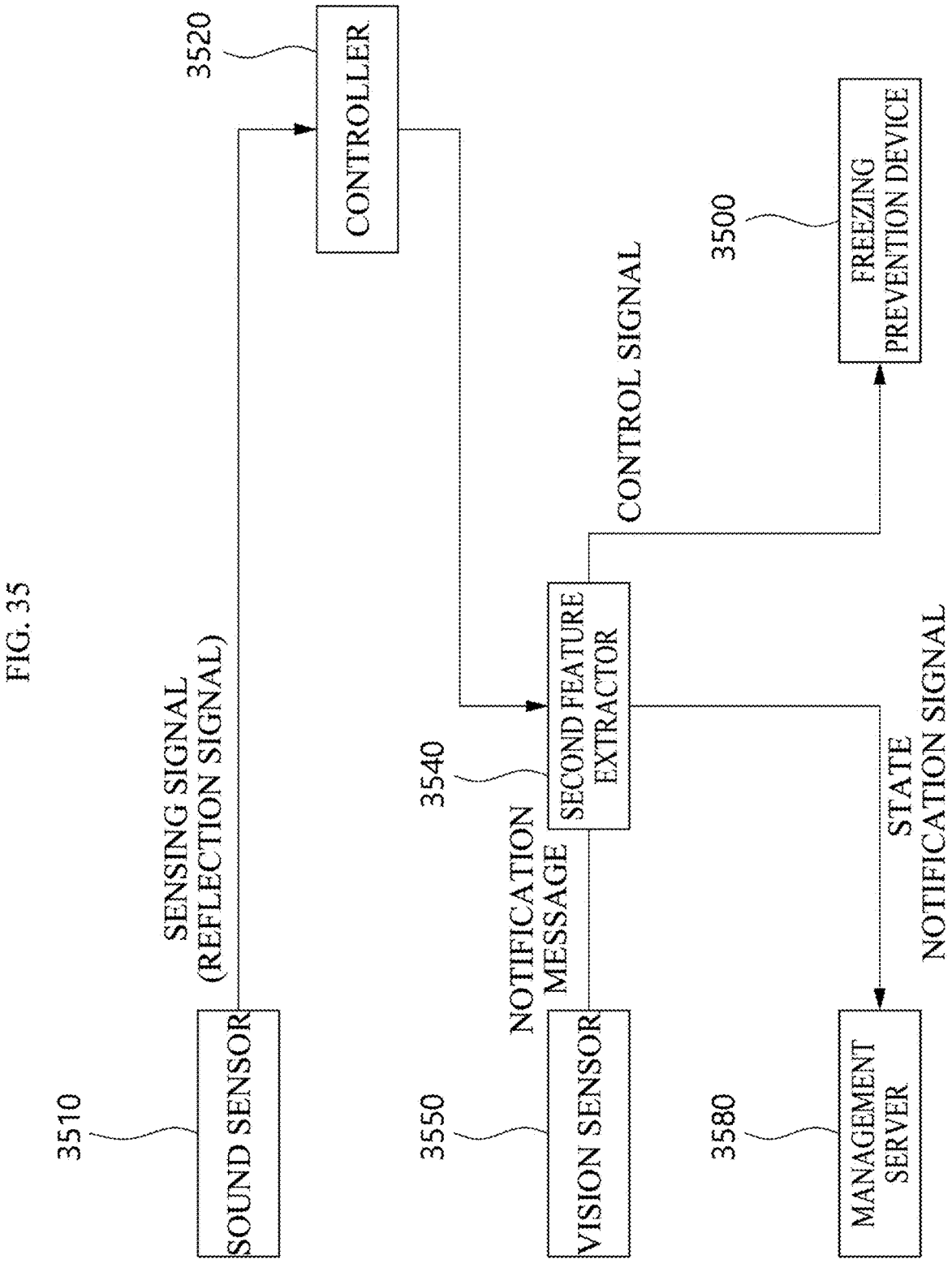
FIG. 35 is a configuration diagram of a control system of a freezing prevention device of road according to an embodiment of the present disclosure.

FIG. 35 is a configuration diagram of a control system of a freezing prevention device of road according to an embodiment of the present disclosure. The control system of FIG. 35 is a specific example of a road surface management device according to an embodiment of the present disclosure.

As shown in FIG. 35, the control system of the freezing prevention device of road according to an embodiment of the present disclosure may include the sound sensor 3510, the control server 3540, the communication unit 3520, and the freezing prevention device 3500.

The sound sensor 3510 may transmit a sound signal to a predetermined point for sensing the road surface state, and then receive the reflection signal.

The control server 3540 may sense the road surface state data of the predetermined point based on the learned artificial intelligence analysis model by using the reflection signal acquired by the sound sensor 3510 as an input signal, and generate a signal for controlling whether the freezing prevention device 3500 operates according to the road surface state data of the predetermined point.

The road surface state data may include weather conditions, a type of the road surface, a temperature of the road surface, and a brine spray amount (spray degree, distribution degree).

The communication unit 3520 may transmit the reflection signal acquired by the sound sensor 3510 to the control server 3540.

The freezing prevention device 3500 is controlled by the control server 3540 to perform an operation for preventing the road ice. The freezing prevention device 3500 may include at least one of a heating wire device or a brine spray device.

In detail, the control server 3540 may generate a control signal for operating the heating wire device when the weather condition is "rain" or "snow", the classified road surface type is "wet road" or "snow stacked road" or "frozen road", and the sensed temperature of the road surface is less than 4 degrees Celsius, and generate a control signal for stopping the operation of the heating wire device when the sensed temperature of the road surface is 4 degrees Celsius or more after the heating wire device is operated.

Meanwhile, the control server 3540 may generate a control signal for operating the brine spray device when the weather condition is "rain" or "snow", the classified road surface type is "wet road" or "snow stacked road" or "frozen road", and the sensed temperature of the road surface is less than 4 degrees Celsius, and generate a control signal for stopping the operation of the brine spray device when the sensed spray amount of brine is 80% or more after the brine spray device is operated.

Meanwhile, the control server 3540 may transmit a notification message to the manager terminal 3550 and transmit a state notification signal of the sound sensor 3510 to the management server 3580 as it is sensed that the state of the sound sensor 3510 is abnormal.

Figure 36:
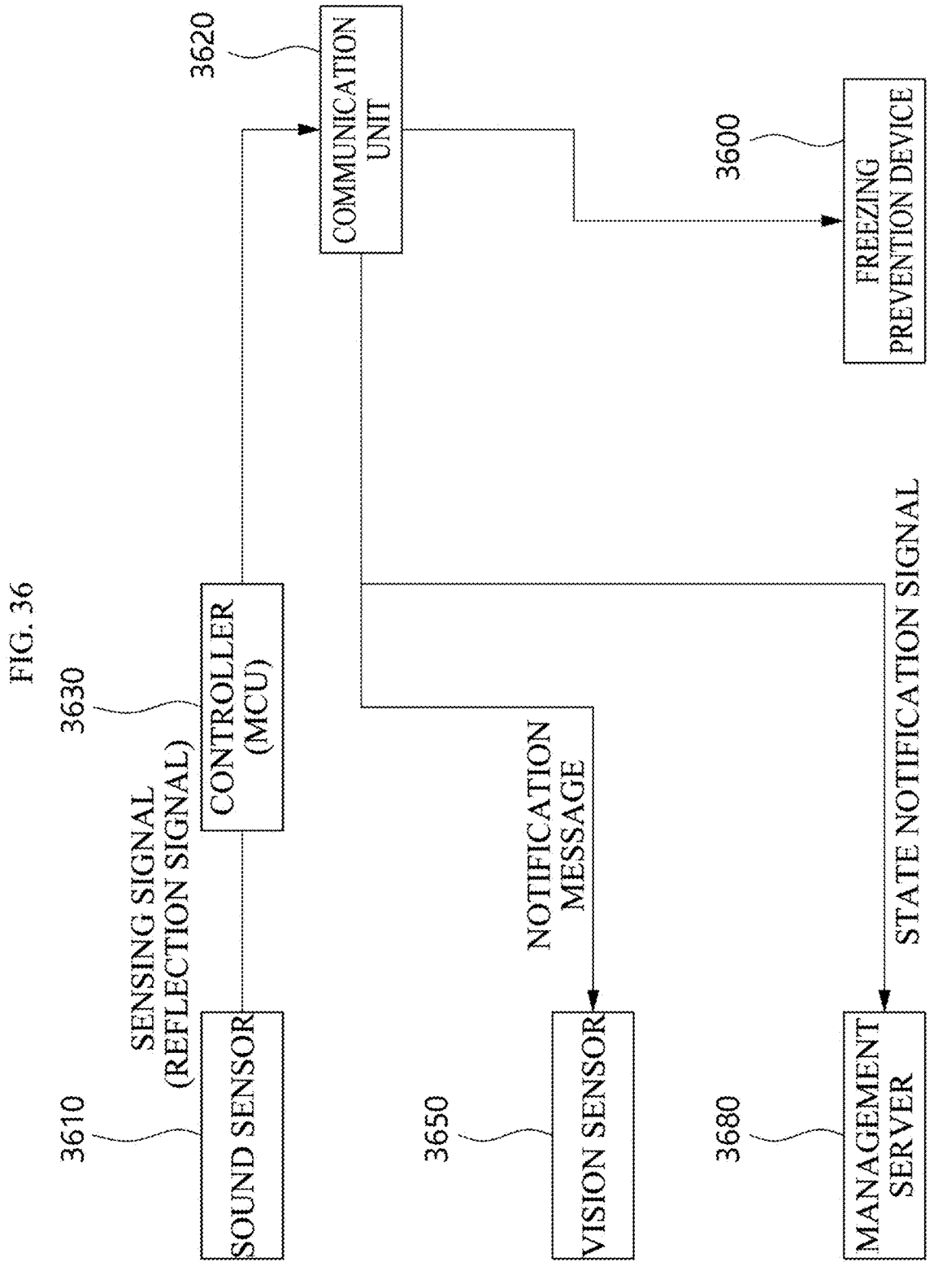
FIG. 36 is a configuration diagram of a control system of a freezing prevention device of road according to another embodiment of the present disclosure.

FIG. 36 is a configuration diagram of a control system of a freezing prevention device of road according to another embodiment of the present disclosure.

As illustrated in FIG. 36, the control system of the freezing prevention device of road according to an embodiment of the present disclosure includes a sound sensor 3610, a controller 3630, a communication unit 3620, and a freezing prevention device 3600.

The sound sensor 3610 may transmit a sound signal to a predetermined point for sensing a road condition and receive a reflection signal.

The controller 3630 may sense road surface state data at the predetermined point based on an artificial intelligence analysis model learned by using the reflection signal acquired by the sound sensor 3610 as an input signal, and generate a signal for controlling whether the freezing prevention device 3600 operates according to the road surface state data at the predetermined point.

The road surface state data may include weather condition, road surface type, road surface temperature, and brine spray amount (spray degree, distribution degree).

The communication unit 3620 may transmit a control signal generated by the controller 3630 to the freezing prevention device 3600.

The freezing prevention device 3600 is controlled by the controller 3630 to perform an operation for preventing freezing of the road. The freezing prevention device 3600 may include at least one of a heating wire device or a brine spray device.

In detail, the controller 3630 may generate a control signal for operating the heating wire device when the weather condition is "rain" or "snow", the classified road surface type is "wet" or "snowy" or "iced", and the sensed temperature of the road surface is less than 4 degrees Celsius, and generate a control signal for stopping the operation of the heating wire device when the sensed temperature of the road surface is 4 degrees Celsius or more after the heating wire device is operated.

On the other hand, the controller 3630 may generate a control signal for operating the brine spray device when the weather condition is "rain" or "snow", the classified road surface type is "wet" or "snowy" or "iced", and the sensed temperature of the road surface is less than 4 degrees Celsius, and may generate a control signal for stopping the operation of the brine spray device when the sensed amount of brine is 80% or more after the brine spray device is operated.

On the other hand, as it is sensed that the abnormality in the state of the sound sensor 3610, the controller 3630 may transmit a notification message to the manager terminal 3650, and may transmit the state notification signal of the sound sensor 3610 to the control server 3680.

Figure 37A:
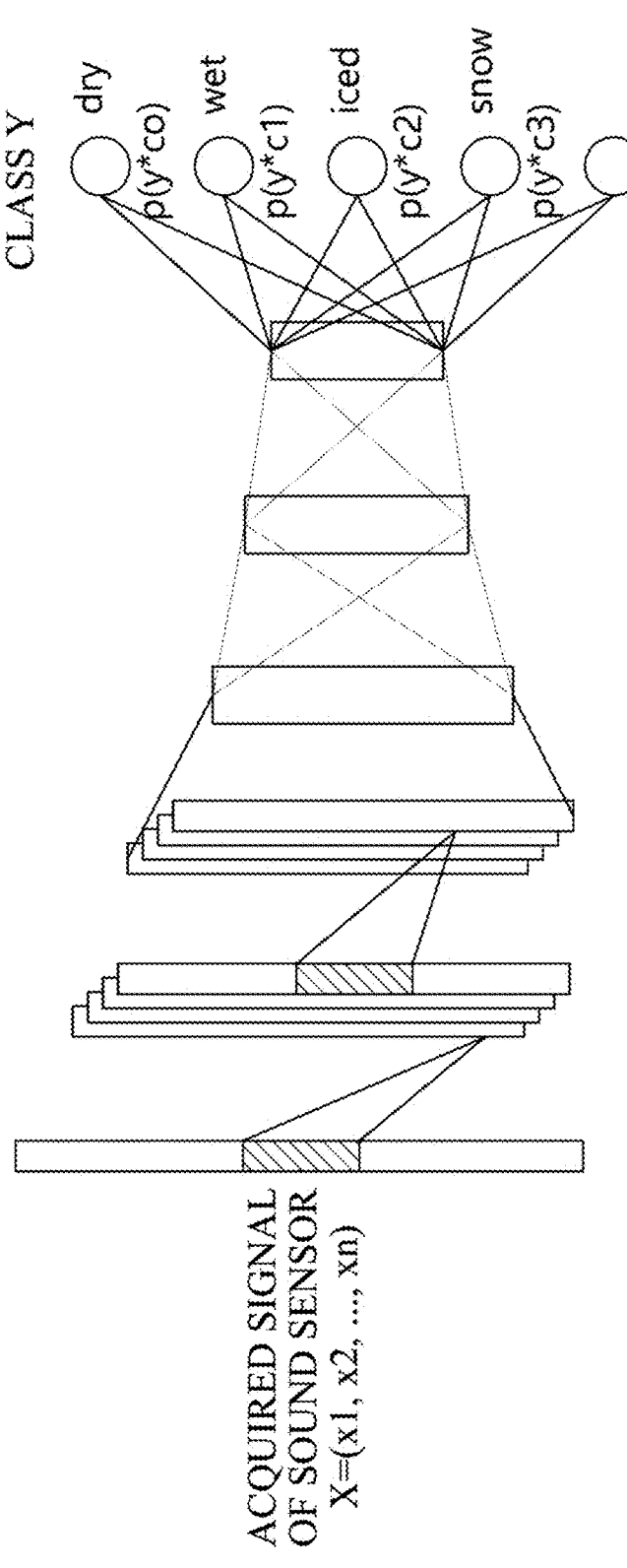
FIGS. 37A through 37C are diagrams for explaining an artificial intelligence analysis model used in a control system of a freezing prevention device of road according to an embodiment of the present disclosure.
Figure 37B:
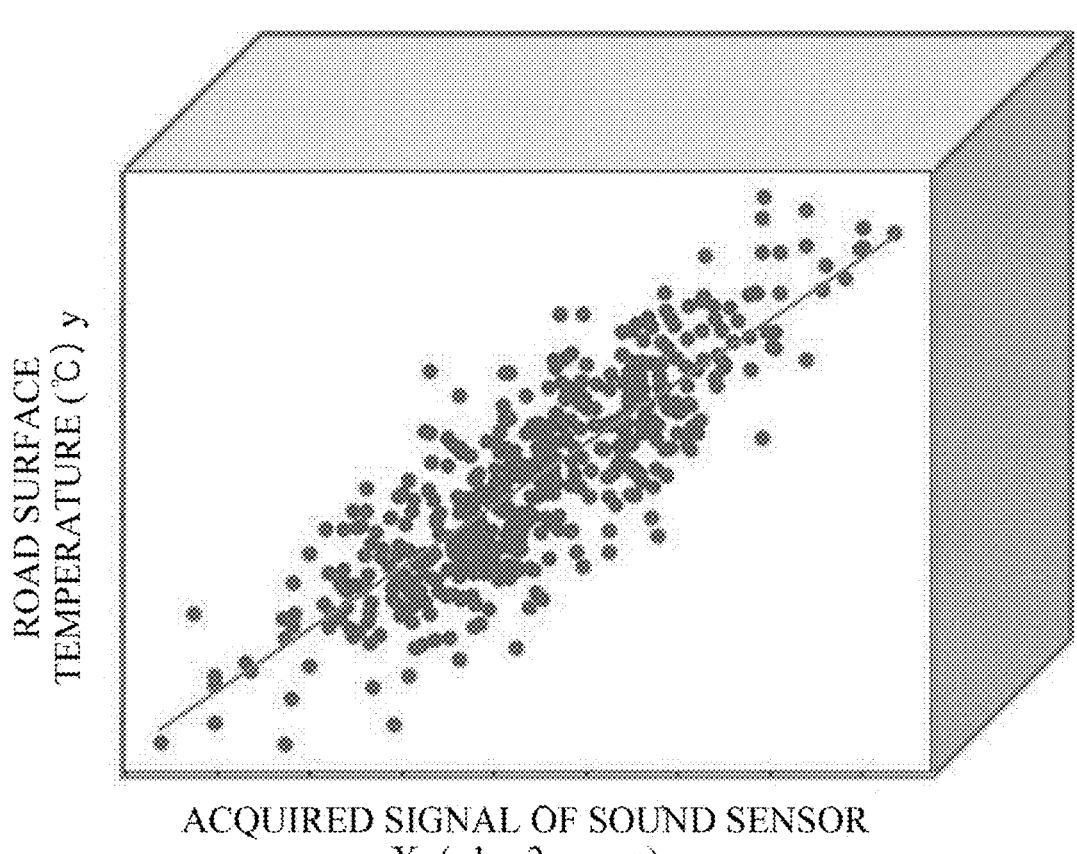
Figure 37C:
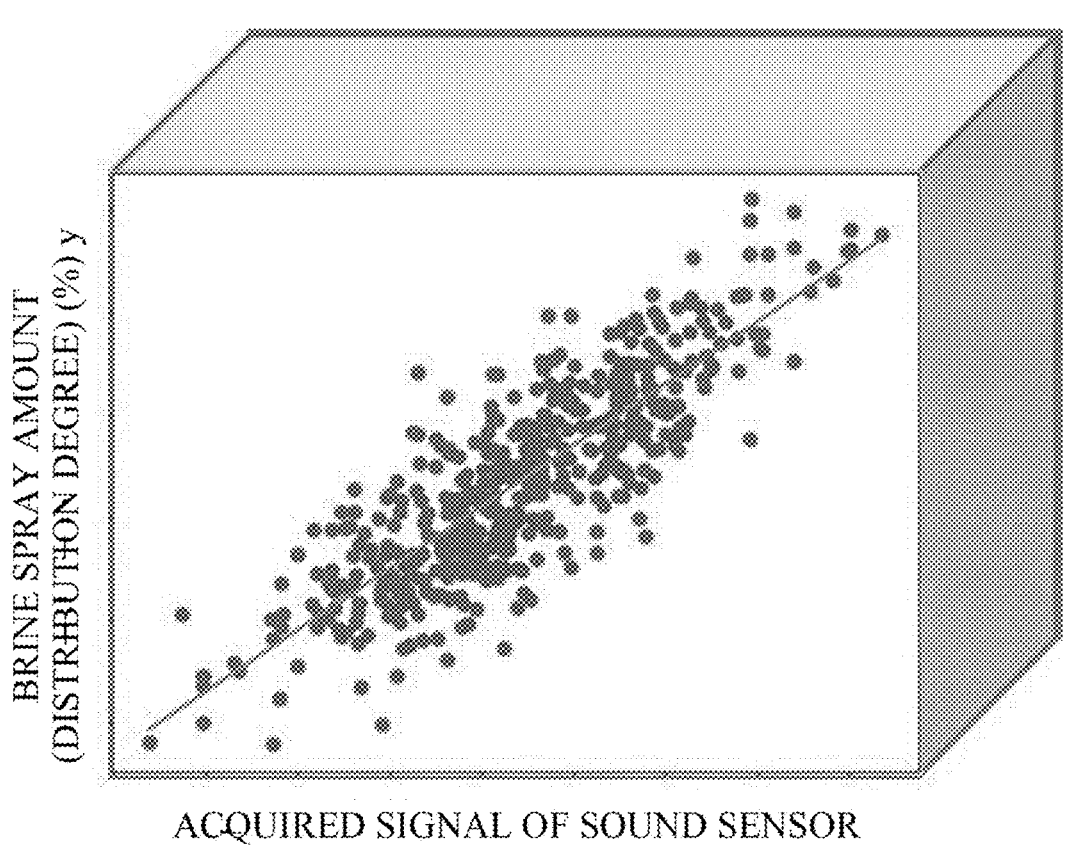

FIGS. 37A through 37C are diagrams for describing an artificial intelligence analysis model used in a control system of a freezing prevention device of road according to an embodiment of the present disclosure.

The artificial intelligence analysis model may include a weather condition classification model for classifying the weather condition based on the reflection signal acquired by the sound sensor, and a road surface type classification model for classifying the road surface type based on the reflection signal acquired by the sound sensor.

When the freezing prevention device is a heating wire device, the artificial intelligence analysis model may further include a road surface temperature regression model by learning the reflection signal acquired by the sound sensor and the temperature of the road surface together and outputting the corresponding temperature of the road surface based on the reflection signal acquired by the sound sensor.

When the freezing prevention device is the brine spray device, the artificial intelligence analysis model may further include a road surface temperature regression model by learning the reflection signal acquired by the sound sensor and the temperature of the road surface together and outputting the corresponding temperature of the road surface based on the reflection signal acquired by the sound sensor, and a brine spray amount regression model by learning the reflection signal acquired by the sound sensor and the amount of brine sprayed (distribution degree) together and outputting the corresponding amount of brine sprayed (distribution degree) based on the reflection signal acquired by the sound sensor.

That is, the artificial intelligence analysis model according to the present disclosure basically includes a weather condition classification model, a road surface type classification model, and a road surface temperature regression model, and when the freezing prevention device includes the brine spray device, the artificial intelligence analysis model may further include a brine spray amount regression model.

FIG. 37A illustrates a structure of a road surface type classification model, and the road surface type classification model is configured by sampling the acquired signal (reflection signal) of the sound sensor for a total of T times for a predetermined time, and learning the corresponding road surface type information together.

For example, number of 1000 data sampled in units of 1 ms for 1 second (×1, ×2, . . . , ×1000) and the corresponding road surface type information are learned.

As shown in FIG. 37A, the acquired signal (reflection signal) of the sound sensor may be input and the corresponding road surface type may be classified into classes such as dry, wet, iced, and snow.

Meanwhile, although not illustrated in the drawings, it may further include a weather state classification model that classifies the weather conditions based on the reflection signal acquired by the sound sensor, and this also learns the acquired signal of the sound sensor and weather information together.

FIG. 37B is a diagram for explaining a road surface temperature regression model that outputs the temperature of the corresponding road surface based on the reflection signal acquired by the sound sensor to control the heating device, and FIG. 37C is a diagram for explaining a brine spray amount regression model that outputs the distribution amount (distribution degree) (%) of the corresponding brine based on the reflection signal acquired by the sound sensor to control the brine control device.

In FIG. 37B, X is a data set formed by the concept of a hyperplane, which is a set of various values, not the relationship between the acquisition data X of the sound sensor and the temperature of the road surface is a two-dimensional (planar) graph.

Accordingly, the trained road surface temperature regression model outputs the temperature of the corresponding road surface based on the reflection signal acquired by the sound sensor.

As in FIG. 37C, X is a data set formed by the concept of a hyperplane, which is a set of various values, not the relationship between the acquisition data X of the sound sensor and the amount of sprayed brine (distribution degree) is a two-dimensional (planar) graph.

Accordingly, the trained brine spray amount regression model outputs the spray amount (distribution degree) of the corresponding brine based on the reflection signal acquired by the sound sensor.

FIG. 38 is a flowchart of an embodiment of a method of controlling a freezing prevention device of road according to the present disclosure.

First, the measurement data of the sound sensor is collected (3810).

An artificial intelligence analysis model is generated based on the collected data (3820).

The artificial intelligence analysis model generation step 3820 generates a weather condition classification model that classifies the weather condition based on the reflection signal acquired by the sound sensor, generates a road surface type classification model that classifies the type of road surface based on the reflection signal acquired by the sound sensor, and generates a road surface temperature regression model that outputs the temperature of the road surface based on the reflection signal acquired by the sound sensor by learning the reflection signal and the temperature of the road surface together.

On the other hand, when the freezing prevention device is a brine spray device, the artificial intelligence analysis model generation step 3820 learns the reflection signal acquired by the sound sensor and the spray amount (distribution degree) of brine together to generate a brine spray amount regression model that outputs the corresponding spray amount (distribution degree) based on the reflection signal acquired by the sound sensor.

That is, the artificial intelligence analysis model according to the present disclosure basically generates and includes a weather state classification model, a road surface type classification model, and a road surface temperature regression model, and when the freezing prevention device includes the brine spray device, the brine spray amount regression model is further generated.

Of course, the generated artificial intelligence analysis models should be mounted on a control server or a controller.

Thereafter, a sound signal is transmitted to a predetermined point for monitoring the state of the road using the sound sensor, and then the reflection signal is received (3830).

Thereafter, the control server or the controller senses the road surface state data at the predetermined point based on the artificial intelligence analysis model by using the reflection signal acquired by the sound sensor as an input signal.

The road surface state data sensing step 3840 senses a weather condition, a type of road surface, a temperature of road surface, and a brine spray amount (distribution degree).

Thereafter, the control server or the controller generates a control signal for controlling whether the freezing prevention device operates based on the road surface state data (3850).

Thereafter, as the control server or the controller detecting that the state of the sound sensor is abnormal, a notification message is transmitted to the manager terminal and a state notification signal of the sound sensor is transmitted to the management server (3860).

Figure 39:
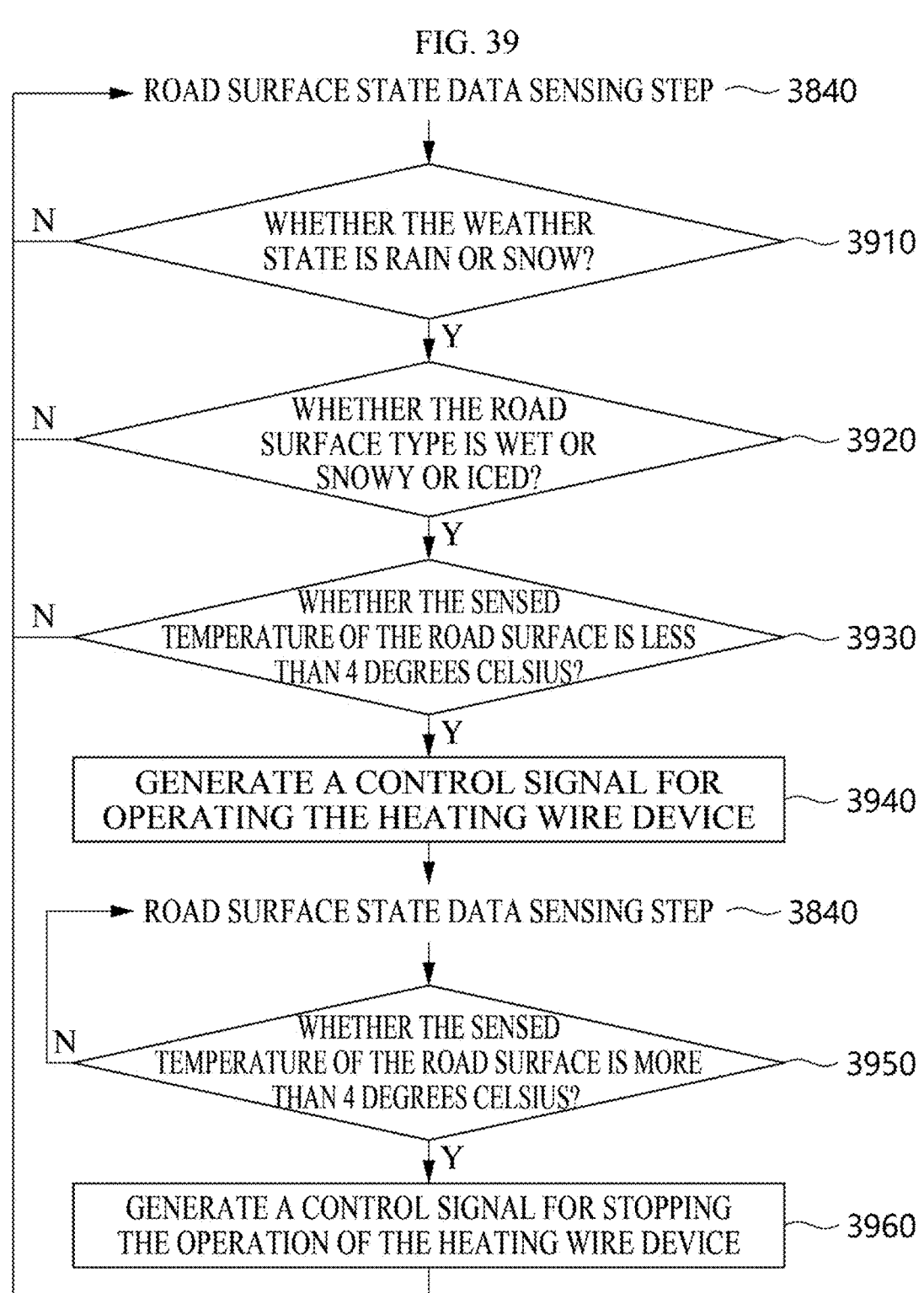
FIG. 39 is a detailed flowchart of an embodiment of the control signal generation step 3850 of FIG. 38 when the freezing prevention device of road is a heating wire device according to an embodiment of the present disclosure.

FIG. 39 is a detailed flowchart of the control signal generating step 3850 of FIG. 38 when the freezing prevention device of the road according to the present disclosure is a heating wire device.

When the freezing prevention device is a heating wire device, the control signal generating step 3850 first determines whether the sensed weather condition is "rain" or "snow" (3910).

As a result of the determination step 3910, if the weather condition is not "rain" or "snow", proceed to step "3840" to detect road surface state data.

Meanwhile, as a result of the determination step 3910, if the weather condition is "rain" or "snow", determine whether the classified road surface type is "wet" or "snowy" or "iced" (3920).

As a result of the determination step 3920, if the weather condition is "rain" or "snow", and if the classified road surface type is "wet" or "snowy" or "iced", proceed to step "3840" to detect road surface state data.

Meanwhile, as a result of the determination step 3920, if the weather condition is "rain" or "snow", and if the classified road surface type is "wet" or "snowy" or "iced", determine whether the road surface temperature is less than 4 degrees Celsius (3930).

As a result of the determination step 3930, if the road surface temperature is not less than 4 degrees Celsius, proceed to step "S540" to detect road surface state data.

Meanwhile, as a result of the determination step 3930, if the road surface temperature is less than 4 degrees Celsius, generate control signal for operating the heating wire device (3940).

Thereafter, proceed to road surface state data sensing step 3940, detect the road surface state data.

After the heating wire device is activated, determine whether the road surface temperature is more than or equal to 4 degrees Celsius (3950).

As a result of the determination step 3950, if the road surface temperature is not more than or equal to 4 degrees Celsius, proceed to step "S540" to detect road surface state data.

Meanwhile, as a result of the determination step 3950, if the road surface temperature is more than or equal to 4 degrees Celsius, generate control signal to stop operating the heating wire device (3960).

Thereafter, proceed to the road surface state data sensing step 3840 to detect road surface state data.

In other words, when the weather condition is "rain" or "Snow", the classified road surface type is "wet" or "Snowy" or "iced", and the sensed temperature of the road surface is less than 4 degrees Celsius, the heating wire device is operated, and after the heating wire device is operated, the operation of the heating wire device is stopped when the sensed temperature of the road surface is 4 degrees Celsius or more.

Figure 40:
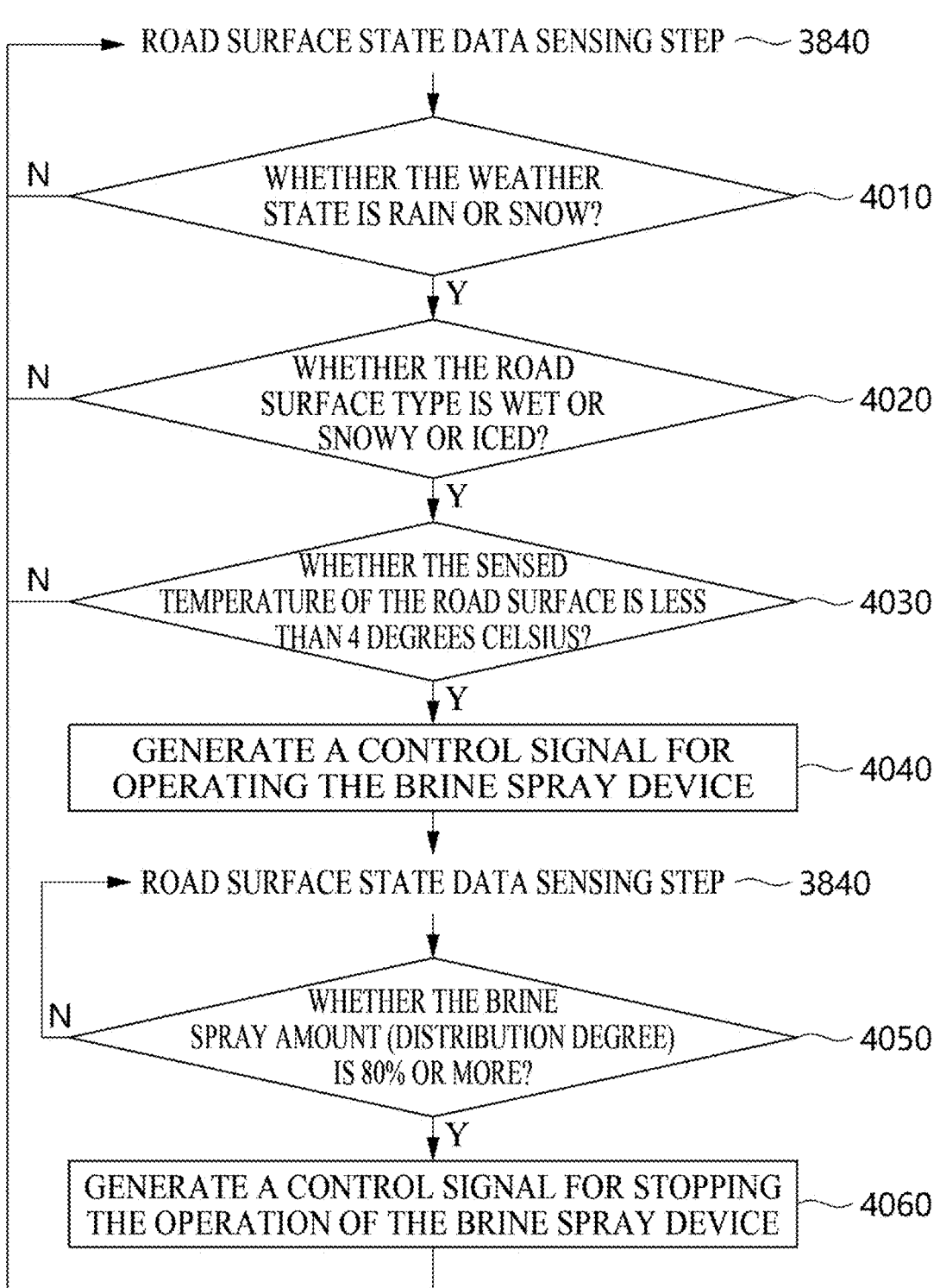
FIG. 40 is a detailed flowchart of an embodiment of the control signal generation step (3850) of FIG. 38 when the freezing prevention device of road is a brine spray device according to an embodiment of the present disclosure.
Figure 41:
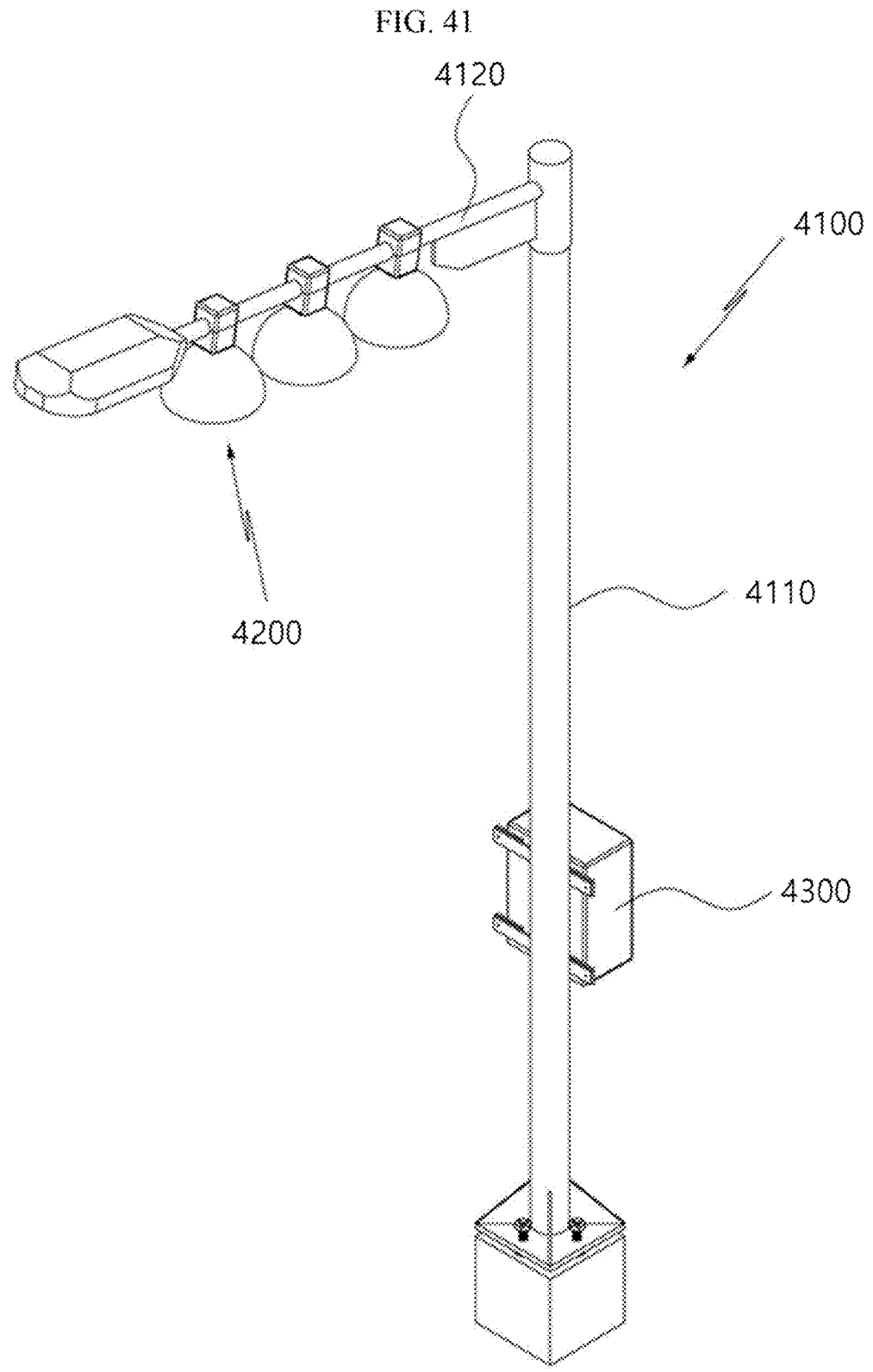
FIG. 41 is a perspective view schematically illustrating a road infrastructure sensor construction structure according to an embodiment of the present disclosure.
Figure 42:
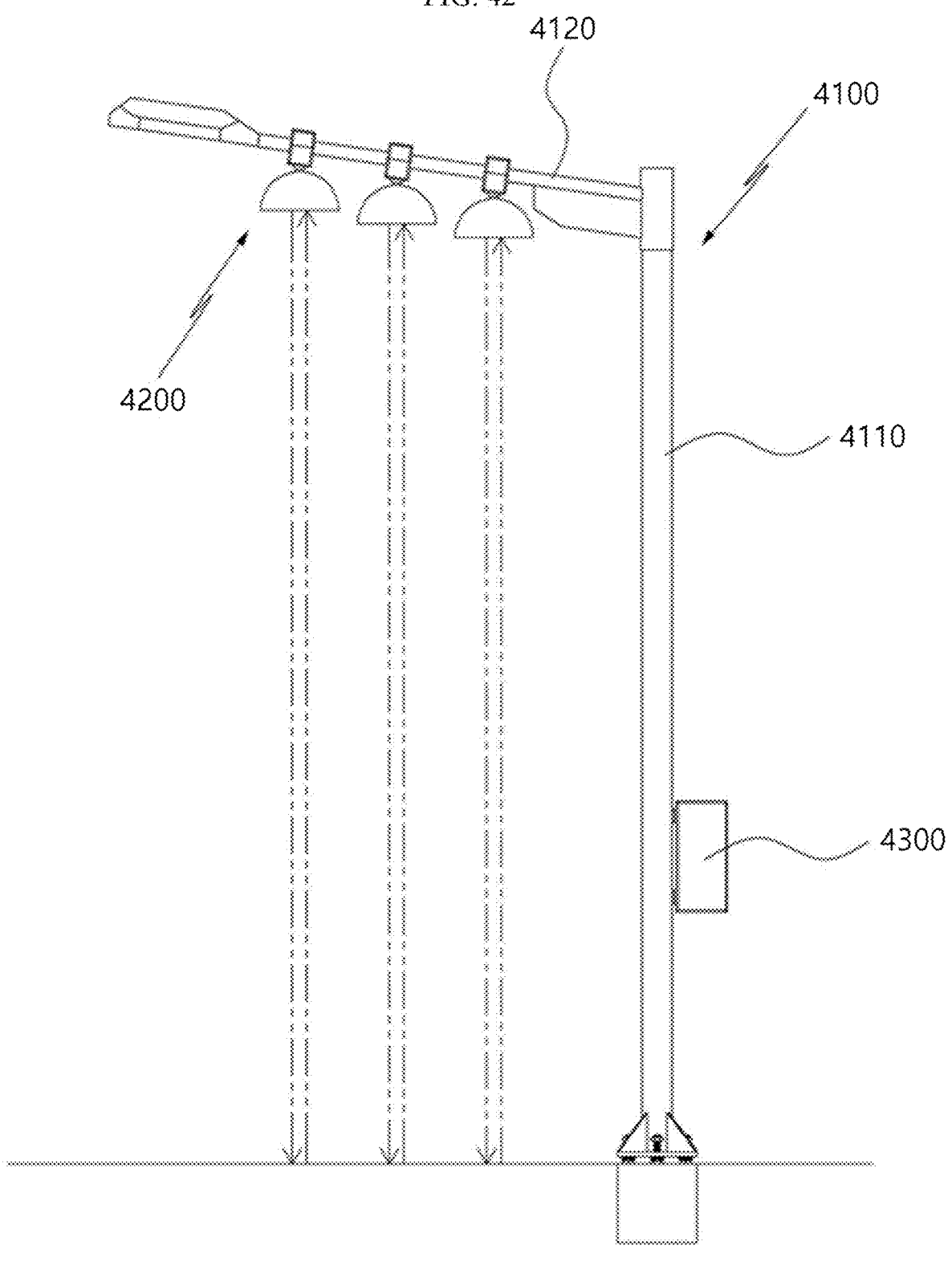
FIG. 42 is a side view schematically illustrating a road infrastructure sensor construction structure according to an embodiment of the present disclosure.
Figure 43A:
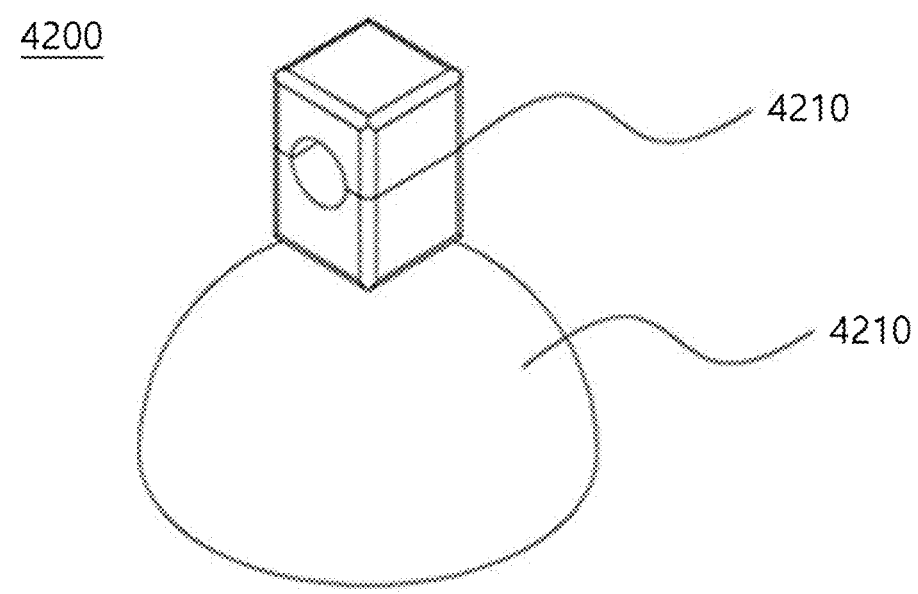
FIG. 43A is a schematic perspective view illustrating a sound sensor unit according to an embodiment of the present disclosure.
Figure 43B:
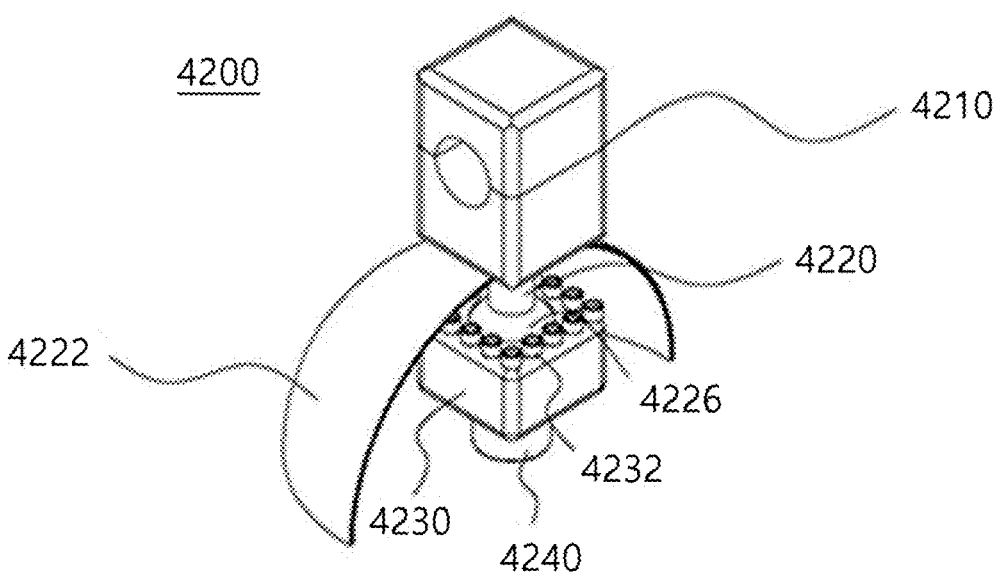
FIG. 43B is a partial cross-sectional perspective view illustrating a sound sensor unit according to an embodiment of the present disclosure.
Figure 44:
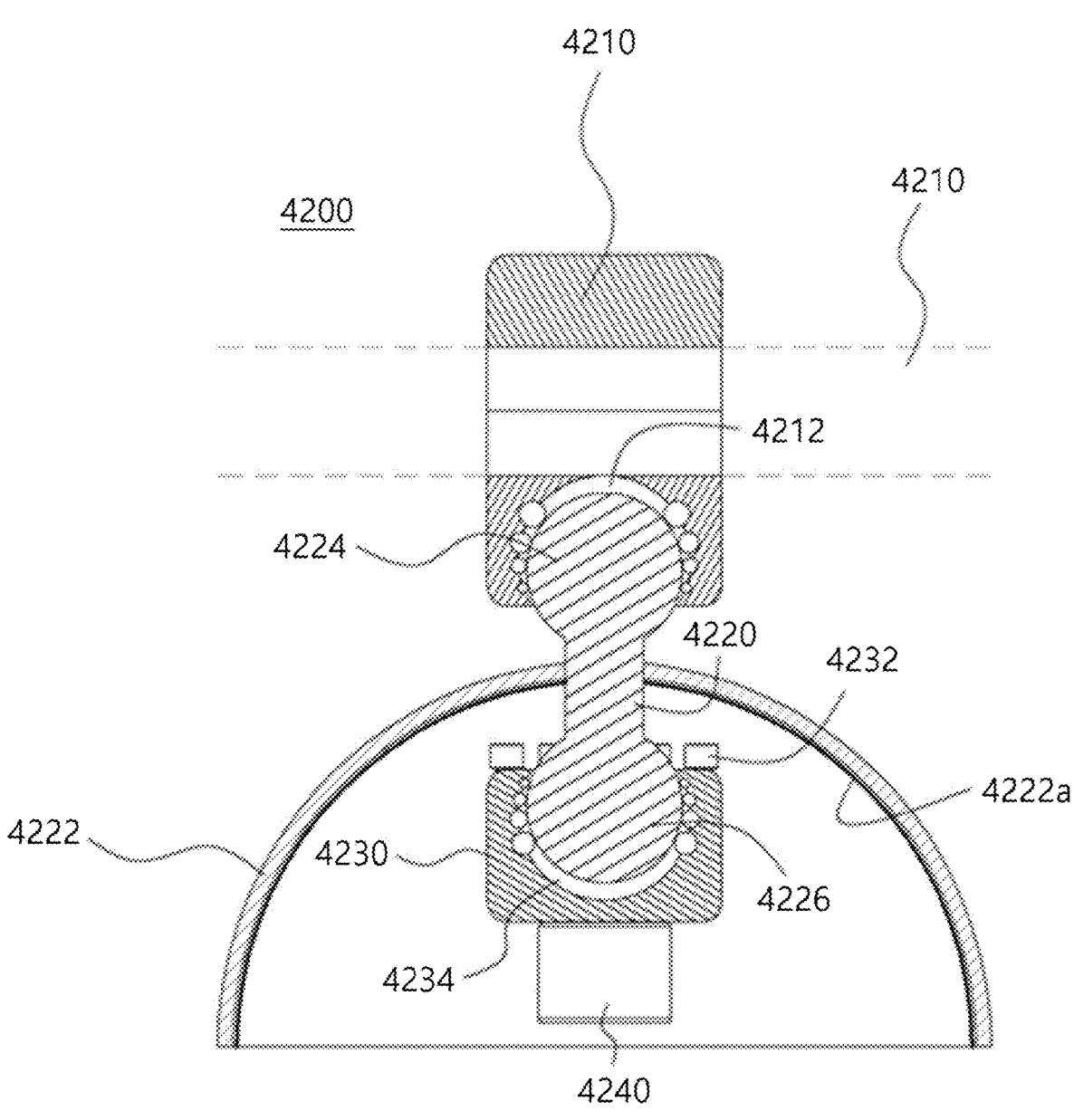
FIG. 44 is a side cross-sectional view schematically illustrating a sound sensor unit according to an embodiment of the present disclosure.
Figure 45:
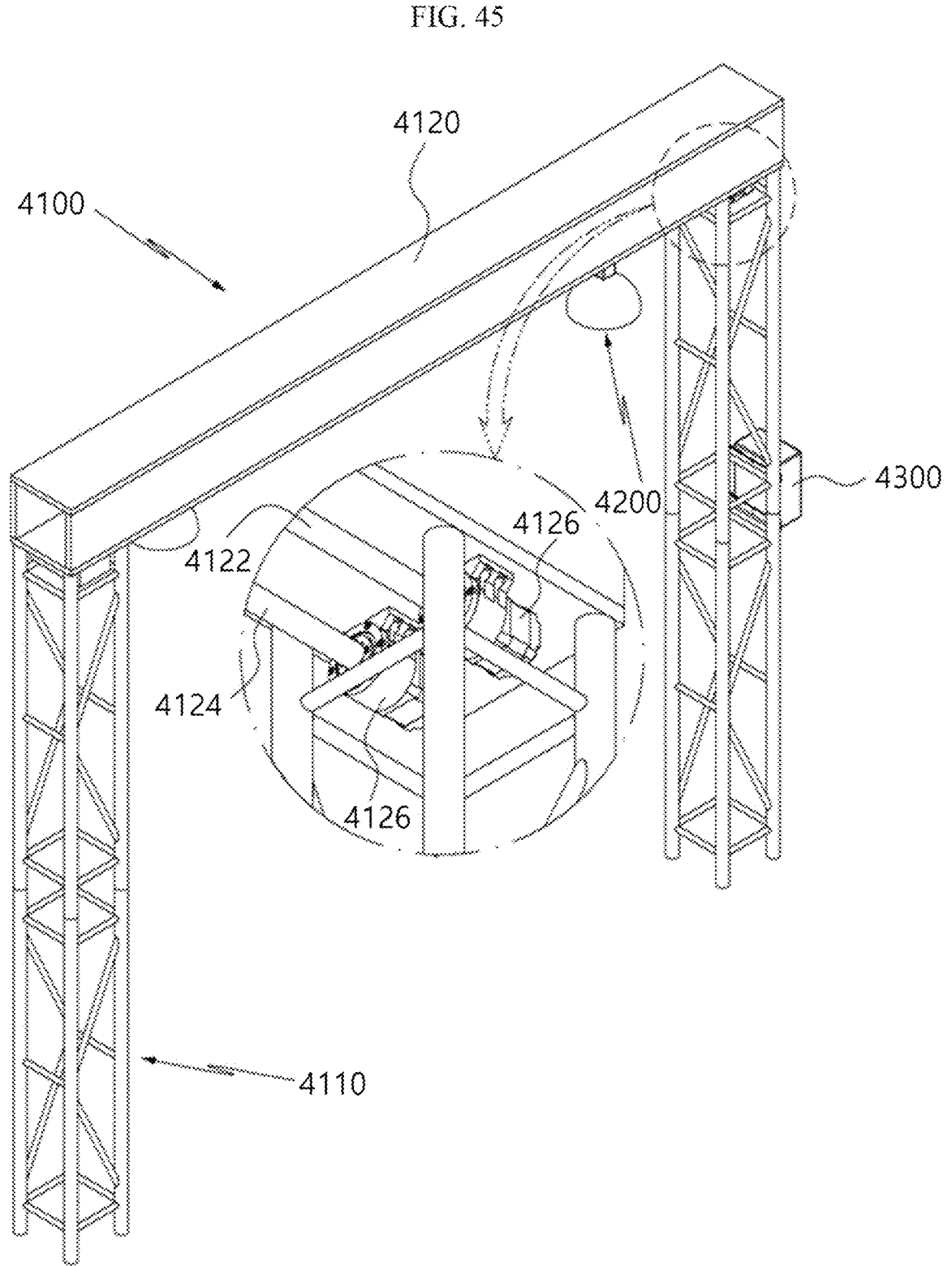
FIG. 45 is a perspective view schematically illustrating a road infrastructure sensor construction structure according to another embodiment of the present disclosure.
Figure 46:
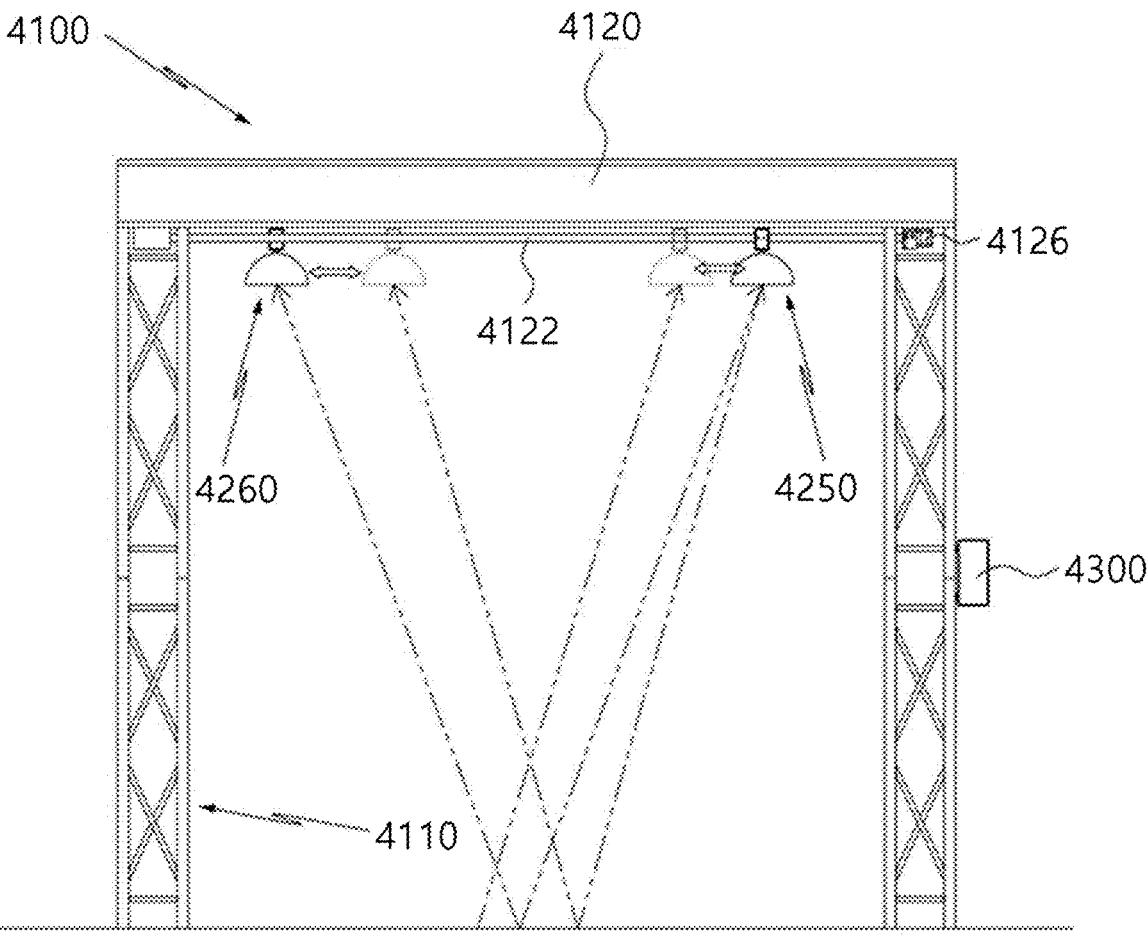
FIG. 46 is a side view schematically illustrating a road infrastructure sensor construction structure according to another embodiment of the present disclosure.
Figures 47A, 47B, 47C:
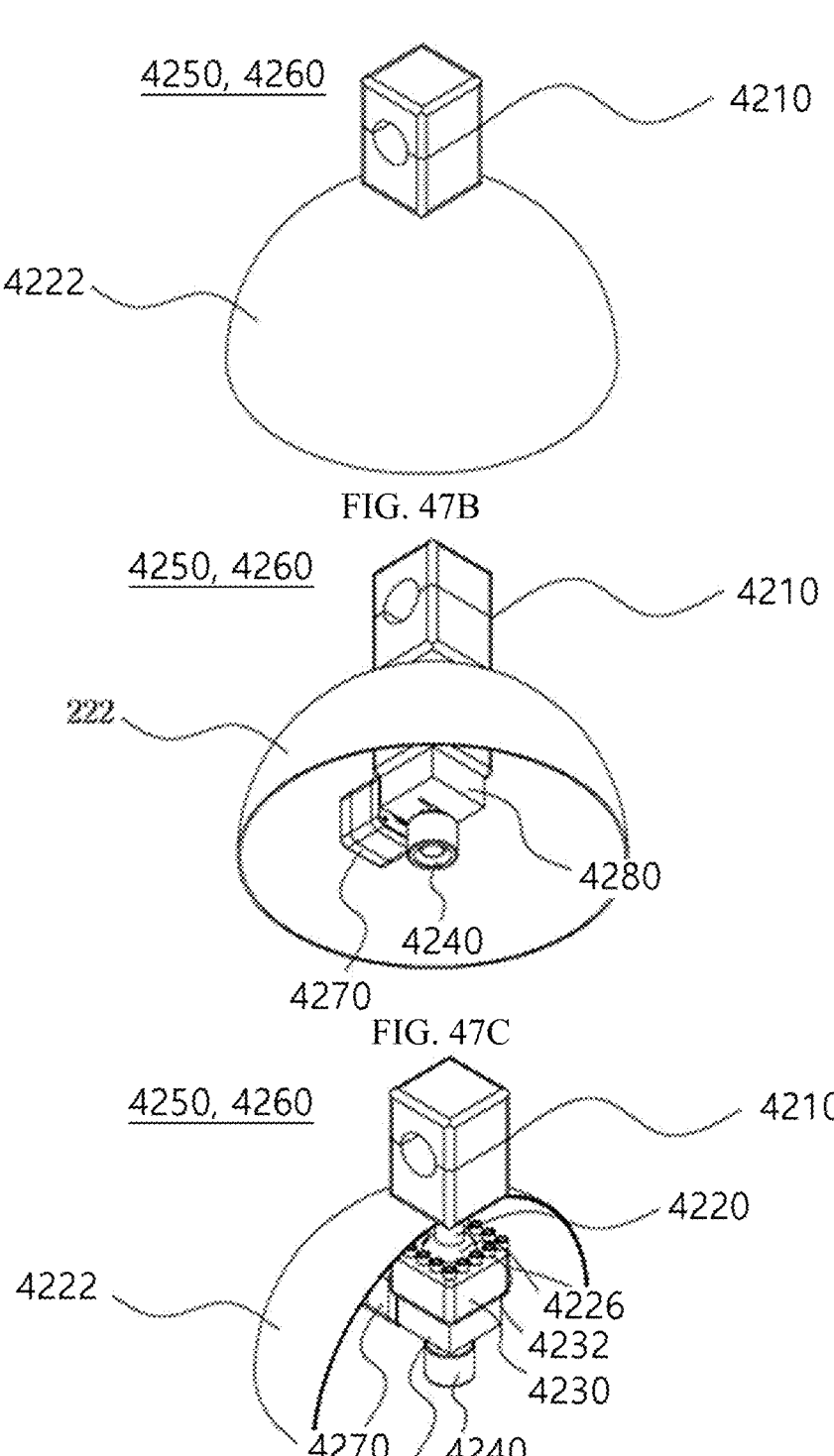
FIG. 47A is a partially enlarged perspective view schematically illustrating a road infrastructure sensor construction structure according to another embodiment of the present disclosure.
FIG. 47B is a bottom perspective view schematically illustrating a road infrastructure sensor construction structure according to another embodiment of the present disclosure.
FIG. 47C is a partially cross-sectional perspective view of FIG. 47B schematically illustrating a road infrastructure sensor construction structure according to another embodiment of the present disclosure.
Figure 48:
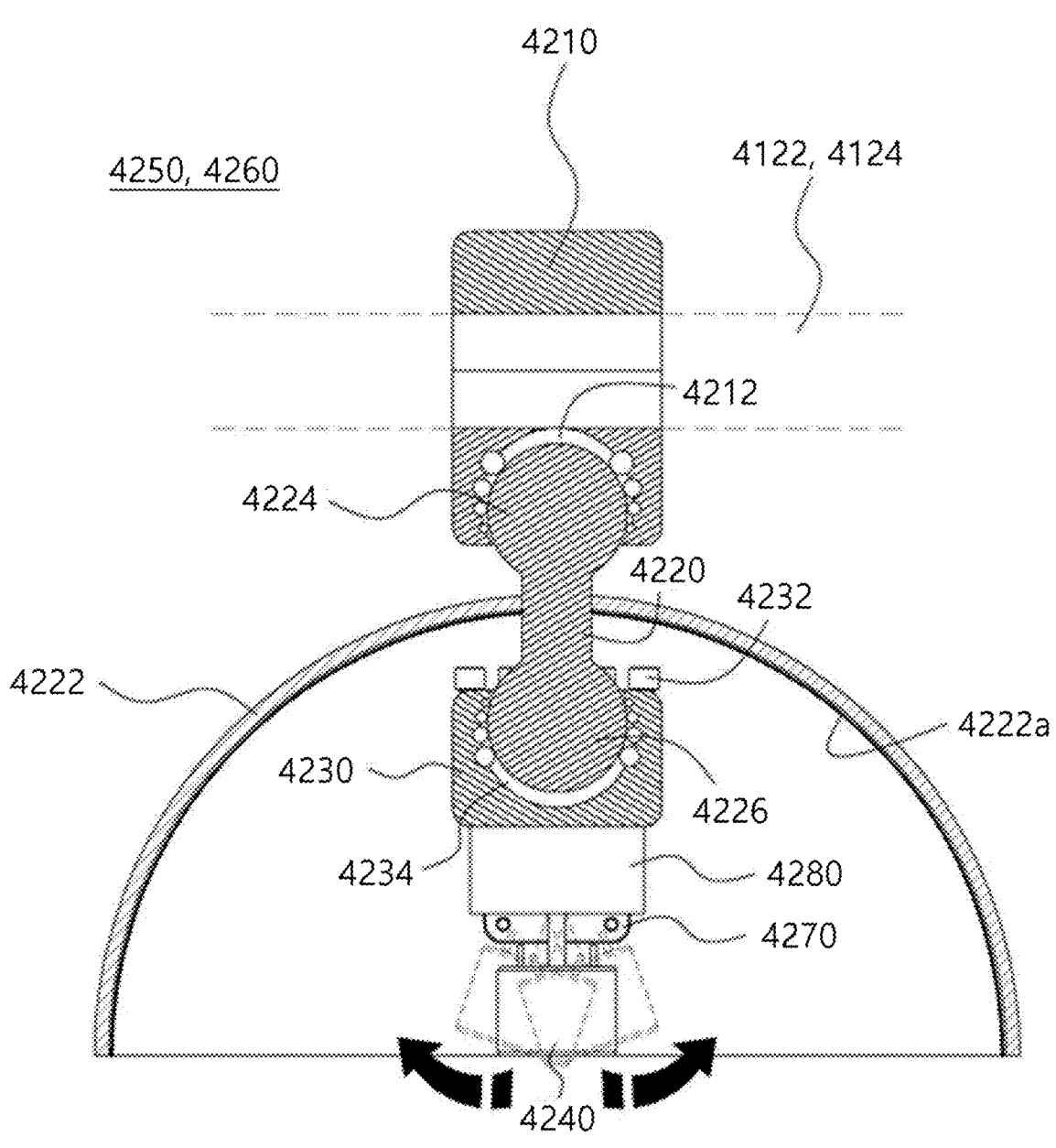
FIG. 48 is a partially cross-sectional side view schematically illustrating a sound sensor unit according to another embodiment of the present disclosure.
Figure 49:
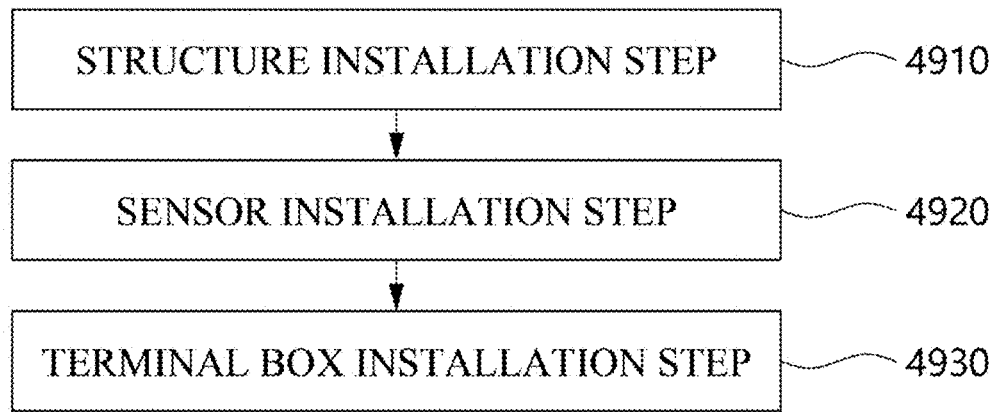
FIG. 49 is a flowchart illustrating a road infrastructure sensor construction structure construction method according to a preferred embodiment of the present disclosure.

FIG. 40 is a detailed flowchart of the control signal generation step 3850 of FIG. 38 when the freezing prevention device of road according to the present disclosure is the brine spray device.

When the freezing prevention device is the brine spray device, the control signal generation step 3850 first determines whether the sensed weather condition is "rain" or "snow" (4010).

If the weather condition is not "rain" or "Snow" as a result of the determination step 4010, proceed to step "S540" to detect the road surface state data.

Meanwhile, if the weather condition is "rain" or "Snow" as a result of the determination step 4010, determine whether the classified road surface type is "wet" or "snowy" or "iced" (4020).

If the weather condition is "rain" or "Snow" as a result of the determination step 4020, and the classified road surface type is not "wet" or "Snowy" or "iced", proceed to step "3840" to detect the road surface condition data.

Meanwhile, if the weather condition is "rain" or "Snow" as a result of the determination step 4020, and the classified road surface type is "wet" or "snowy" or "iced", determine whether the road surface temperature is less than 4 degrees Celsius (4030).

if the road surface temperature is not less than 4 degrees Celsius as a result of the determination step 4030, proceed to step "3840" to detect the road surface condition data.

Meanwhile, if the road surface temperature is less than 4 degrees Celsius as a result of the determination step 4030, generate control signal to operating the brine spray device (4040).

Thereafter, proceed to step "3840" to detect the road surface condition data.

After the brine spray device is operated, the brine spray amount (injection degree) is determined to be 80% or more (4050).

If the brine spray amount (injection degree) is not 80% or more as a result of the determination of the determination 4050, proceed to step "3840" to detect the road surface condition data.

Meanwhile, if the brine spray amount (injection degree) is 80% or more as a result of the determination step 4050, generate control signal to stop operating the brine spray device (4060).

Thereafter, proceed to step "3840" to detect the road surface condition data.

In other words, when the weather condition is "rain" or "Snow", the classified road surface type is "wet road" or "snow-stacked road" or "frozen road", and the sensed temperature of the road surface is less than 4 degrees Celsius, the brine spray device is operated, and after the brine spray device is operated, the operation of the brine spray device is stopped when the sensed brine spray amount is 80% or more.

Meanwhile, the amount of spraying (degree of spraying, distribution) of the brine to stop the operation of the brine spray device is 80% or more, but is not limited thereto.

Meanwhile, in order to control the operation of the brine spray device, all of the road surface temperature regression model and the brine spray amount regression model are used together, but the operation of the brine spray device can be controlled only using the brine spray amount regression model.

Although the above example includes a heating wire device or a brine spray device as a freezing prevention device of road, the present disclosure is not limited thereto, and it is also possible to control a system including a heating wire device and a brine spray device together.

In the above description, the methods according to the embodiment of the present disclosure can be implemented by a computer-readable recording medium having a program for implementing the methods stored thereon and/or a program stored in a computer-readable recording medium for implementing the methods.

That is, it will be easily understood by those skilled in the art that a program of instructions for implementing the methods according to the embodiment of the present disclosure is tangibly implemented, so that the program may be included in a recording medium that can be read through a computer. In other words, it may be implemented in the form of program instructions that can be performed by various computer means and recorded in a computer-readable recording medium. The computer-readable recording medium may include program instructions, data files, data structures, and the like, alone or in combination.

When the methods of the present disclosure are implemented in software, a computer-readable storage medium storing one or more programs (software modules) may be provided. The one or more programs stored in the computer-readable storage medium are configured to be executable by one or more processors in the electronic device (configured for execution). The one or more programs include instructions that cause the electronic device to execute the methods according to the embodiments described in the claims or specifications of the present disclosure.

Such a program (software module, software) may be stored in a non-volatile memory including random access memory and flash memory, a read only memory (ROM), an electrically erasable programmable read only memory (EE-PROM), a magnetic disc storage device, a compact disc-read only memory (CD-ROM), digital versatile discs (DVDs), or other optical storage devices, and a magnetic cassette. Alternatively, the memory may be stored in a memory configured by a combination of some or all of them. In addition, each configuration memory may be included in a plurality of memories.

In addition, the programs may be stored in an attachable storage device that can be accessed through a communication network such as the Internet, Intranet, Local Area Network (LAN), Wide LAN (WLAN), or SAN (Storage Area Network), or a combination of them. Such a storage device may access the device that performs the embodiments of the present disclosure through an external port. In addition, a separate storage device on the communication network may access the device that performs the embodiments of the present disclosure.

Hereinafter, a method for installing road infrastructure in road is exemplarily described. More specifically, in the following description, the structure is the structure of FIGS. 2, 23, and 34, and relates to the structure and installation method of the structure of the present disclosure.

Hereinafter, the embodiments of the present disclosure will be described in detail with reference to FIGS. 41 to 49 illustrating the embodiments of the present disclosure.

According to an embodiment of the present disclosure, the structure 4100, which is a major component of the road infrastructure sensor construction structure of the present disclosure, includes: a vertical frame 4110 seated on the road or the edge of the road; and a horizontal frame 4120 installed in the width direction of the road on the upper portion of the vertical frame 4110, and may be, for example, a structure in the form of a "¬" shaped of road light or form of a "□" shaped install to a total lighting plate or a hi-pass IC structure in South Korea, and any structure may be provided if the horizontal frame 4120 is located on the upper portion of the road, and the sound sensor unit 4200 to be described in detail later may be installed under the horizontal frame 4120 and located on the upper portion of the road. As described above, the position of the sound sensor unit of the present disclosure is illustrative and is not limited to the position depicted in the present disclosure.

According to an embodiment of the present disclosure, the sound sensor unit 4200, which is a major component of the road infrastructure sensor construction structure of the present disclosure, is installed under the horizontal frame 4120 of the structure 4100, is installed to be located on the upper portion of the road, irradiates sound signal to the road surface of the road, receives sounds reflected from the road surface of the road and generates sound information, and transmits the received sound information to the controller 4300 to be described in detail later, so that the sound information is converted into a frequency and the state of the road surface can be identified by the controller 4300.

The sound sensor unit 4200 of the present disclosure may include a transmitter that transmits sound signals to the road surface of the road, receives the reflected sound signals, and outputs the transmitted signals under the control of the controller 4300, and a receiver that receives the reflection signals reflected from the road surface of the road.

The transmitter and the receiver are located so that the sounds are transmitted and reflected in a straight-line form, and the sound sensor 4240 to be described below is represented as being configured in a state in which the transmitter and the receiver are integrated.

Meanwhile, in the method using sounds to identify the state of the road surface, since the transmitter and the receiver are fixedly installed at a certain angle, the state of only a very narrow area of the road surface is identified, and in the present disclosure, another embodiment of the sound sensor unit 4200 including a plurality of the sound sensor units 4200 and a first transceiving member 4250 and a second transceiving member 4260 that can mutually receive the reflected sound signals, so that the state of the road can be estimated with high reliability.

Specifically, the sound sensor unit 4200 of an embodiment is installed under the horizontal frame 4120 of the structure 4100, and a plurality of the road can be installed in the width direction, so that can be able to identify the reliability of the state of the road surface can be improved.

In this case, the plurality of sensor units 4200 installed in one embodiment is characterized in that the transmission time of the sounds is set so that the arrival time of the sounds irradiated and reflected from the road surface is all the same, and this is to allow the identification of the state of the road surface to be rapidly achieved by setting the transmission time of the sounds so that the characteristics of the sounds in the normal road surface state, which is the initial standard, can be relatively similarly extracted and compared.

In addition, the reason for setting the transmission time of the sounds so that the arrival time is the same is that when the sounds generate sound information using the transmission time and the arrival time, since the speed of the sounds is the same when the plurality of sound sensor units 4200 of the same equipment are installed, the arrival time of the sounds reflected from the road surface is different if the transmission time is the same by the variable based on the height of the road surface, so that the sound information generated by each of the sound sensor units 4200 needs to be analyzed, but in order to easily generate the sound information even with the arrival time of the sounds, when the sound transmission time of each of the sound sensor units 4200 is adjusted so that the arrival time of the sounds is the same according to the variable based on the height of the road surface, the difference in the sound information having different arrival time is rapidly determined, so that the identification of the state of the road surface can be easily achieved.

For example, when the transmission time of the sounds of the plurality of sound sensor units 4200 according to the height of the road surface is set so that the arrival time is the same, when the road surface is in a general state, the arrival time of the sounds is the same, and when the state of the road surface is in a state such as damage or black ice, the arrival time of the sounds is different from the predetermined arrival time of the sounds, so that the identification of the state of the entire road surface can be easily achieved, but when some of the sound sensor units 4200 differs from the predetermined arrival time of the sounds, it is possible to more rapidly check that some of the states of the entire road surface are different.

In addition, the plurality of sound sensor units 4200 of one embodiment is characterized in that when the time when the sounds are transmitted from any one sound sensor unit 4200 and reflected from the road surface and return, that is, the sound flight period is t, n sensors sequentially transmit the sounds to the road surface n times or more in total and receive the reflected sounds for the remaining t/2 hours, so that the road surface information or the traffic amount information is sampled n times or more in the predetermined period.

That is, the sound sensor unit 4200 of one embodiment realizes the effect of sampling and generating the sound information such as the road surface information and the traffic amount information by using the plurality of sound sensor units 4200, so that the state of the road surface can be more reliably achieved. In this case, it will be apparent that the sound sensor unit 4200 of another embodiment to be described in detail later also samples and generates sound information such as road surface information and traffic information through sounds.

In addition, the sound sensor unit 4200 of one embodiment includes a coupling combination 4210 which upper portion is coupled to the lower portion of the horizontal frame 4120 of the structure 4100, a connecting rod 4220 which upper portion is hinge-coupled to the lower portion of the coupling combination 4210 so that can be rotated in the front-rear and left-right directions, a main body 4230 coupled to the lower end of the connecting rod 4220, and a sound sensor 4240 installed at the lower portion of the main body 4230. In this case, the front-rear direction means the longitudinal direction of the road, the left-right direction means the width direction of the road, and the front-rear and left-right directions (lateral direction) mentioned later also means such a direction.

The coupling combination 4210 includes a lower accommodation groove 4212 formed at a lower portion and a ball bearing installed inside the lower accommodation groove 4212, and the connecting rod 4220 includes an upper sphere 4224 inserted and coupled to the inner side of the lower accommodation groove 4212 of the coupling combination (4210) at an upper end thereof, so that it is coupled in the form of a ball hinge to be rotatable in the front and back and left and right directions.

In this case, it will be apparent that the lower accommodation groove 4212 is formed in a shape corresponding to the upper sphere 4224 of the connecting rod 4220, and the connecting rod 4220 is coupled to the lower portion of the coupling combination 4210 in a ball hinge structure to be rotatable in the front and back and left and right directions, so that shaking is prevented when vibrations are generated in the structure 4100 due to vehicle traffic and external vibrations.

That is, the main body 4230 coupled to the lower end of the connecting rod 4220 and the sound sensor 4240 installed at the lower portion of the main body 4230 may prevent shaking of the connecting rod 4220 together to stably irradiate sounds irradiated to the road surface set by the sound sensor 4240.

The main body 4230 allows the sound sensor 4200 of the temporary example and the sound sensor 4200 of the other embodiment to be described in detail later to be stably installed and connected to the controller 4300 to be described in detail later to be controlled by the controller 4300, and the sound sensor 4240 generates sound information by radiating sounds to the road surface and then receiving reflected sounds and transmits the generated sound information to the controller 4300, as described above.

Next, the sound sensor unit 4200 of another embodiment includes a first transceiving member 4250 installed at one side of the lower portion of the horizontal frame 4120 of the structure 4100 to irradiate or receive sounds to or from the road surface, and a second transceiving member 4260 installed at the other side of the lower portion of the horizontal frame 4120 of the structure 4100 to irradiate or receive sounds to or from the road surface.

In this case, the first transceiving member 4250 is installed at an angle capable of receiving sounds irradiated and reflected from the second transceiving member 4260 to the road, and the second transceiving member 4260 is installed at an angle capable of receiving sounds irradiated and reflected from the first transceiving member 4250 to the road.

In other words, the sound sensor unit 4200 according to another embodiment allows any one of the first transceiving member 4250 or the second transceiving member 4260 to transmit sounds to the road surface and receive the reflected sounds by the second transceiving member 4260 or the first transceiving member 4250, thereby realizing the effect of smoothly grasping the road surface state by using the other sound transmission unit when the sound transmission unit of any one of the first transceiving member 4250 or the second transceiving member 4260 fails.

In addition, the sound sensor unit 4200 according to another embodiment adjusts the angle of any one of the first transceiving member 4250 and allows the second transceiving member 4260 or the first transceiving member 4250 to move so as to receive sounds according to the adjusted angle, thereby grasping the road surface state larger than in the related art.

In more detail, in the first embodiment of the other embodiment, the horizontal frame 4120 of the structure 4100 for installing the sound sensor unit 4200 includes a first rail 4122 installed in a longitudinal direction in front of a lower portion and a rotation motor 4126 coupled to the first rail 4122 and controlled by the controller 4300 to rotate the first rail 4122.

In the first embodiment of the other embodiment, the sound sensor unit 4200, that is, the first transceiving member 4250 and the second transceiving member 4260 are installed at one side and the other side of the first rail 4122 and moved in opposite directions according to the rotation of the first rail 4122, a connecting rod 4220 coupled to the lower portion of the connecting rod 4220 so that the upper portion is rotatable in the front and rear and left directions, a main body 4230 coupled to the lower end of the connecting rod 4220, a driving motor 4270 installed at the lower portion of the main body 4230 and controlled by the controller 4300, and a sound sensor 4240 installed at the lower portion of the driving motor 4270 and rotated in the width direction of the road by the driving motor 4270 to adjust the angle.

In other words, the sound sensor unit 4220 according to the first embodiment of the other embodiment receives the sounds of the road surface area initially set, and adjusts the angle and the road width direction position of the first transceiving member 4250 and the second transceiving member 4260 by the controller 4300, thereby receiving the sounds of the road surface area other than the road surface area initially set, thereby grasping the road surface state larger than in the related art, thereby improving the reliability of grasping the road surface state.

In this case, the coupling relationship between the first rail 4122 and the coupling combination 4210 is formed in a direction of threads differently from one side of the first rail 4122 to the outer periphery of the other side, and the one side of the first rail 4122 and the other side of the coupling combination 4210 are penetrated and screw-coupled to each other, so that the coupling combination 4210 is moved in the lateral direction, that is, one side or the other side direction, along the first rail 4122 rotated by the rotation motor 4126, and the pair of coupling combinations 4210 are moved in the opposite direction along the threads formed on the outer periphery of both sides of the first rail 4122.

In addition, in more detail, the second embodiment of the other embodiment, the horizontal frame 4120 of the structure 4100 for installing the sound sensor unit 4200 includes a first rail 4122 installed in a longitudinal direction in front of the lower portion, a second rail 4124 installed in a longitudinal direction in rear of the lower portion, and a rotation motor 4126 coupled to the first rail 4122 and the second rail 4124, respectively, and controlled by the controller 4300 to be described in detail later, to rotate the first rail 4122 and the second rail 4124.

The sound sensor unit (4200) of Embodiment 2 of another embodiment, that is, the first transceiving member (4250) and the second transceiving member (4260) include coupling combination 4210 that are installed in any one of the first rail 4122 or the second rail 4124 so that moved according to the rotation of the first rail 4122 or the second rail 4124; the main body 4230 installed under the coupling combination 4210; the driving motor 4270 controlled by the controller 4300; sound sensor 4240 installed under the driving motor 4270 and rotated in the width direction of the road by the driving motor 4270 to adjust the angle.

In other words, the sound sensor unit 4200 of the second embodiment of the other embodiment is configured to receive the sounds of the road surface area of the first set road and adjust the angle and road width direction position of the first transceiving member 4250 and the second transceiving member 4260 by the controller 4300 so as to receive the sounds of other road surface areas other than the road surface area of the first set road and thus achieve the effect of improving the reliability of grasping the state of the road surface by identifying wider range of the road surface conditions than conventional.

In this case, the coupling relationship between the first rail 4122 and the second rail 4124 and the coupling combination 4210 is formed with threads on the outer periphery of the first rail 4122 and the second rail 4124, and the first rail 4122 and the second rail 4124 are threaded and coupled to the coupling combination 4210, so that the coupling combination 4210 is moved in the lateral direction, that is, one side or the other side, along the first rail 4122 and the second rail 4124, which are rotated by the rotation motor 4126.

In addition, the coupling relationship between the driving motor 4270 and the sound sensor 4240 of embodiment 1 and embodiment 2 of the other embodiment is such that the driving motor 4270 and the sound sensor 4240 rotated left and right according to operation are coupled through a gearbox 4280, and the driving motor 4270 is controlled by the controller 4300 to be described in detail later, so that the installed angle of the sound sensor 4240 is adjusted.

In addition, the first transceiving member 4250 and the second transceiving member 4260 of Embodiment 1 and Embodiment 2 of the other embodiments may include a connection rod 4220 rotatably hinge-coupled to the coupling combination 4210 in the front and back and left directions, similar to the sound sensor unit 4200 of the previously described embodiment.

In more detail, the first transceiving member 4250 and the second transceiving member 4260 of embodiment 1 and embodiment 2 of the other embodiments are configured to include a connecting rod 4220 that the upper portion is coupled to the lower portion of the coupling combination 4210 so that is rotatable in the front-rear and left-right directions, and the main body 4230 of the first transceiving member 4250 and the second transceiving member 4260 is coupled to the lower end of the connecting rod 4220, so that the coupling combination 4210, the connecting rod 4220 and the main body of the sound sensor unit 4200 of one embodiment have the same structure. In this case, the coupling combination 4210 and the connecting rod 4220 are configured to be the same as the configuration of the sound sensor unit 4200 of the previous embodiment.

That is, when the vibration is generated in the structure 4100 by the connecting rod 4220, the sound sensor unit 4200, that is, the first transceiving member 4250 and the second transceiving member 4260 of Embodiments 1 and 2 of the other embodiments, the shaking of the connecting rod 4220, the main body, and the sound sensor 4240 is prevented, so that the radiation and reception of the sounds can be more stably performed.

In addition, the main body 4230 of Embodiments 1 and 2 of the other embodiments includes an upper accommodation groove 4234 formed in the upper portion and a ball bearing installed inside the upper accommodation groove 4234, and the connecting rod 4220 may include a lower sphere 4226 inserted into and coupled to the inner side of the upper accommodation groove 4234 of the main body 4230 at a lower end, and accordingly, the main body 4230 is coupled to the connecting rod 4220 in the form of a ball hinge so as to be rotatable in the front-rear and left-right directions to prevent secondary shaking, so that the transmission and reception of the sounds can be more stably performed from the sound sensor 4240.

In addition, the connecting rod 4220 of Embodiments 1 and 2 of the other embodiments includes a protective member 4222, which is coupled to the upper outer periphery, and is coupled to the outer periphery of the connecting rod 4220 so that the center is penetrated, and is located at the upper portion of the sound sensor 4240, and is formed in a circular shape of a curved surface convex to the upper portion, so that the lower portion is opened, and a reflective layer 4222 a capable of reflecting the sounds is formed on the inner surface.

That is, the protective member 4222 is coupled to the connecting rod 4220 through its center, and is coupled to be positioned to the upper portion of the sound sensor 4240 so that the signal of the sounds reflected from the road surface can be reflected and received by the reflective layer 4222 even if the signal of the sounds is not directly received by the sound sensor 4240, so that as many sound signals can be received as possible.

This can achieve the effect of receiving as many sounds normally moving straight in the line of sight, thereby improving the reliability of the measurement by the sounds, and as a result, the reliability of the understanding of the state of the road surface can be improved.

In addition, the protective member 4222 can protect the upper portion of the sound sensor 4240 so that the sound sensor 4240 can minimize the damage caused by ultraviolet rays or rainwater or the reception of the sounds or by the bird's excreta.

In this case, as the protective member 4222 is included, the main body 4230 includes a plurality of auxiliary reception sensors 4232 installed at the upper portion, and the auxiliary reception sensors 4232 can realize the effect of receiving the reflected sounds more stably because the sounds reflected by the reflective layer 4222 are difficult to be received by the main body 4230 located at the upper portion of the sound sensor 4240.

In addition, the rotation motor 4126 of Embodiments 1 and 2 of Embodiments 1 and 2 of the other embodiments each has a rotation rod connected to the first rail 422 and the second rail 4124, and the upper portion is fixedly coupled to the lower portion of the horizontal frame 4120.

Meanwhile, the sound sensor unit 4200 according to an embodiment different from the present disclosure is characterized in that, when a sound is radiated to the road surface of the road, the frequency of the sound is radiated differently for each predetermined time through the controller 4300, and this enables the generation of sound information that enables the state of the road surface to be determined in more detail through different frequencies, thereby achieving an effect of grasping the state of the road surface that is more reliable.

For example, the sound sensor unit 4200 according to an embodiment different from the present disclosure emits 40 kHz of sound to the road surface at normal time, when the sound reaches a predetermined time, 80 kHz of sound is radiated to the road surface by the controller 4300, and when the sound reaches a predetermined time, 120 kHz of sound is radiated to the road surface by the controller 4300, thereby generating sound information that enables the detailed state of the road surface to be determined.

That is, the sound sensor unit 4200 according to an embodiment different from the present disclosure is characterized in that, when a sound is radiated to the road surface of the road, the frequency of the sound is radiated differently for each predetermined time, and by radiating the sound over a predetermined N time, the state of the road surface is grasped in more detail, thereby realizing an effect of further improving the reliability of grasping the state of the road surface.

The controller 4300, which is a major component of the road infrastructure sensor construction structure of the present disclosure, is installed in the vertical frame 4110 of the structure 4100, receives sound information from the sound sensor unit 4200, and transmits the sound information to the central management server, and specifically, extracts the characteristics of the sound signal from the sound information received from the sound sensor 4240, classifies the sound information to grasped the state of the road surface, and then estimates the state of the road surface, and transmits the estimated state of the road surface to the central management server, thereby taking measures to prevent accidents caused by the current state of the road surface from being prevented in advance.

The controller 4300 according to the present disclosure controls not only the above-described sound sensor 4240 but also automatically controls the rotation motor 4126 and the driving motor 4270 to a predetermined input value, or controls the rotation motor 4126 and the driving motor 4270 by the input information of the central management server.

In addition, the controller 4300 according to the present disclosure may include a signal converter that performs frequency conversion on a predetermined region on the domain of the sound information received from the sound sensor 4240 to acquire a frequency domain signal, an artificial neural network that extracts the characteristics of the input signal based on the road surface classification model learned by using the frequency domain signal as an input signal, and classifies the input signal to estimate the state of the road surface, and controls them.

That is, the controller 4300 may be included in the distribution board or the terminal box and installed together in the vertical frame 4110 of the structure 4100, and may include a wired or wireless communication unit to transmit sound information to the central management server.

A method of construction of the road infrastructure sensor construction structure of the present disclosure will be described in detail below.

The construction method of the road infrastructure sensor construction structure of the present disclosure is configured to include a structure installation step 4S10 that installs structure 4100, a sensor installation step 4S20 that installs sound sensor unit 4200 on the structure 4100, and a terminal box installation step 4S30 that installs a controller 4300 on the structure 4100.

The structure installation step 4S10 installs the vertical frame 4110 on the edge of the road or the road, and installs the structure 4100 including the vertical frame 4110 and the horizontal frame 4120 by coupling the horizontal frame 4120 to the upper portion of the vertical frame 4110 in the width direction of the road.

In this case, if the structure 4100 is as form as the same shape as the street light shown in FIGS. 41 to 44, installs by method above describe, if as form as the shape as the advertising board structure shown in FIGS. 45 to 48, a pair of vertical frames 4110 are installed, and thereby a horizontal frame 4120 connecting the upper portion of the pair of vertical frames 4110 is installed.

In addition, it will be apparent that the first rail 4122 and the second rail 4124 are installed under the horizontal frame 4120 when the sound sensor unit 4200 of the other embodiments described above are installed.

Meanwhile, the structure installation step 4910 of the present disclosure may be omitted because the structure 4100, such as the street light or the electro-optical board structure, has been previously installed.

The sensor installation step 4920 includes installing the sound sensor unit 4200 that receiving the reflected sounds after radiating the sounds to the road surface to the horizontal frame 4120 of the structure 4100 after the structure installation step 4910 and, installing the coupling combination 4210 under the horizontal frame 4120 described above.

In this case, the coupling combination 4210 is fixedly coupled to the lower portion of the horizontal frame 4120 when the sound sensor unit 4200 of the embodiment is installed, and is movably installed in the first rail 4122 and the second rail 4124 installed under the horizontal frame 4120 when the sound sensor unit 4200 of the other embodiment is installed.

The coupling combination 4210 includes a connecting rod 4220 coupled to the lower portion when the sound sensor unit 4200 of the embodiment is installed, a protection member 4222 installed on the outer periphery of the connecting rod 4220, a main body 4230 coupled to the lower portion of the connecting rod 4220, a plurality of auxiliary reception sensors 4232 coupled to the upper portion of the main body 4230, and a sound sensor 4240 coupled to the lower portion of the main body 4230. Or, in case that the sound sensor unit 4200 according to the other embodiment is installed, a connecting rod 4220 coupled to the lower portion; a protection member 4222 installed on the outer periphery of the connecting rod 4220, a main body 4230 coupled to the lower portion of the connecting rod 4220, a plurality of auxiliary reception sensors 4232 coupled to the upper portion of the main body 4230, a driving motor 4270 coupled to the lower portion of the main body 4230, and a sound sensor 4240 coupled to the lower portion of the driving motor 4270 are coupled already.

The terminal box installation step 4930 is installing the controller 4300 connected to the vertical frame 4110 of the structure 4100 with the sound sensor unit 4200 and connected to the central management server in a wired or wireless manner after the sensor installation step 4920, and the sound sensor unit 4200 is electrically connected such that the sound sensor unit 4200 may be controlled by the controller 4300.

In this case, the terminal box installation step 4930 may further include an initial transmission setting step of setting the sound transmission time so that the arrival time of the sounds reflected and received by the plurality of sound sensor units 4200 is all the same when the sound sensor unit 4200 of one embodiment is installed, or an initial transmission setting step of setting the first transceiving member 4250 and the second transceiving member 4260 that are initially installed to receive the mutually transmitted sounds when the sound sensor unit 4200 of another embodiment is installed.

As a result, the road infrastructure sensor system construction structure and its construction method of the present disclosure can smoothly recognize the state of the road surface without contact through the sound, and can improve the reliability of estimating the state of the road surface by recognizing the state of the road surface by a wide measurement range compared to the conventional, and can improve the measurement reliability of the road surface by receiving a large number of sounds through the protective member 4222 having the reflective layer 4222 *a*, which is difficult to receive even a small disturbance due to the characteristics of the sound having straightness, and by minimizing the shaking of the sound sensor unit 4200 through the ball hinge structure when the structure 4100 is vibrated due to vehicle passage or disturbance, and at the same time minimizing the natural frequency generated by the vibration of the structure 4100 from being received through the protective member 4222, the effect of improving the measurement reliability by minimizing the measurement error can be obtained.

In the above-described specific embodiments of the present disclosure, the components included in the disclosure are expressed in a single or plural according to the specific embodiments presented. However, the expressions in a single or plural are selected to suit the situation presented for convenience of explanation, and the present disclosure is not limited to the expressions in a single or plural, and the components expressed in plural may be composed in a single or plural.

Meanwhile, the embodiments of the present disclosure disclosed in this specification and the drawings are merely presented to easily explain the technical contents of the present disclosure and to help understand the present disclosure, and are not intended to limit the scope of the present disclosure. That is, it is apparent to those skilled in the art that other modifications based on the technical spirit of the present disclosure can be practiced. In addition, each embodiment disclosed in this specification may be combined and operated as necessary. For example, portions of one embodiment different from one embodiment of the present disclosure may be combined and implemented in the form of an embodiment not specified in this specification.

Meanwhile, the order of the description in the drawings describing the method of the present disclosure does not necessarily correspond to the order of execution, and the relationship between the front and the rear may be changed or executed in parallel.

Alternatively, the drawings describing the method of the present disclosure may omit some components and include only some components within the scope not to harm the essence of the present disclosure.

In addition, the method of the present disclosure may be implemented by combining some or all of the contents included in each embodiment within the scope not to harm the essence of the present disclosure.

What is claimed is:

1. An electronic device for classifying a road surface using a sound signal, the electronic device comprising:

a transceiver configured to transmit and receive a sound signal;

an atmosphere sensor; and at least one processor electronically connected to the transceiver and the atmosphere sensor, wherein the at least one processor is configured to:

transmit a sound signal toward a target road surface spaced apart from the electronic device by a first distance using the transceiver, receive a reflection signal of the sound signal for the target road surface using the transceiver, acquire atmosphere information related to the sound signal using the atmosphere sensor, acquire first data for the received reflection signal, generate second data by correcting the first data based on the atmosphere information, acquire third data related to frequency domain information of the second data based on the second data, and determine a type of the target road surface based on the third data and a road surface classification artificial neural network, and wherein the road surface classification artificial neural network is trained as a frequency domain data set generated based on a sound signal reflected from a road surface of a second distance different from the first distance.

2. The electronic device of claim 1, wherein the second data is generated by correcting the first data based on the atmosphere information and the first distance.

3. The electronic device of claim 1, wherein the first distance is estimated based on a transmission time of the sound signal and a reception time of the reflection signal.

4. The electronic device of claim 1, wherein the third data is acquired by converting the second data into Short-Time Fourier Transformation (STFT).

5. The electronic device of claim 1, wherein the at least one processor is configured to generate a signal for controlling a road surface management device installed on the target road surface based on the determined type of the target road surface, and the road surface management device comprises a heating wire device or a brine spray device.

6. The electronic device of claim 5, wherein the at least one processor is configured to:

determine whether a preset weather condition is satisfied, when the preset weather condition is satisfied, generate a signal for controlling the road surface management device, determine whether a type of the target road surface determined at a first time is changed at a second time, and when a first class determined at the first time as the type of the target road surface and a second class determined at the second time as the type of the target road surface are different, determine to generate a signal for controlling the device installed on the target road surface based on the type of the target road surface determined at a third time.

7. The electronic device of claim 1, wherein the type of the target road surface is determined at every first period, and the at least one processor is configured to determine the type of the target road surface at every second period when the type of the target road surface is determined as a first class.

8. The electronic device of claim 1, wherein the electronic device further comprises at least one of an IR sensor for acquiring temperature information of the target road surface or a vision sensor for acquiring image information of the target road surface, and the at least one processor is configured to determine the type of the target road surface further based on the temperature information or the image information.

9. A method for classifying a road surface using a sound signal performed by an electronic device, the method comprising:

transmitting a sound signal toward a target road surface spaced apart from the electronic device by a first distance;

receiving a reflection signal of the sound signal for the target road surface;

acquiring atmosphere information related to the sound signal;

acquiring first data for the received reflection signal;

generating second data by correcting the first data based on the atmosphere information;

acquiring third data related to frequency domain information of the second data based on the second data; and determining a type of the target road surface based on the third data and a road surface classification artificial neural network, and wherein the road surface classification artificial neural network is trained as a frequency domain data set generated based on a sound signal reflected from a road surface of a second distance different from the first distance.

10. The method of claim 9, wherein the generating the second data further comprises correcting the first data corrected based on the atmosphere information, based on the first distance.

11. The method of claim 9, further comprising estimating the first distance based on a transmission time of the sound signal and a reception time of the reflection signal.

12. The method of claim 9, wherein the third data is acquired by converting the second data into Short-Time Fourier Transformation (STFT).

13. The method of claim 9, further comprising:

generating a signal for controlling a road surface management device installed on the target road surface based on the determined type of the target road surface, and wherein the road surface management device comprises a heating wire device or a brine spray device.

14. The method of claim 13, wherein the generating of the signal for controlling the road surface management device comprises:

determining whether a preset weather condition is satisfied;

when the preset weather condition is satisfied, determining whether a type of the target road surface determined at a first time is changed at a second time, when a first class determined at the first time as the type of the target road surface and a second class determined at the second time as the type of the target road surface are different, determining to generate a signal for controlling the device installed on the target road surface based on the type of the target road surface determined at a third time.

15. The method of claim 9, wherein the determining of the type of the target road surface comprises:

determining the type of the target road surface further based on temperature information of the target road surface or image information of the target road surface, wherein the type of the target road surface is determined at every first period, and the type of the target road surface is determined at every second period when the type of the target road surface is determined as a first class.

\* \* \* \* \*